(12) United States Patent
Nishikawa

(10) Patent No.: US 7,634,725 B2
(45) Date of Patent: Dec. 15, 2009

(54) LAYOUT ADJUSTMENT METHOD, APPARATUS AND PROGRAM FOR THE SAME

(75) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 11/196,838

(22) Filed: Aug. 4, 2005

(65) Prior Publication Data
US 2006/0028659 A1 Feb. 9, 2006

(30) Foreign Application Priority Data
Aug. 6, 2004 (JP) ............................. 2004-231434

(51) Int. Cl.
G06F 17/00 (2006.01)
G06F 17/20 (2006.01)
G06F 17/24 (2006.01)

(52) U.S. Cl. ................. 715/243; 715/244; 715/245; 715/246; 715/247; 715/252

(58) Field of Classification Search ............. 715/200, 715/243–247, 251–253, 255
See application file for complete search history.

(56) References Cited

U.S. PATENT DOCUMENTS

| | | | | |
|---|---|---|---|---|
| 5,701,500 A | * | 12/1997 | Ikeo et al. .................. | 715/209 |
| 5,845,303 A | | 12/1998 | Templeman ............... | 707/517 |
| 5,943,679 A | * | 8/1999 | Niles et al. ................. | 715/247 |
| 6,169,544 B1 | * | 1/2001 | Onoda ....................... | 715/723 |
| 6,278,524 B1 | * | 8/2001 | Kujirai et al. .............. | 358/1.11 |

(Continued)

FOREIGN PATENT DOCUMENTS

JP 07-129658 5/1995

(Continued)

*Primary Examiner*—Laurie Ries
*Assistant Examiner*—Chau Nguyen
(74) *Attorney, Agent, or Firm*—Fitzpatrick, Cella, Harper & Scinto

(57) ABSTRACT

A layout adjustment method for determining a layout of a page to be formed on a printing medium includes a generation step which generates a template including a plurality of partial areas, to which data are inserted, a setting step to set a link between two partial areas of the plurality of partial areas to connect the two partial areas, a first adjustment step to generate first layout indicating positions and sizes of the two partial areas, and a printing conditions setting step to set a binding margin for printing a document including the template. In addition, a correction step corrects the template on the basis of the binding margin set in the print conditions setting step, and a second adjustment step generates a second layout indicating the positions and the sizes of the two partial areas adjusted on the basis of the sizes of data to be inserted in the two partial areas and the template corrected in the correction step. In the correction step, the template is corrected such that a length in a horizontal direction of a specified partial area of the second layout is shorter than a length in the horizontal direction of a corresponding partial area of the first layout corresponding to the specified partial area of the second layout, as well as a length in a vertical direction of the specified partial area of the second layout is longer than a length in the vertical direction of the corresponding partial area of the first layout.

3 Claims, 40 Drawing Sheets

U.S. PATENT DOCUMENTS

| | | | | |
|---|---|---|---|---|
| 6,417,931 B2 * | 7/2002 | Mori et al. | ................... | 358/1.15 |
| 6,826,727 B1 * | 11/2004 | Mohr et al. | ................... | 715/235 |
| 6,891,637 B1 | 5/2005 | Asami | ....................... | 358/1.18 |
| 7,028,255 B1 * | 4/2006 | Ayers | .......................... | 715/202 |
| 7,051,276 B1 * | 5/2006 | Mogilevsky et al. | ......... | 715/209 |
| 7,133,050 B2 * | 11/2006 | Schowtka | .................... | 345/620 |
| 7,345,776 B2 | 3/2008 | Asami | ....................... | 358/1.13 |
| 7,554,689 B2 * | 6/2009 | Tonisson | .................... | 358/1.18 |
| 2002/0040375 A1 * | 4/2002 | Simon et al. | ................ | 707/517 |
| 2002/0051208 A1 * | 5/2002 | Venable | ..................... | 358/1.18 |
| 2004/0225961 A1 * | 11/2004 | Ohashi et al. | ................ | 715/517 |
| 2005/0071743 A1 * | 3/2005 | Harrington et al. | .......... | 715/500 |
| 2006/0050287 A1 * | 3/2006 | Kobashi et al. | .............. | 358/1.2 |

FOREIGN PATENT DOCUMENTS

| | | |
|---|---|---|
| JP | 2001-096833 | 4/2001 |
| JP | 2002-268451 | 9/2002 |
| JP | 2004-015215 | 1/2004 |

\* cited by examiner

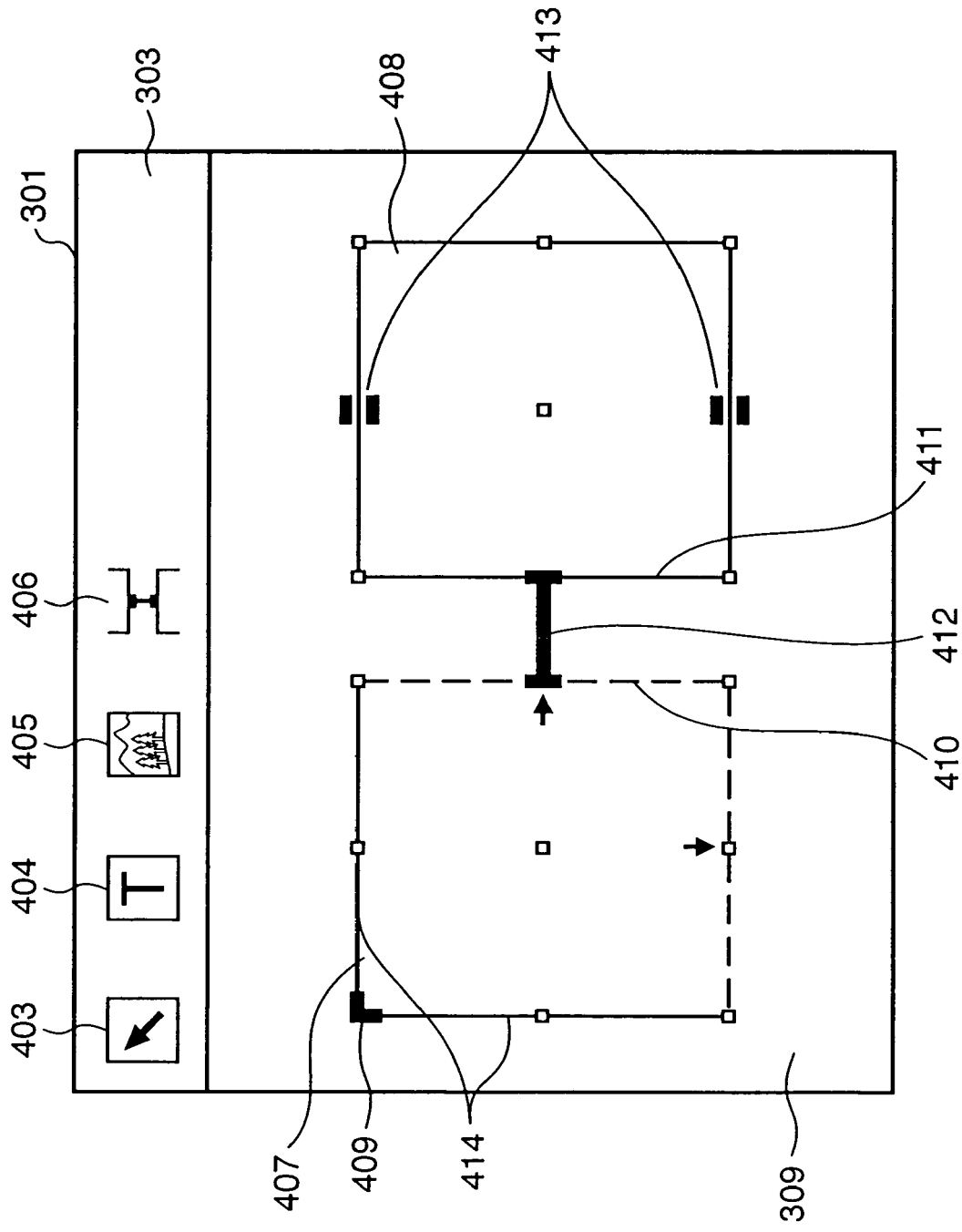

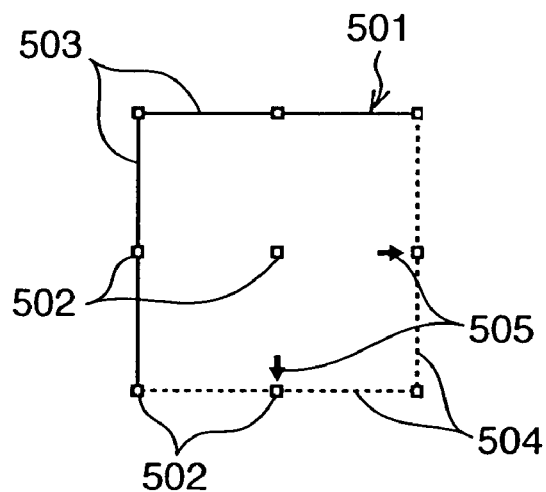
F I G. 7A
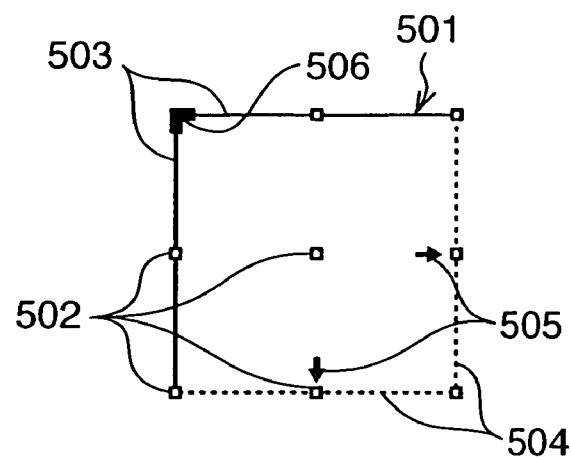
F I G. 7B
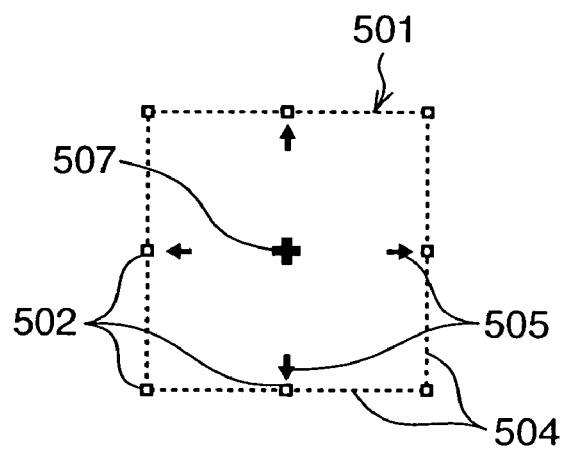
F I G. 7C
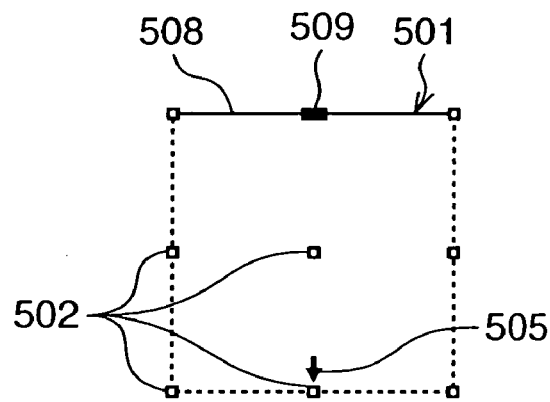
F I G. 7D

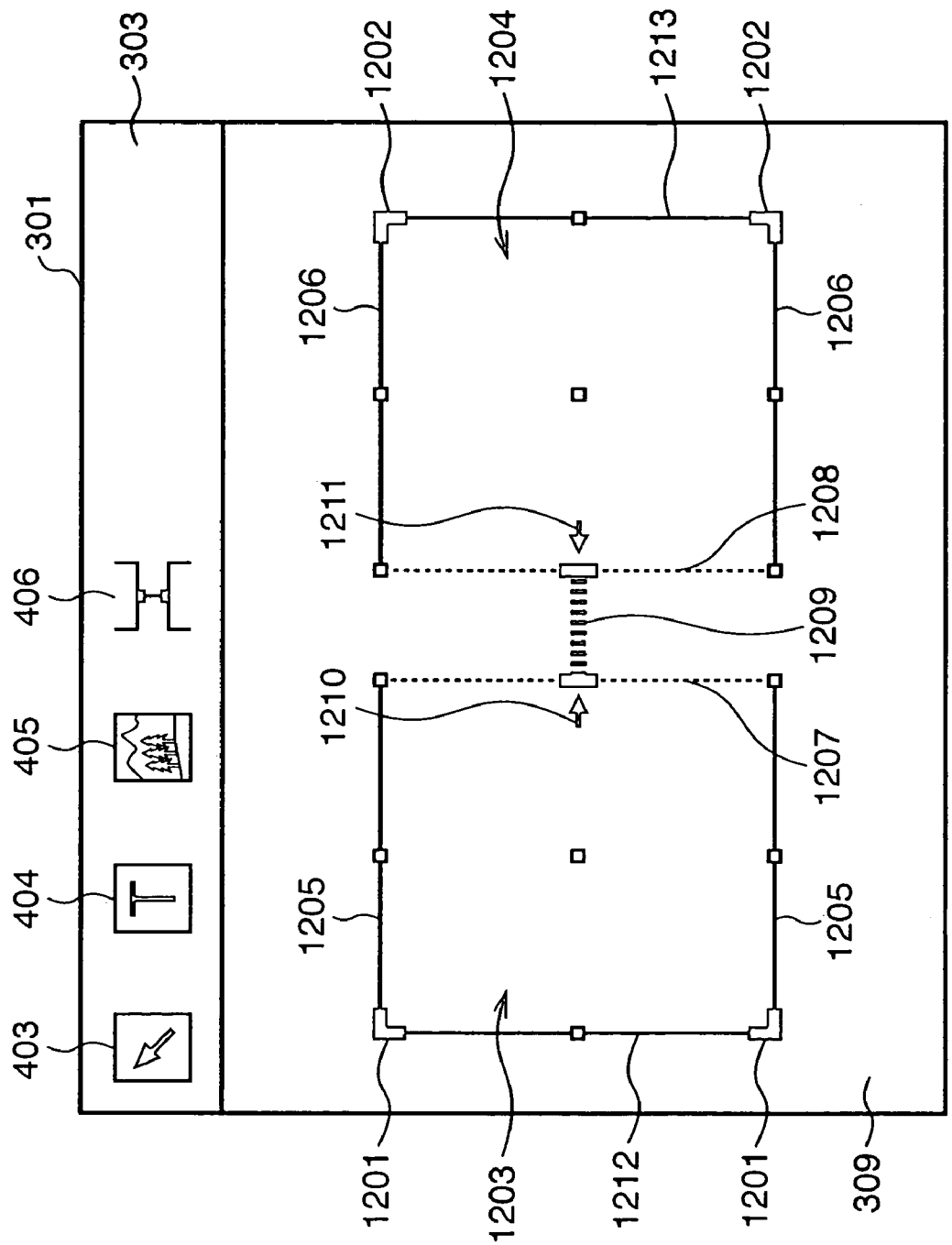

FIG. 21A

| NO | ATTRIBUTE INFORMATION | | REMARKS |
|---|---|---|---|
| 1 | PRINT METHOD | SINGLE-SIDED/ DOUBLE-SIDED/ BOOKBINDING PRINT | • IF "A4+A3", "B4+B3", "letter + ledger (11x17)" ARE SPECIFIED, THIS IS SPECIFIED TO BE FOLDED IN Z<br>• IF BOOKBINDING PRINT OR N-up PRINT IS SPECIFIED, A MANUSCRIPT SIZE AT CHAPTER 1/PAGE 1 IS AUTOMATICALLY SELECTED |
| 2 | PAPER SIZE | MANUSCRIPT SIZE/ FIXED SIZE | • THIS CAN BE SELECTED ONLY FOR FIXED SIZE |
| 3 | DIRECTION OF PAPER | VERTICAL/HORIZONTAL | • SHIFT/SCALING CAN BE SPECIFIED |
| 4 | BINDING MARGIN/ BINDING DIRECTION | | |
| 5 | N-up PRINT | NUMBER OF PAGES/ LOCATING ORDER/ BOARDER LINES/ LOCATIONS TO BE PLACED ETC. | • LOCATIONS TO BE PLACED ARE NINE PATTERNS<br>• PRINT IN SIZE BY MULTIPLIED BY ONE CAN BE SPECIFIED |
| 6 | SCALING | ON/OFF | IF FIXED SIZED PRINT OR N-up PRINT IS SELECTED FOR PAPER SIZE, THIS CAN BE AUTOMATICALLY SPECIFIED TO ON, OFF |
| 7 | WATERMARK | | • THIS CAN BE SPECIFIED INDIVIDUALLY BY LOGICAL PAGE OR PHYSICAL PAGE<br>• COVER ALL CHAPTERS/ALL PAGES |

FIG. 21B

| | | | |
|---|---|---|---|
| 8 | HEADER/FOOTER | | • THIS CAN BE SPECIFIED INDIVIDUALLY BY LOGICAL PAGE OR PHYSICAL PAGE<br>• COVER ALL CHAPTERS/ALL PAGES |
| 9 | PAPER DISCHARGING MANNER | STAPLE/PUNCH | • STAPLE/PUNCH ARE ONLY FOR SINGLE-SIDED/DOUBLE-SIDED PRINT<br>• STAPLE IS FOR ONE/TWO PLACES |
| 10 | BOOKBINDING DETAIL | DIRECTION OF PAGE TO BE SPREAD/SADDLE STITCHING/ SCALING SPECIFICATION/ BINDING MARGIN/SEPARATE VOLUMES SPECIFICATION, etc. | • ONLY FOR BOOKBINDING PRINT |
| 11 | FRONT COVER/ BACK COVER | | • PRINT SPECIFICATION FOR FRONT COVER 1/2, BACK COVER 1/2<br>• SHEET FEEDER INLET (INCLUDING INSERTER) SPECIFICATION |
| 12 | INDEX PAPER | | • PRINTING CHARACTERS ON INDEX PART OR ANNOTATION ON INDEX PAPER CAN BE SET<br>• BOOKBINDING PRINT CANNOT BE SPECIFIED |
| 13 | INSERTING PAPER | | • SPECIFY SHEET FEEDER INLET (INCLUDING INSERTER)<br>• MANUSCRIPT DATA CAN BE PRINTED ON INSERTING PAPER<br>• BOOKBINDING PRINT CANNOT BE SPECIFIED |
| 14 | CHAPTER DELIMITING | "none"/"change pages"/ "change paper" | • IF INDEX PAPER OR INSERTING PAPER IS SPECIFIED, THIS IS FIXED TO "change paper"<br>• FOR SINGLE-SIDED PRINT, "change paper" |

F I G. 22

| NO | ATTRIBUTE INFORMATION | | REMARKS |
|---|---|---|---|
| 1 | PAPER SIZE | MANUSCRIPT SIZE/ FIXED SIZE | • IF FIXED SIZE IS SELECTED, "change paper" IS AUTOMATICALLY SELECTED<br>• IF MULTIPLE TYPES OF PAPER ARE SELECTED FOR A BOOK, THIS CAN BE CHANGED ONLY FOR SPECIFIED PAPER. IF SPECIFICATION IS MADE ACCORDING TO THE BOOK, PAPER SIZE CAN ALSO BE CHANGED |
| 2 | DIRECTION OF PAPER | VERTICAL/HORIZONTAL | • THIS CAN BE SELECTED ONLY FOR FIXED SIZE |
| 3 | N-up PRINT SPECIFICATION | NUMBER OF PAGES/ LOCATING ORDER/ BOARDER LINES/ LOCATIONS TO BE PLACED etc. | • LOCATIONS TO BE PLACED ARE NINE PATTERNS<br>• PRINT IN SIZE BY MULTIPLIED BY ONE CAN BE SPECIFIED |
| 4 | SCALING | ON / OFF | • IF FIXED SIZED PRINT OR N-up PRINT IS SELECTED FOR PAPER SIZE, THIS CAN BE AUTOMATICALLY SPECIFIED TO ON, OFF |
| 5 | WATERMARK | DISPLAY/NON-DISPLAY | • SPECIFY WHETHER ALL WATERMARKS SPECIFIED FOR A BOOK ARE DISPLAYED OR NOT |
| 6 | HEADER/FOOTER | DISPLAY/NON-DISPLAY | • SPECIFY WHETHER ALL HEADERS/FOOTERS SPECIFIED FOR A BOOK ARE DISPLAYED OR NOT |
| 7 | PAPER DISCHARGING MANNER | STAPLE | • IF STAPLE IS SPECIFIED FOR A BOOK, OFF IS AVAILABLE DEFAULT IS ON |

F I G. 23

| NO | ATTRIBUTE INFORMATION | | REMARKS |
|---|---|---|---|
| 1 | PAGE ROTATION SPECIFICATION | | · SPECIFICATION FOR 0/90/180/270 IS AVAILABLE |
| 2 | WATERMARK | DISPLAY/NON-DISPLAY | · SPECIFY WHETHER ALL WATERMARKS SPECIFIED FOR A BOOK ARE DISPLAYED OR NOT |
| 3 | HEADER/FOOTER | DISPLAY/NON-DISPLAY | · SPECIFY WHETHER ALL HEADERS/FOOTERS SPECIFIED FOR A BOOK ARE DISPLAYED OR NOT |
| 4 | ZOOM | 50% –200% | · SPECIFICATION OF RELATIVE MAGNIFICATION WITH A SIZE FITTING IN VIRTUAL LOGICAL PAGE AREA BEING 100% |
| 5 | LOCATION TO BE PLACED | | · SPECIFY FIXED NINE PATTERNS AND ARBITRARY LOCATION TO BE PLACED |
| 6 | ANNOTATION | | |
| 7 | Variable ITEMS | | |
| 8 | PAGE DIVISION | | |

EXAMPLE OF DYNAMIC LAYOUT INFORMATION

EXAMPLE OF INSERTING OF CONTENTS DATA

FIG. 35

| DETAILED SETTING FOR DOCUMENT | | | ? ☒ |
|---|---|---|---|

| PAGE SETTING | FINISH | EDITION | PAPER FEEDING | PRINT QUALITY |

PRINT METHOD(Y):
● SINGLE-SIDED PRINT
○ DOUBLE-SIDED PRINT
○ BOOKBINDING PRINT

BINDING DIRECTION(B): ☐ LONGER (LEFT) EDGE BINDING ▶

BINDING MARGIN(G): 30 ▲▼ mm (0~30) ~351

ADJUSTMENT OF MANUSCRIPT(J):
○ SCALE DOWN TO FIT THE PRINTING AREA SET BY MARGIN
○ MOVE ACCORDING TO THE BINDING WIDTH ~352
● DYNAMIC LAYOUT ~353

SETTING OF STAPLE(S): SET FOR ALL PAGES ▶
LOCATION OF STAPLE(L): ☐ UPPER LEFT (ONE PLACE) ▶

☐ PUNCH(N)
☐ FOLDED IN Z(Z)

CHAPTER DELIMITING(X): NOT SPECIFY ▶

| OK | CANCEL | RETURN TO LATEST SAVED STATE(V) |
| | | APPLY(A) | HELP(H) |

EXAMPLE OF PRESENT EMBODIMENT

↔ BINDING MARGIN SETTING

BEING DYNAMICALLY LAID OUT AGAIN BY TAKING ACCOUNT OF BINDING MARGIN

LAYOUT ADJUSTMENT METHOD, APPARATUS AND PROGRAM FOR THE SAME

FIELD OF THE INVENTION

The present invention relates to a layout adjustment method, an apparatus and a program for the same for adjusting a layout of a variable data document including a text and an image in order to print the variable data document.

BACKGROUND OF THE INVENTION

As various types of products are developed for an item, life cycles of products are getting shorter. As the Internet is prevailed, customers become preferred to receive customized service. Due to these factors, CRM (Customer Relationship Management) and One-to-One marketing is getting required. These techniques are very effective in improving customer satisfaction and in cultivating the market and enclosing the customers.

The one-to-one marketing is a kind of database marketing. It makes a database of personal attribute information including customer's age, sex, interest, preference, and purchase history; analyses the contents of the database; and proposes a service or goods to the customers according to what the customers need. A typical example of the specific techniques is a variable print. As DTP (desk top publishing) technique has advanced and digital printing devices have prevailed, a variable print system for outputting a document customized for each customer has been developed. For such a variable print system, it is required to create a customized document with appropriately laying out the contents varying for each customer.

Generally, in the variable print system, a container is laid out on a document to create such a customized document. A container is a partial area for drawing contents (drawn contents) and often called a field area. That is to say, a customized document (document) is created through operations of laying out such a container on a document and associating the layout with database (associating each of the contents in database with each container). Such a document will be called a variable data document (sometimes simply called template) hereinafter.

In the variable print system, each laid out container is able to receive contents varying for each customer. The size of data to be inserted in the container is variable. When the container size is fixed, problems below will occur. For example, when text data with a size larger than that of the container is inserted, all of the text cannot be displayed in the container. Or, when image data with a size larger than that of the container is inserted, a part of the image is lost. This kind of problem is called overflow.

For example, when the contents are image data, the image can be scaled-down to be drawn in the container, with a probability of extremely little image being displayed. Or, when text data, too large for the fixed sized container, is tried inserted in the container, the font size of the text can be reduced to allow for the entire text to be displayed in the container. When the font size is adjusted, however, a problem occurs in that the font size becomes too little that the entire document becomes imbalanced or unreadable.

On the other hand, an automatic layout system is developed for solving the abovementioned problems by setting the container size for a text or an image flexible. In the automatic layout system, the container size for a text or an image can be set flexible. The automatic layout system can be adapted to make the container size flexible so that the container size can be scaled up according to the amount of data to be inserted. Another technique is also developed for displaying the entire text in the container by reducing the font size of the text, when the text data larger than the fixed sized container is inserted.

A problem occurs in that a container of a flexible size overlaps another container on the same document, when the container of a flexible size is scaled up. Another problem occurs in that the font size become too little, when the font size is adjusted for the entire text to be displayed in a container and the amount of the text to be displayed is large.

As an automatic layout technique for solving the problems, a technique is known that relates to a layout design device for scaling down the size of a container adjacent to another container to keep the distance between the containers, when the size of the second container is scaled up (for example, see Japanese Patent Laid-Open No. 7-129658 (0049, FIG. 8)).

Another technique is known that relates to a layout control device for controlling a layout when it outputs an image through a printing device, though the layout control device does not dynamically layout each object (container) again for the purpose (for example, see Japanese Patent Laid-Open No. 2004-15215).

On the other hand, as the type of data varies among for example a character, a spreadsheet and an image, a structure for defining data or an editing operation for the data also varies. Generally, various application programs are provided for each type of data. A User chooses an application program to use for each type of data. For example, a user chooses an application program to use for each type of data, such as using a character processing program for editing characters, a spreadsheet program for editing a spreadsheet, or an image editing program for editing an image.

As a document created by a user, a document including multiple types of data, such as characters and spreadsheets or characters and images, is more general than a document including a single type of data, such as characters only, spreadsheets only or images only. A user who is to create an intended document including multiple types of data needs to print data for each application by using a printing function provided for each application and combine the printed matter in a desired order.

In contrast, as a program for forming a single integrated application with various types of applications so-called office suite, a program is known for providing a function of combining data generated by each of the applications and making up a document. A user who uses this integrated application can combine data created by each of the applications into a single intended document by a specific application included in the integrated application.

As the intended document created by the integrated application, however, is a single document file, the file is managed for editing and outputting or the like by file and a problem occurs in that too many restrictions resulting from functions of the application prevents a format for a part of the document file from being set. For example, for that purpose, the operations of changing format setting for each part where the format of the document file changes and reprinting the document are required. Thus, the user himself needs to provide an interface between the applications. This requires the user too much labor, degrading productivity. Due to so many manual operations, this technique is subjected to high occurrence of many errors in processing.

In order to solve the problem, another document processing system is known for improving productivity by converting a data file created by a general application into an electronic manuscript file with an electric manuscript writer. In such a system, format data such as an N page printing, a double-sided printing or stapling can be stored with an electronic manuscript file and the document can be printed in the previously stored format without requiring the user to set the format again.

There is a case, however, where a layout file, which is a single document file generated by an integrated application, is taken in the abovementioned document processing system and operated in conjunction with the system. As a person who designs a layout (for example, a template designer) typically does not consider the setting made on a document processing system (for example, binding margin setting) in the abovementioned case, the document file laid out without consideration of the setting made on the document processing system is not necessarily printed out in an appropriate state. For example, when biding margin is set on the document processing system, a problem occurs in that the entire of the document file that must has been appropriately laid out on an integrated application moves so that a part of the document or the like displayed in a container is lost when the document is printed out or the page is scaled down to match the printing area.

SUMMARY OF THE INVENTION

The present invention is adapted in view of the circumstances, and intends to provide a layout adjustment method, an apparatus and a program for the same for preferably achieving layout adjustment of a variable data document in accordance with printing conditions without losing a part of a container of a variable data document, which is already determined, or inappropriately scaling down the document according to the printing conditions such as binding margin setting in printing.

In order to solve the abovementioned problem, the present invention is a layout adjustment method for determining a layout of a page to be formed on a printing medium, comprising:

a management step of managing template data including a basic layout with a partial area, to which data is to be inserted, laid out in a page, wherein a link is set between a plurality of partial areas to define the plurality of partial areas as working together;

a calculation step of calculating a size of each partial area appropriate for drawing data to be inserted in each partial area on the basis of the size of data to be inserted in the partial areas;

an adjustment step of adjusting a layout representing a size and a location of the plurality of partial areas in the page on the basis of relationship between a size of each partial area calculated at the calculation step and a link set for the plurality of partial areas in the basic layout; and a printing conditions setting step of setting printing conditions for printing a document including the template data;

wherein the adjustment step adjusts a layout representing a size and location of the plurality of partial areas in the page on the basis of the printing conditions set at the printing conditions setting step.

In order to solve the abovementioned problem, the present invention is a layout adjustment apparatus for determining a layout of a page to be formed on a printing medium, comprising:

management means for managing template data including a basic layout with a partial area, to which data is to be inserted, laid out in a page, wherein a link is set between a plurality of partial areas to define the plurality of partial areas as working together;

calculation means for calculating a size of each partial area appropriate for drawing data to be inserted in each partial area on the basis of the size of data to be inserted in the partial area;

adjustment means for adjusting a layout representing a size and a location of the plurality of partial areas in the page on the basis of relationship between a size of each partial area calculated by the calculation means and a link set for the plurality of partial areas in the basic layout; and printing conditions setting means for setting printing conditions for printing a document including the template data;

wherein the adjustment means adjusts a layout representing a size and a location of the plurality of partial areas in the page on the basis of the printing conditions set by the printing conditions setting means.

In order to solve the abovementioned problem, the present invention is a program for causing a computer, which determines a layout of a page to be formed on a printing medium, to perform a management procedure for managing template data including a basic layout with a partial area, to which data is to be inserted, laid out in a page, wherein a link is set between a plurality of partial areas to define the plurality of partial areas as working together;

a calculation procedure for calculating a size of each partial area appropriate for drawing data to be inserted in each partial area on the basis of the size of data to be inserted in the partial area;

an adjustment procedure for adjusting a layout representing a size and a location of the plurality of partial areas in the page on the basis of relationship between a size of each partial area calculated by the calculation procedure and a link set for the plurality of partial areas in the basic layout; and a printing conditions setting procedure for setting a printing conditions for printing a document including the template data;

wherein the adjustment procedure adjusts a layout representing a size and a location of the plurality of partial areas in the page on the basis of the printing conditions set by the printing conditions setting procedure.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 6 is a diagram showing an example of display of a container on the user interface;

FIGS. 7A-7D are diagrams illustrating a rule for displaying containers in an embodiment;

FIG. 14 is a diagram showing an example of display of a user interface when a container is located according to a flexible link;

FIGS. 21A-21B are lists showing book attributes (document setting information 1803);

FIG. 22 is a list showing an exemplary list of chapter attributes (chapter setting information 1807);

FIG. 23 is a list showing an exemplary list of page attributes (page setting information 1811);

FIG. 35 is a diagram showing an example of a UI screen for setting a bookbinding application UI when it is working together;

DETAILED DESCRIPTION OF THE PREFERRED EMBODIMENTS

Now, preferred embodiments of the present invention will be described with reference to the drawings.

<System Configuration>

Figure 1:
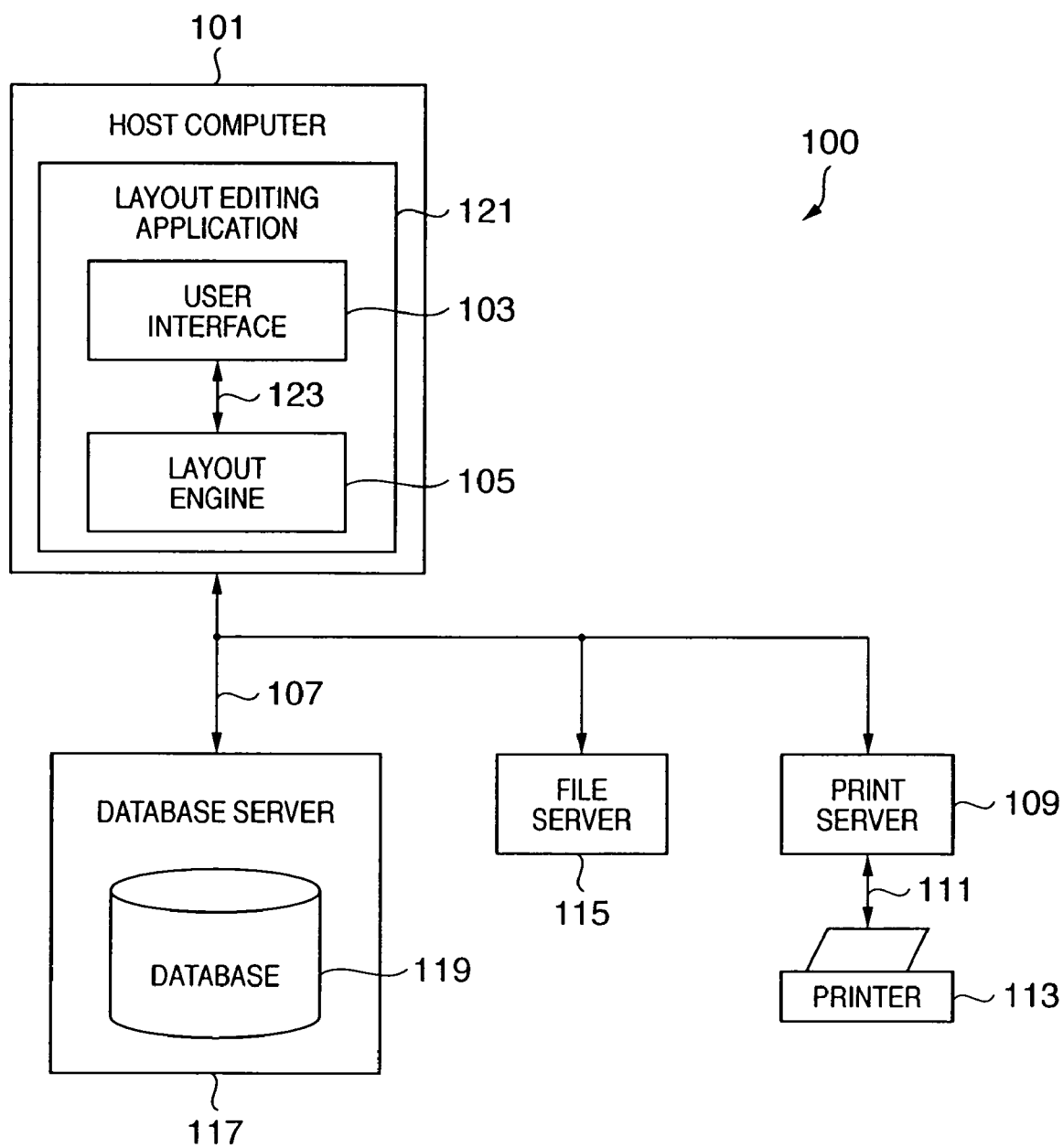
FIG. 1 is a block diagram showing an exemplary configuration of a variable print system 100 for printing a variable data document according to an embodiment of the present invention.
Figure 2:
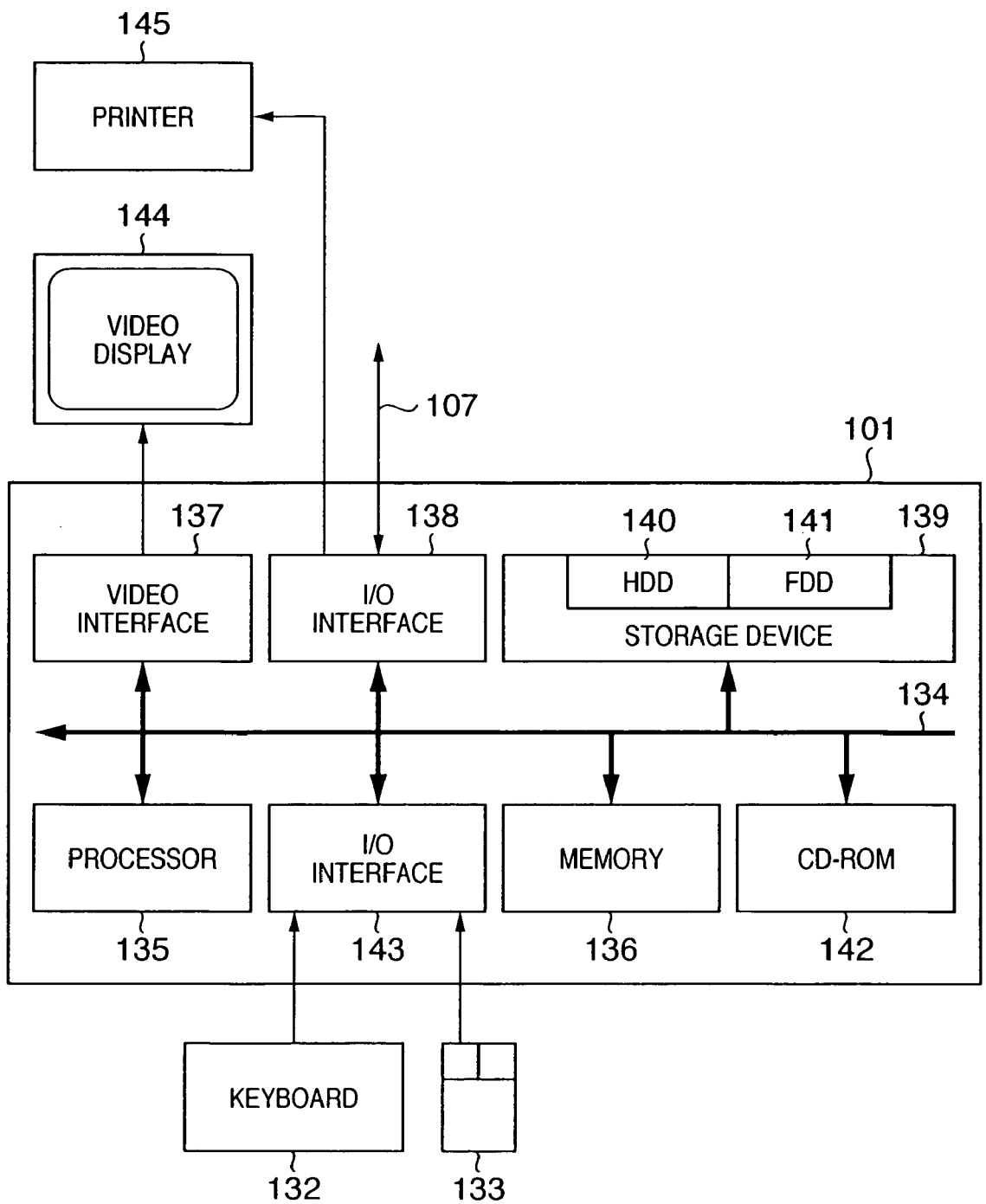
FIG. 2 is a block diagram showing a configuration of a host computer 101 shown in FIG. 1 in more detail.

First, a configuration of a variable print system according to an embodiment of the present invention will be described with reference to FIGS. 1 and 2. FIG. 1 is a block diagram showing an exemplary configuration of a variable print system 100 for printing a variable data document according to an embodiment of the present invention. FIG. 2 is a block diagram showing a configuration of a host computer 101 shown in FIG. 1 in more detail.

Figure 39:
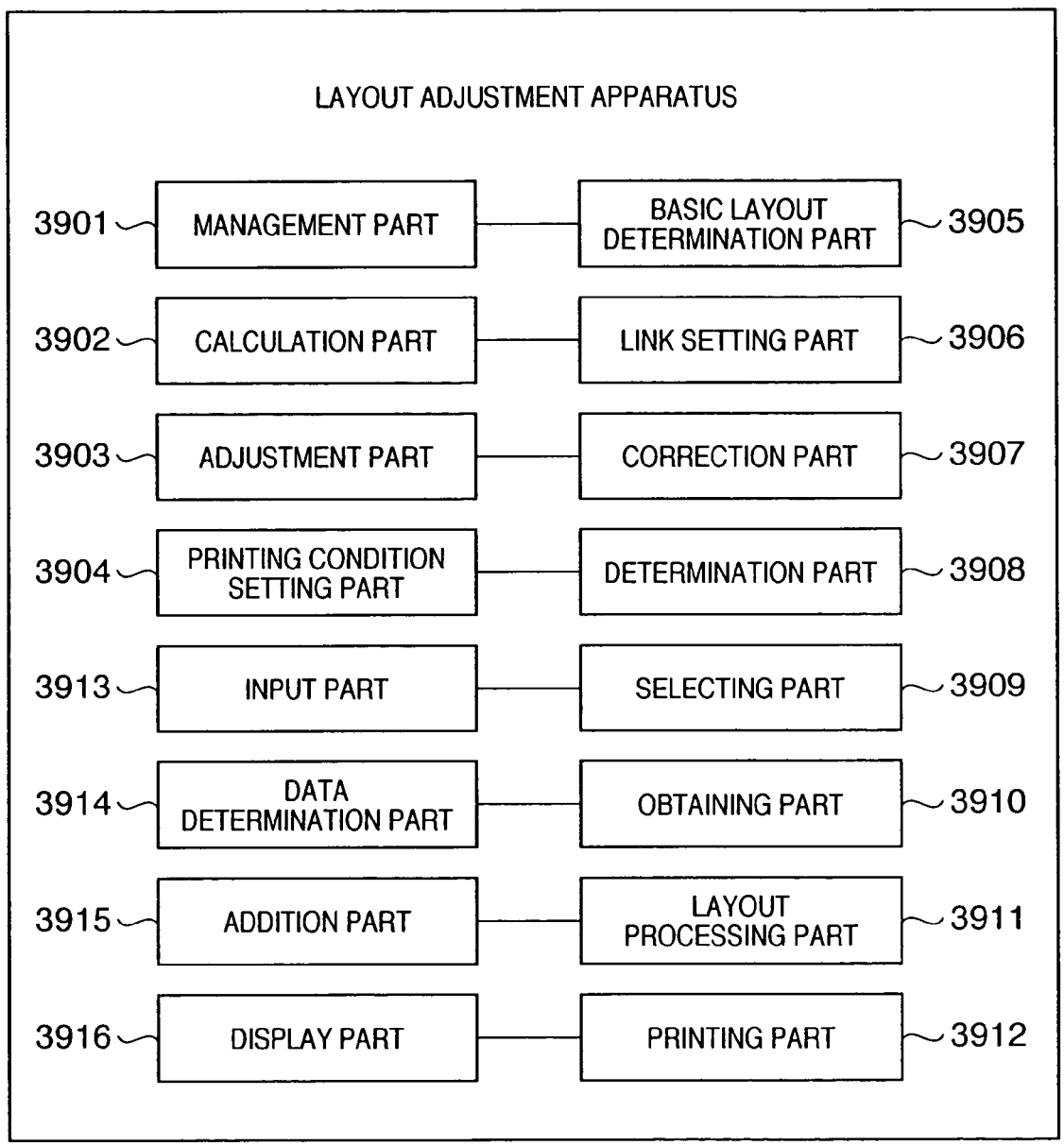
FIG. 39 is a block diagram showing a function module configuration of a layout adjustment apparatus according to an embodiment of the present invention.

Variable print processing described in the embodiment is performed by the host computer 101 (configured by generic computer modules), which is a layout adjustment device. A layout editing application program 121 (layout adjustment program of the present invention), which can be implemented on the variable print system 100, is executed with the whole of or a part of its software executed on the host computer 101. Processes for layout edition or for printing a variable data document are particularly executed by software, which is executed on the host computer 101. FIG. 39 is a block diagram showing a function module configuration of a layout adjustment device according to an embodiment of the present invention.

The layout editing application program 121 is stored in a computer readable medium, loaded from the computer readable medium to memory 136 of the host computer 101 and executed. A computer readable medium storing such software or a computer program is a compute program product. By using the computer program product on a computer, a device preferable for layout edition or a variable print of a document is provided.

As shown in FIG. 2, a keyboard 132 or a pointing device or the like such as a mouse 133 is connected to the host computer 101 as an input/output device via an input/output interface 143. A display device (video display) 144 as an output device is connected via a video interface 137. A local printer 145 or the like can also be connected to via an input/output (I/O) interface 138. The I/O interface 138 also has a function of connecting the host computer 101 to a network 107. With the function, the host computer 101 can be connected to other computer units in the variable print system 100 via the network. A typical example of the network 107 includes a local area network (LAN) and a wide area network (WAN).

Also shown in FIG. 2, the host computer 101 includes at least one processor unit 135 and memory unit 136 including for example semiconductor random access memory (RAM) and read only memory (ROM). A storage device 139 includes a hard disk drive (HDD) 140 which can exchange data with a computer readable medium storing a program or the like and floppy (registered trademark) disk drive (FDD) 141. Although not shown in FIG. 2, a magnetic tape drive or the like is also available as the storage device 139. A CD-ROM drive 142 is provided as a non-volatile data source (of course, a CD-ROM can provide a computer program).

The host computer 101 uses components 135-143 of a computer module 101, which communicates via interconnect bus 134 according to an operating system such as GNU/LINUX or Microsoft Windows (registered trademark) or, typically an operating system, or by means of a conventional operation mode of a computer system formed by those well-known in the associated art. That is to say, each configuration of the abovementioned components 135-143 is communicatively connected via bus 134 and used by an operating system installed on the host computer 101.

Examples of the host computer 101 shown in FIG. 2 include an IBM compatible PC or SUN Sparcstation, or any computer system including them.

<Outline of Layout Editing Application>

In the embodiment, the layout application program 121 resides on the hard disk drive 140 and execution and reading of the program can be controlled by the processor 135. A medium storage device of a program of the layout editing application 121 and data to be fetched from the network 107 use semiconductor memory 136 in response to the hard disk drive 140.

As an example, an encoded program of the layout editing application 121 is stored on a CD-ROM or a floppy (registered trademark) disk, read through a corresponding CD-ROM drive 142 or a storage device 141 and installed on the hard disk drive 140.

Alternatively, as another example, the layout editing application program 121 may be read from the network 107 into the host computer 101 and installed on the hard disk drive 140.

Software can be loaded into the host computer 101 from any other appropriate computer including a magnetic tape or ROM or an integrated circuit, a magneto-optical disk, or the Internet or an Intranet having wireless communication such as infra-red communication between the host computer 101 and another device, a computer readable card such as a PCM-CIA card, and an E-mail communication or record information on a Web site. They are merely an example of computer readable medium and it is apparent that other computer readable medium can be used.

In FIG. 1, the layout editing application 121 of the present invention is for causing a computer to perform a variable print (also called as variable data print (VDP)) and includes two software components, i.e., a layout engine 105 and a user interface 103. The layout engine 105 is a software component for reading variable data stored in a database 119 on a one-by-one record basis according to restrictions on size or location given to a container (a rectangular area), which is a partial area, and calculating the size or the location or the like of the container, to which read data is to be inserted, according to the read data and a restriction on the container.

Also in the embodiment, the layout engine 105 also draws data allocated to a container and generates an image of a variable data document. The present invention is not limited to this embodiment. The layout engine 105 may operate as an application for determining the size and the location of each partial area (container) and output drawing information to a printer driver (not shown) to cause the printer driver to perform a drawing process of an image of a variable data document and generate print data. The user interface 103 allows a user to set a layout or attribute of a container and lets the user to create a document template. The user interface 103 provides a mechanism for associating each container in the document template with data source. The user interface 103 and the layout engine 105 communicate via a communication channel 123.

Figure 3:
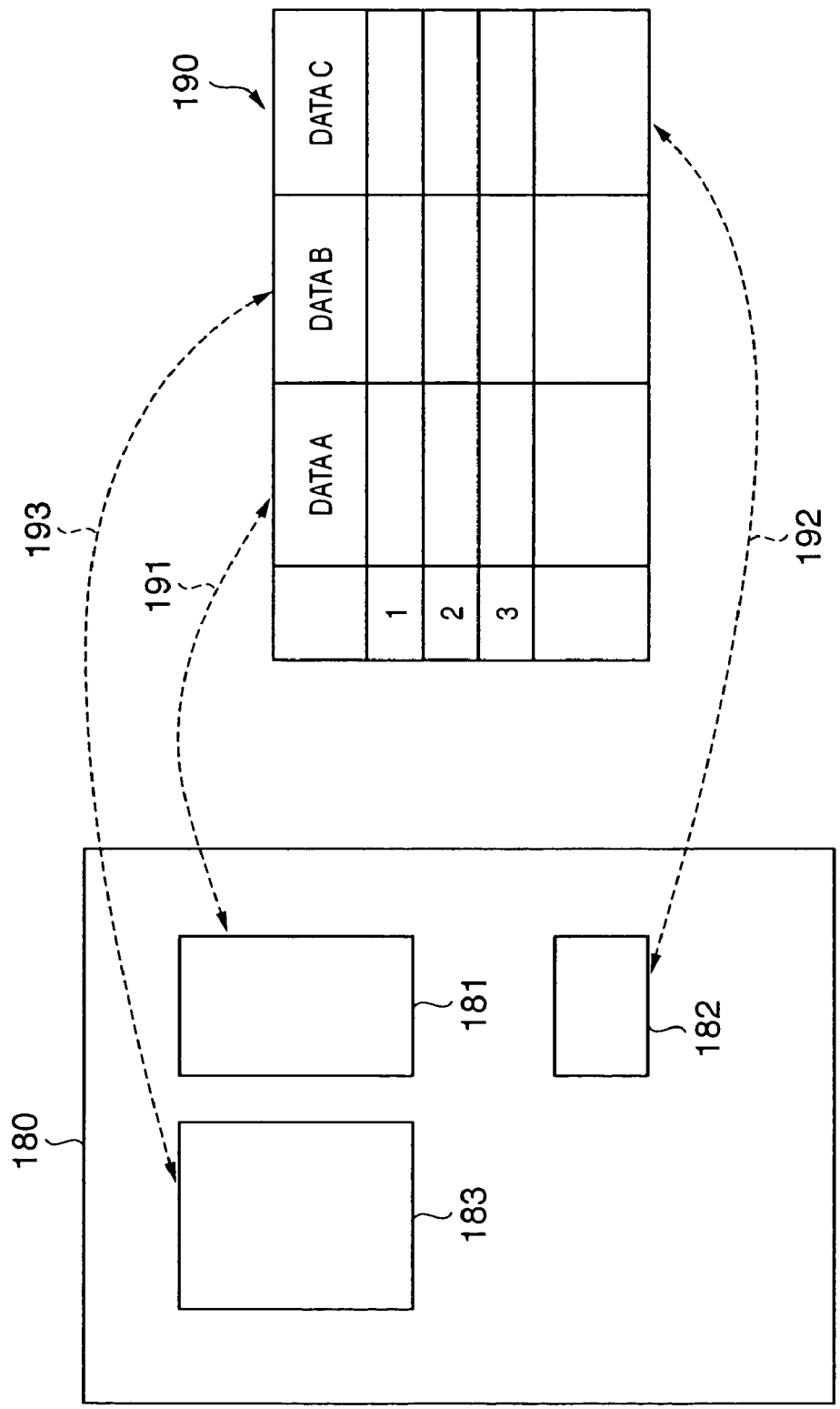
FIG. 3 is a diagram illustrating an outline of a variable data print in an embodiment of the present invention.

FIG. 3 is a diagram illustrating an outline of a variable data print in the embodiment of the present invention. A document template 180 is generated by locating a plurality of containers 181-183 on a page according to an instruction operated by a user and giving restricting conditions on a location or a size to each container via a user interface module 103 (hereinafter described as "user interface 103") of the layout editing application 121.

The user interface 103 associates the document template 180 with a data source 190 and further associates each container with each data field in the data source 190. Association information indicating the association between each container and each data field in the data source 190 is described in the document template, which is stored in a HDD 140. The data source 190 is a file describing entry data on a one-by-one record basis that is stored in the HDD 140.

The layout engine 105 reads data associated with each of containers 180-183 of the document template in the association information from the data source 190 according to a print instruction or a preview instruction from a user, inserts the data on a one-by-one record basis (for example, the data fields A-C of a data record 1 are inserted into containers 181-183), and adjusts the size or the like of each container according to the inserted data (layout adjustment).

In case of a preview instruction, a document image adjusted for layout is generated and outputted to display the document image as a preview on a screen of a video display 144. In case of a print instruction, a document image generated by using the layout engine 105 or the print driver is outputted to a print server 109 as print data. By processing data record 1, 2, 3 . . . successively, a variable data print is achieved.

The data source (190) for generating a document may be a general database 119 on a database server 117, for example, which is included in another computer operating a database application. In this case, the host computer 101 can communicate with the database server 117 via the network 107 and obtain a data source. The document template (180) for a variable data print generated by the layout editing application 121 is saved at the host computer 101 or a file server 115 formed by another computer.

As shown in FIG. 3, the layout engine 105 of the layout editing application 121 generates a variable data document including a document template merged with data. The documents is saved at a local file system of the host computer 101 or saved at the file server 115 or sent to a printer 113 for printing. The print server 109 is a computer for providing a network function for the printer 113, which is not directly connected with a network. The print server 109 and a printer 113 are connected via a general communication channel 111.

<Other System Configuration Examples>

Figure 4:
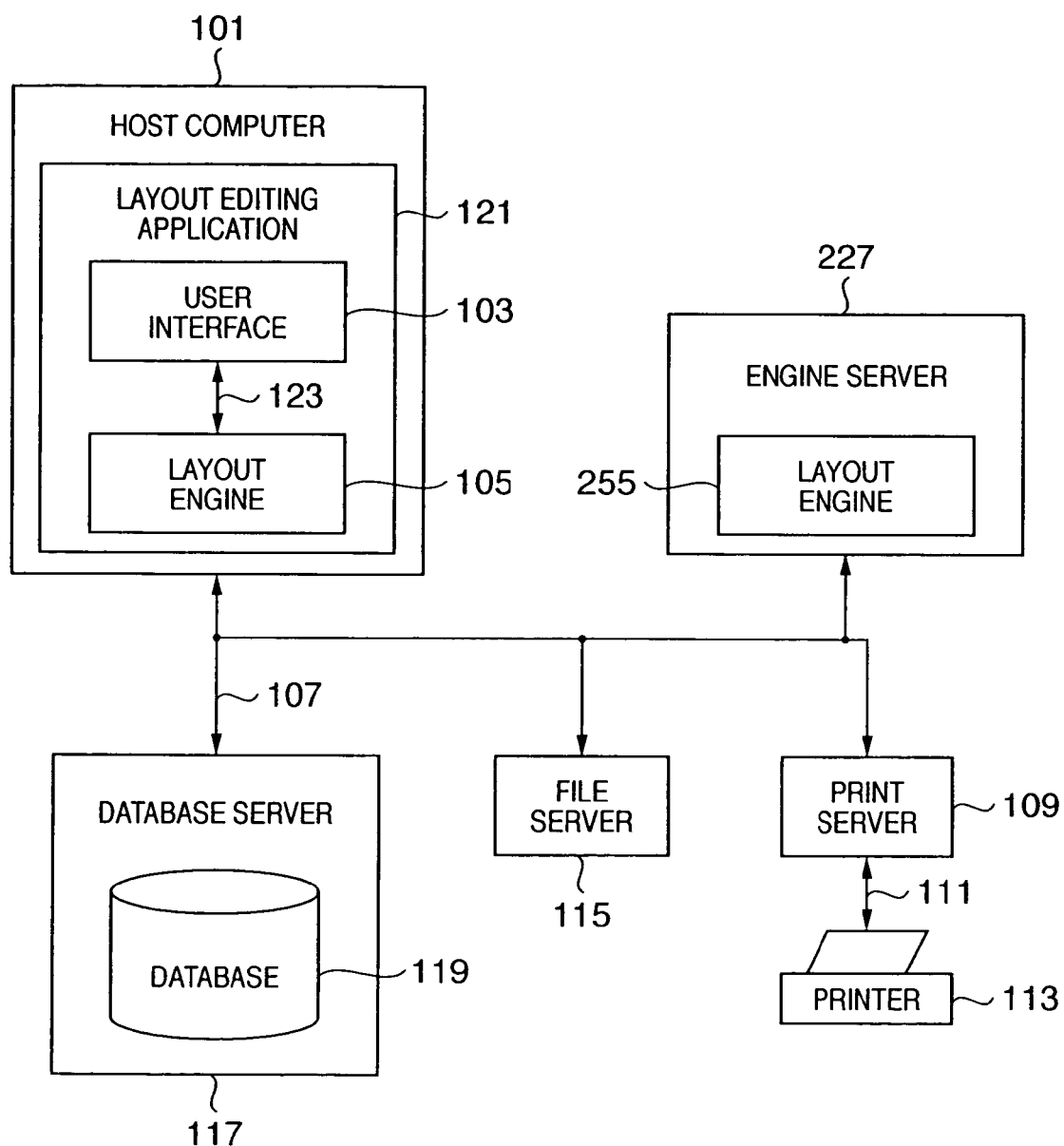
FIG. 4 is a block diagram showing another exemplary configuration of the variable print system 100 for printing a variable data document according to an embodiment of the present invention.

FIG. 4 is a block diagram showing another exemplary configuration of the variable print system 100 for printing a variable data document according to an embodiment of the present invention. The variable print system 100 shown in FIG. 4 is a block diagram with a configuration similar to that of FIG. 1 but different in that it is added with an engine server 227. A layout engine 225 stored in the engine server 227 is a separated version of the layout engine 105.

As an engine server 227, a general computer is used. The layout engine 225 couples a document template saved at the file server 115 with data saved at the database 119 to generate a variable data document according to a printing or other purpose. Such an operation is required via a user interface 103.

<Description of Layout Editing Application>

The layout editing application 121 will be described in detail below.

[Main Window]

Figure 5:
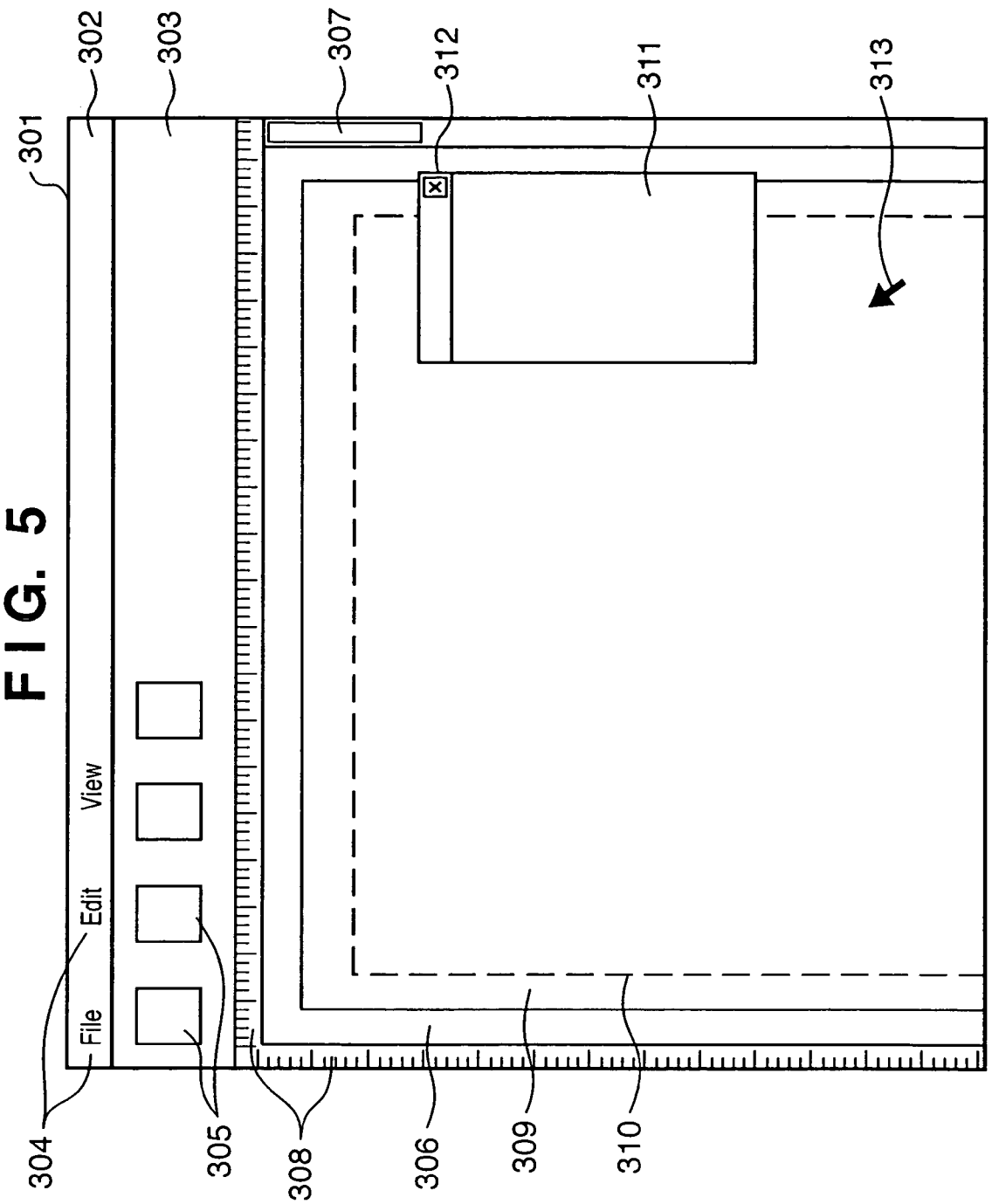
FIG. 5 is a diagram showing an example of a user interface in an embodiment including a menu bar, a tool bar, a work area and a floating pallet.

FIG. 5 is a diagram showing an example of a user interface in an embodiment including a menu bar, a tool bar, a work area and a floating pallet. The user interface 103 displays a user interface screen formed by an application window 301 as shown in FIG. 5 on the video display 144 at operation. The window 301 has a menu bar 302, a tool bar 303, a work area 306 and an optional palette 311. The menu bar 302 and the tool bar 303 can be made non-display or moved to various locations on the screen. The location of the work area 306 can be moved by operation of the mouse 133. The palette 311 is optional, on which a cursor/pointing device 313 represents the location the mouse 133 specifies.

The menu bar 302 has many menu items 304, which are extended under hierarchy of menu option, as known as well-known art.

The tool bar 303 has many tool buttons and widget 305, which can be in non-display state or a display state according to a special mode of an application.

A ruler 308 is optional and used for indicating the location of a pointer, a page, a line, a margin guide, a container or an object in the work area 306.

The palette 311 is used for accessing an additional function such as a variable data library. The palette 311 has a window control 312 for moving, resizing and closing a window. The palette 311 is optional and displayed on the foreground of the work area 306 or hidden behind an object. The palette 311 is restricted to be displayed within the area of the application window 301 or allowed to be displayed in part or in entire outside the application window 301.

On the tool bar 303, "buttons", which can be selected by a user, are located as shown in FIG. 6. FIG. 6 is a diagram showing an example of display of a container on the user interface. The buttons shown in FIG. 6 will be described below.

(1) selection tool button 403: used for selecting, moving and changing the size, resizing and locking/unlocking an edge of a container. A container is selected by dragging a selection box to surround the container. A plurality of containers can be selected with a selecting operation for the plurality of containers with pressing a CTRL key.

(2) text container tool button 404 This is used for creating a container having a static or variable text.

(3) image container tool button 404

This is used for creating a container having a static or variable image.

(4) link tool button 406

This is used for creating a link for associating containers and also used for controlling a distance between links.

The application window 301, shown in FIG. 5, of the layout editing application 121 can determine a basic layout by laying out each container or each link in a page (basic layout determination part 3905). The basic layout is an underlying layout for a variable data print. When each container in the basic layout is a fixed container, printed results for all the records have the same layout. When each container in the basic layout is a flexible container to be described later, the size or the location of each container varies within the restriction to be described later according to the amount or the size of data to be read on a one-by-one record basis. The document template created by the layout editing application 121 is for determining the basic layout. When a flexible container is included in the basic layout, the layout of the final printed material is adjusted for layout by read in data.

[Document Template]

In FIG. 5, the work area 306 is used for displaying and editing a design of a document template (180: basic layout). This enables a user to see an outline of a document to be printed out while the user is designing the document template. Accordingly, the user can easily recognize how a document merged with the data source (190) changes according to the amount and the size of a variable data.

When a data source is associated with a document template, the current document is displayed on each container, in which a corresponding variable text or an image is laid out, for preview.

A document structure and a visual mark (a frame line of a container, an anchor, a slider, a link, etc.) for drawing a variable container in a document template are always displayed while the document template is created. The visual mark is displayed only when a user moves a cursor to a container or selects a container in previewing for inserting variable data.

The work area 306 includes a scroll bar 307, an optional ruler 308 and a document template 309. The document template 309 can indicate that the document has a plurality of pages. The document template 309 is what displays the document template 180 of FIG. 3.

The page size of the document template given is specified by a user with a well-known technique. For example, a user selects "Page setting" from "File" on a menu to display a dialog for setting the page size. The page size specified by the user will be reflected on the page. The actual number of pages of each document may vary according to variable data in an associated data source. This is because an additional page is automatically created when a field whose size changes according to the amount of variable data, such as a variable table, is set in the document template and variable data which cannot be fit in a page is read in.

The border line 310 shown in each page is an arbitrary page margin for indicating the maximum width of an object which can be printed on the page.

FIG. 6 shows exemplary objects which can be displayed on the document template 309 for a single page. Such objects include containers 407 and 408, an arbitrarily applied anchor icon 409, fixed edges 411 and 414, an unfixed edge 410, a link 412 and a slider 413. The anchor icon 409 can be set on a corner or a edge of a rectangle container or in the center of a container. When the anchor icon 409 is set, the place where the icon is set is fixed.

In the example shown in FIG. 6, the anchor icon 409 is set on the upper left corner of the container 407. This means that when variable data is inserted in the container 407 and the size of an image or the amount of text of the variable data is too large for the container 407, the anchor icon 409 can be extended to right and downward. When the anchor icon 409 is set on an edge, the edge is fixed and the other three edges can be extended in respective directions. When the anchor icon 409 is set in the center of a container, the center of the container is fixed and four edges can be extended in respective directions with keeping the center of the rectangular container fixed.

Although the link 412 will be described in detail later, it represents that the container 407 and the container 408 are associated with each other and that the container 408 can be moved to right with keeping the length set for the link (the limit for the length can be specified). The slider 413 represents that it can move in parallel with the set edges.

[Container]

Now, a container will be described. A container is a space (referred to as "a partial area") in a document template, into which a fixed or a variable text/image is inserted from a variable data file for drawing. A container is laid out with the other containers or objects as shown in FIG. 6. A container is moved, adjusted in size and recreated according to the user's indication on a user interface screen by manipulating the mouse 133.

More accurately, a container has a set of setting, visual representation and an interaction and editing operation. The container according to the embodiment will be defined as below.

(1) A container has fixed or variable contents. The variable contents can be said dynamic in that data obtained from a data source can differ for each document, i.e., for each record. As contents which is animated or which change as time goes on in the other manner is not appropriate for printing, the variable contents according to the embodiment does not include such contents here. Similarly, the fixed contents are displayed in the same way for all the documents generated by using a container. When a link is set between the fixed contents and the variable contents, however, the place of fixed contents may be susceptible to the variable contents and differ for each document.

(2) A container has ornament functions similar to those of text setting, including background colors, borders, and font styles to be applied to contents. This type of setting is called a container attribute. Though the container attribute can be set for each container, a container can be also set to have the same container attribute as another container.

(3) A container is merged with data from a data source when a document is generated. The ornament functions are visible on the printed material as they are in any fixed contents. The variable contents provide a display of specific data from a data source. The represented containers can be printed out and/or displayed on a screen of the video display 144, for example.

(4) A container has a user interface as a visual mark as shown in FIG. 6. For example, a container has an interactive graphical user interface (GUI) for editing the container and setting the display. Each element of the GUI is displayed on the screen of the video display 144 but not printed out on a document. The user interface 103 of the layout editing application 121 displays some of ornament functions of the container such as background colors or fonts and has a function for allowing the edition and display of the container setting.

[Restriction on Container]

A container is restricted on controlling how it is associated with contents displayed for each document. The restriction (including the association of fixed/variable contents with a container.) is a main method for a user to control generations of a plurality of documents from a document template. An example of the restriction is "The contents of this container should be four inches high at the most." Another example of the restriction is "The left edge of the contents of this container should be displayed at the same horizontal level for every document." Those what described here are various ways for displaying and editing such restrictions by using a GUI.

As an image has a location defined on a page, a contents place holder for specifying a location of fixed contents is well-known in a digital print art. The container has a location and a size, which are edited and displayed in a manner well-known in the art. Therefore, display and edition in a manner specialized for variable data printing will be focused below.

With a container, a user can specify the size (drawing size) or the location of contents in a document. As many types of documents are generated from a document template, many capabilities and restrictions are set for a container. A predetermined user interface is used for setting (specifying) or displaying them.

An edge of a container defines a virtual border for associated contents to be displayed in a document. Therefore, describing the left edge of a container is the same as describing the leftmost edge in an area, in which associated contents can be displayed in each document. Similarly, describing the height of a container is considered as the same as describing a restriction on the height of associated contents in a generated document. In this specification, they will be apparently distinguished from each other when an edge or a size of a container is described with reference to the user interface 103.

A term "fixed", which defines a certain value used for restricting a display of contents, is the same for all the documents in the description below.

(1) When a width of a container is fixed, a width allocated to associated contents is the same for all the documents.

(2) When a height of a container is fixed, a height allocated to associated contents is the same for all the documents.

(3) When a distance (a length of a link) is fixed, the specified distance is restriction for all the documents.

(4) That left and right edges of a container are fixed means that a location in the horizontal direction of an edge to the page is the same for all the documents. The height or a location in the vertical direction of a container, however, may vary. For example, when the left edge of a container is fixed, the location to display the associated contents is such that the left edge of the contents is the same horizontal location for all the documents but the contents may be displayed upper part of a page in a document and lower part of a page in another document.

(5) That the upper edge and the bottom edge of a container are fixed means that the vertical location of an edge in a page is the same for all the documents. The width or the horizontal location of a container, however, may vary for each document.

(6) A vertical axis of a container is parallel to the right edge and the left edge of a container and a virtual vertical line located midway between the edges. When the vertical axis of the container is fixed, an average of horizontal locations of the left edge and the right edge of the container (i.e., the central location between the left and the right edges) is the same for all the documents. With this restriction, the width of the container may vary. The vertical axis, however, is at the same horizontal location for all documents, from a document, in which the left and right edges are located at the farthest location from the vertical axis, to a document, in which the left and right edges are located at the closest location from the vertical axis. The height and vertical location of the container is not affected by this restriction.

(7) Similarly, when a horizontal axis is fixed, an average between the upper edge and the bottom edge of the container is located at the same location in the vertical direction. The width and the horizontal location of the container, however, are not affected by this restriction.

(8) That both of a horizontal axis and a vertical axis are fixed means that the central location of the container is fixed. The width and the height of the container, however, are not affected by this restriction.

(9) When a corner location of a container, a midway location between the edges of a container or a center location of a container is fixed, each location is the same in all the documents. For example, that the upper left corner of a container is fixed means that the upper left location of the located container is the same for all the documents.

(10) A vertical edge or a vertical axis can be fixed by being associated with the left edge or the right edge of a page or the left page margin or the right page margin, or the other horizontal locations. Similarly, a horizontal edge or a horizontal axis can be fixed by being associated with the top edge or the bottom edge of a page or the top page margin or the bottom page margin or the other vertical locations.

The term contrast to "fixed" is "flexible", which means an edge, an axis, a corner, a midway location or a document restriction may vary for each document (each record). For example, a layout is expected to be dynamically changed in a page according to the size or the amount of variable data, though, a specific container may be desired to be fixed in the size or the location or in the four corners of the container at the corner of the page. For that purpose, the layout editing application 121 according to the present invention is adapted to set the edge, the axis or the midway location or the like of each container (partial area) fixed or flexible. This enables a user to create a basic layout of the document template 180 as the user desires when the user determines the basic layout.

[Display and Edition of a Container]

<<How to Create a New Container>>

The container is described in two ways; a text container and an image container. The text container has text and an embedded image. The image container only has an image.

As shown in FIG. 6, a new text container or an image container is created on a document template 309 by a user clicking the mouse 133 on a text container tool 404 or an image container tool 405 and dragging a square over the document template 309.

Alternatively, the container may be created by a user making appropriate tools 404 and 405 active and simply clicking the mouse button on the document template 309. In this case, a container of a default size is inserted in the template in response to the clicking of the mouse 133 and a dialog box or other prompts for allowing the user to set the size or the like of the new container are provided to the user.

The size of the container can be predetermined automatically or can be created, located or the like by using a calculated schema. A user can set a restriction on the container by selecting the generated container with input means such as a mouse and specifying a property by clicking the right mouse button on the container to display a property dialog of the container. The abovementioned various restrictions can be set on the property dialog UI of the container (corresponding to partial area setting means). With a property dialog of the container, a user can determine the size (width, height) or the location of the container. If a user wants to set the container to a flexible size, the user can set a basic pattern (basic size and reference location) of the container and further set the maximum container size (width, height) and the minimum container size (width, height).

[How to Display a Container (Display Part 3916)]

FIGS. 7A-7D are diagrams illustrating a rule for displaying containers in an embodiment. Specifically, diagrams in FIGS. 7A-7D exemplify rules for displaying about edges of a container.

The application 121 represent the state of an edges of a container by displaying an edge with a solid line (item 503) or a dotted line (504) as well as using an anchor (a line, a shape or an icon denoted by 506, 507 and 509 drawn near the edge), a handle (a control point drawn over or near the edge of a area to move or modify the edge, 502), a slider (short parallel lines drawn at both sides of the edge, denoted by 413 in FIG. 6), a scaling icon (505) and colors.

Rules for displaying a container shown in diagrams in FIGS. 7A-7D are shown below.

(1) Draw edges by solid lines in order to fix them.

(2) When a width is fixed, the left and right edges are drawn by solid lines.

(3) When a height is fixed, the upper and bottom edges are drawn by solid lines.

(4) Draw no axis.

(5) Scaling icons are drawn near edges which are not drawn in accordance with rules (1)-(3) with the edges being drawn by dotted lines.

(6) If both lines in the pair of a vertical line and a horizontal line or both axes in the pair of a vertical axis and a horizontal axis are fixed, an anchor is drawn at the cross-point of the lines or the axes.

(7) If no anchor is drawn at the fixed edges, a slider is drawn at the center of each of the edges.

(8) If no anchor or slider is drawn in each pair of a vertical edge and a horizontal edge or a vertical axis and a horizontal axis, a handle is drawn at the cross-point of the lines or the axes.

Lines defined by the abovementioned rules (1), (2) and (3) are drawn by solid lines as they are fixed or restricted as mentioned above. A flexible edge is drawn by dotted line according to the rule (5). The fixed point defined by rules (6), (7) and (8) displays an anchor, and some fixed edges display sliders and the others display handles.

A restriction set afterwards by a user has a priority in the abovementioned rules. That is to say, when another restriction is set afterwards and the abovementioned rules affect edges to be drawn, contents of solid lines or dotted lines will be changed.

Where a flexible edge is to be drawn depends on the contents of the container. As described later, "dynamic proofreading", which means that contents are merged with a document template and it becomes visible in a user interface, is used as described later. Alternative implementation can be used in a contents area of a container averaged for all the documents or in the other means for determining where a flexible edge will be laid out on a user interface.

These kinds of contents representation provide graphical means for displaying the state of each edge of a container. The interpretation of the representation is shown below.

(1) As an edge denoted by 410 in FIG. 6, a dotted line means that the location of an edge in a document depends on the contents of the container.

(2) A solid line means that the edge is restricted because it is fixed (edge 414) or the width and height of the container is fixed (four edges are drawn by solid lines in the container 408 with both edges fixed).

(3) An anchor means that a cross-point of edges or axes is fixed. Therefore, the anchor point will appear at the horizontal location and the vertical location for all the documents. The anchors are fixed as a matter of course. The icon 409 shown in FIG. 6 is an example of an anchor-icon, which means that the cross-point on the edge 414 is fixed.

(4) A slider means that a length of an edge associated with the slider may move in parallel even though it is fixed. For example, the slider 413 may be displayed to the left or right of the location where contents of the container 408 is displayed in a specific diagram in a document in FIG. 6. For example, if the size of an image or the amount of text for data to be inserted in the container 407, which is associated (has a link set) with the container 408, is too little, the size of the container 407 will be smaller so that the container 408 will be displayed as it is laid out after sliding to the left (moving in parallel). If the size of the container 407 is too large, the container 408 will be laid out after sliding to the right on the contrary.

Some or all of the icons and edges may or may not be drawn depending on which tool or container is selected, highlighted or activated. Generally, an edge or an icon of the container is not drawn on a printed material as it is just for helping a user in designing a document template.

As mentioned above, setting of the basic pattern of a basic value, the minimum value and the maximum value of the width and the height of the container is displayed in the secondary dialog window.

In FIG. 7A, neither of the width and height of a container 501 is fixed and they are flexible. The fixed edge 503 is shown by solid line and the flexible edge 504 is shown by dotted line. A scaling icon 505 indicates that the adjoining edge 504 is flexible. Indicators in other forms can be used in the place of or in addition to this.

In FIG. 7B, both the width and height of a container 501 is flexible. An anchor icon 506 is added to apparently represent that the location of the corner of the crossing edges 503 is fixed.

In FIG. 7C, both the width and height of a container 501 is flexible and the container 501 can be extended in each direction by an equal distance from the center shown by the given anchor icon 507. That is to say, the container 501 can be scaled up or down centering on the anchor icon 507. Scaling up/down here is adjusted in the layout to keep the location of the anchor icon 507 as the center of the container 501.

In FIG. 7D, the upper edge 508 is fixed but both the width and height are flexible for the container 501. The anchor icon 509 located and shown in the center of the upper edge 508 is fixed. The left edge and the right edge (502) of the container 501 are scaled up or down around the center axis (vertical axis) through the anchor icon 509.

[How to Set a Link]

Figure 8:
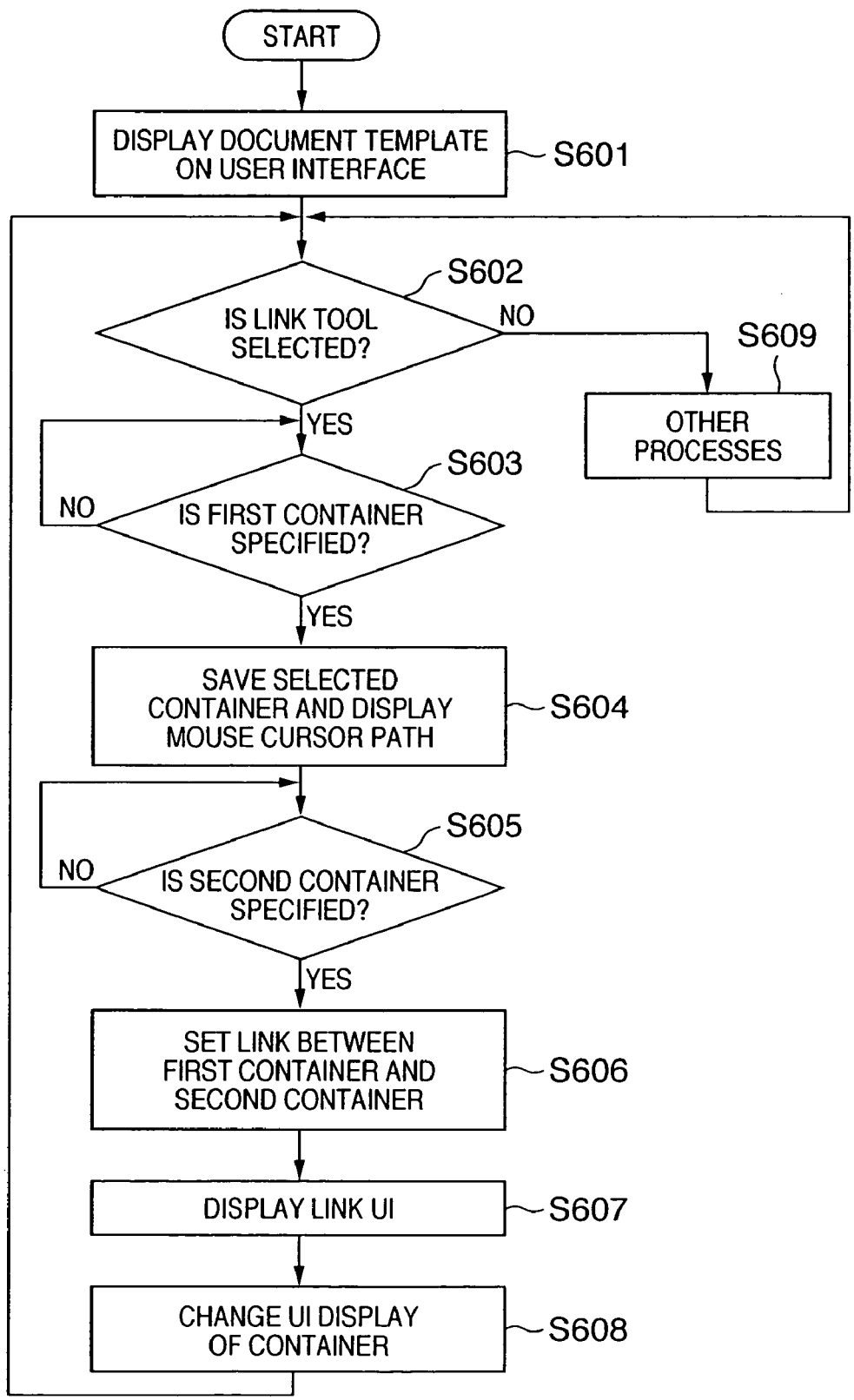
FIG. 8 is a flowchart for illustrating a way for setting a link in an embodiment.
Figure 9A:
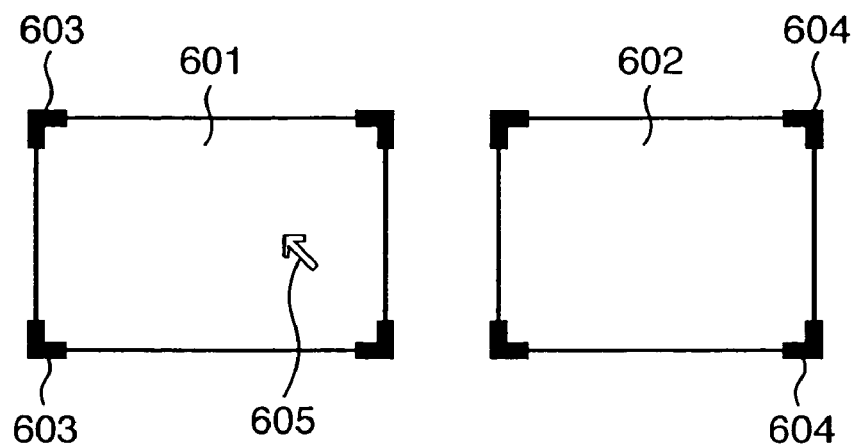
FIGS. 9A-9C are diagrams showing examples of transition of the user interface (UI) in setting a link in an embodiment.
Figure 9B:
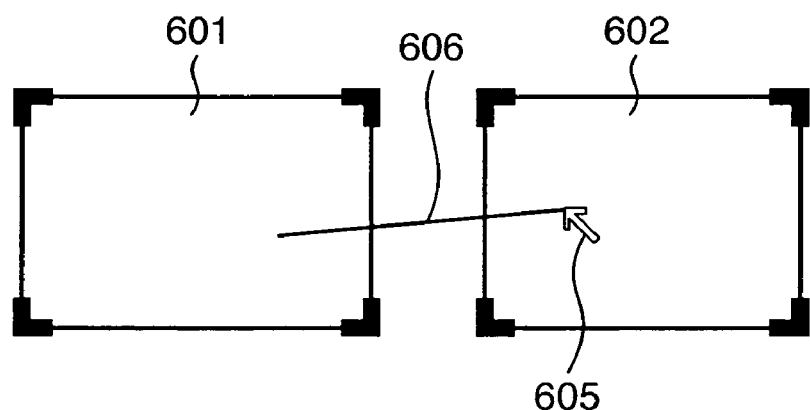
Figure 9C:
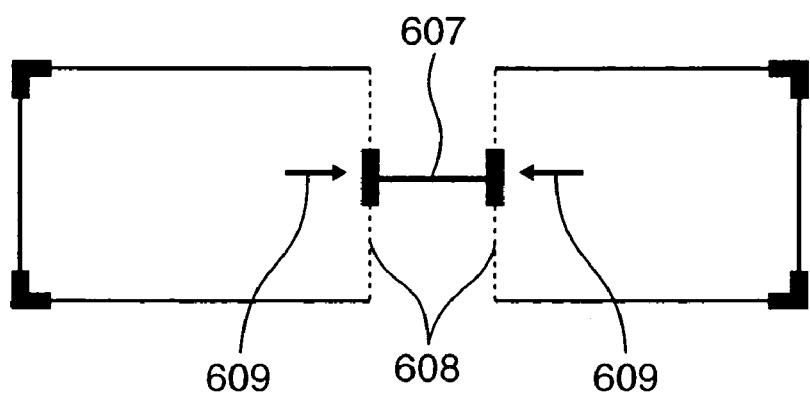

Next, setting of a link for associating containers each other will be described. FIG. 8 is a flowchart for illustrating a way for setting a link in an embodiment. FIGS. 9A-9C are diagrams for showing examples of transition of the user interface (UI) in setting a link in an embodiment. How to set a link between containers will be described below with reference to FIGS. 8 and 9A-9C.

First, the layout editing application 121 displays a document template selected to be edited on a work area 306 of a user interface screen (step S601). In order to set a link, (at least two) containers for setting a link need to be created on a document template. Diagrams in FIGS. 9A-9C show examples of transition of the user interface when two containers are created and a link is set at step S1601.

Next, the layout editing application 121 determines whether the abovementioned link tool is in the selection state (it enters in the selection state when a user clicks the button 406 in FIG. 6 on it) (step S602). When the link tool is not in the selection state (No), various other processes are performed as required (step S609), then the operation returns to step S602.

In FIG. 9A, the containers 601 and 602 are considered as formed by fixed edges only. The reference numbers 603 and 604 denote the same as that denoted by 409 in FIG. 6, indicating an anchor. The reference number 605 denotes a mouse pointer. While the link tool is in the selection state, a user selects one of two containers (for example, container 601) for setting a link by clicking the mouse button on it.

In response to this operation, the user interface 103 of the layout editing application 121 recognizes that a first container is specified (step S603) and saves the information specifying the selected container. The user interface 103 also makes a subsequent mouse cursor path displayed on a screen in accordance with its movement (step S604). For example, a line 606 in FIG. 9B indicates a line connecting the location clicked in the state FIG. 9A and the current location of mouse cursor. This UI can indicate to the user where the link will be set.

Next, the user moves a mouse pointer to the other container (for example, container 602) as shown in FIG. 9B and clicks the mouse button on it. In response to this operation, the user interface 103 recognizes that a second container is specified (step S605). Then the layout editing application 121 sets a link between the first container saved at step S604 and the second container whose specification is recognized at step S605 (step S606).

When a link is set between two containers 601 and 602 selected by the user in this manner, a link UI 607 is displayed (step S607). In response to this link setting, the display state of the container becomes that of FIG. 9C (step S608). That is to say, the UI of the container is automatically changed according to the link setting. The edges associated by the link are flexible here, indicated by dotted lines. In FIG. 9C, the reference number 608 denotes an edge indicated by dotted line, representing a flexible edge as described above.

The change in the state of an edge of a container as shown in FIG. 9C is automatically performed when the link setting requires the edge of the container to be flexible. This change is made so as not to cause the contradiction that all the edges are fixed though the links are set. The reference number 609 denotes a mark visually indicated to a user a direction in which the container may be changed due to the link set, same as the reference number 505 in FIG. 7. In the example of FIG. 9C, the right edge of the left container and the left edge of the right container changed into the flexible state, though, this is merely an example and the right container may change into a setting with a slider denoted by 413 in FIG. 6.

The layout edition of a document template by using the user interface 103 has been described. Adjustment of the container layout in accordance with data size (drawing size) will be described below for the case that a data source is inserted into each container.

<Layout Calculation by a Layout Engine>

[How to Calculate a Layout (Entire Flow)]

The layout editing application according to the embodiment is divided into two modes; a layout mode for creating a layout by creating containers by using the user interface 103 and associating between the containers (setting a link), and a preview mode for previewing a result of layout after a record is actually inserted by inserting each record of a data source into the layout created by the layout engine 105. In the preview mode, an actual record is inserted and the layout is calculated according to the abovementioned priority order, though the preview mode is for calculating a layout on a display. When the record is actually printed, the layout engine 105 also calculates the layout by inserting data into each container, though the calculation is performed in the same manner as that in the preview mode.

Figure 10:
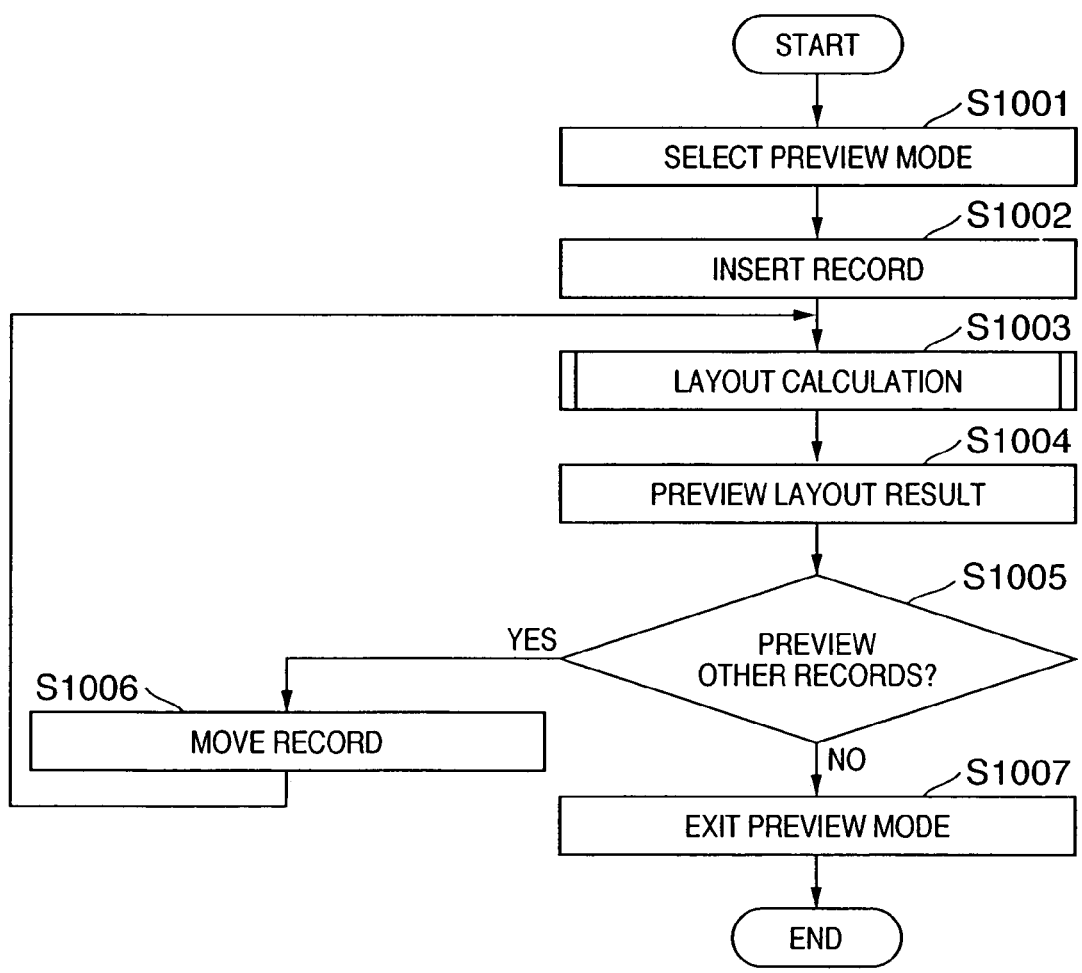
FIG. 10 is a flowchart for illustrating a layout calculation processing procedure by a layout engine of an embodiment of the present invention.

FIG. 10 is a flowchart for illustrating a layout calculation processing procedure by a layout engine of an embodiment of the present invention. First, a preview mode is selected (step S1001). When the preview mode is entered, the layout editing application 121 makes the user to select a record to preview from the data source and determines that each field data of the selected record is to be inserted into each container (step S1002).

When a field data is determined to be inserted into each container, the layout editing application 121 calculates for laying out the record and adjusts the layout as required (step S1003). Details of the layout calculation at step S1003 will be described later. The layout editing application 121 displays the layout calculated at step S1003 (step S1004).

The layout editing application 121 determines whether the other records will be previewed or not on the basis of the instruction from the user (S1005). If it is determined that the other records need not to be previewed at step S1005, the layout editing application 121 exits the preview mode (S1007). If it is determined that the other records is to be previewed, the layout editing application 121 selects another record, calculates the layout again and preview the record (step S1006).

In order to print the record instead of in the preview mode, the layout is calculated for all the records to be printed in order. Therefore, step S1004 does not present and determination is made about whether all the records to be printed are processed at step S1005. At step S1003, the result of layout calculation is outputted in the manner of drawing, generated as print data by using a printer driver and the print data is outputted to a printer. In this case, the processing described here finishes when the print data has been outputted for all the records (all the records specified to be printed).

[How to Calculate a Layout (in Detail)]

Figure 11:
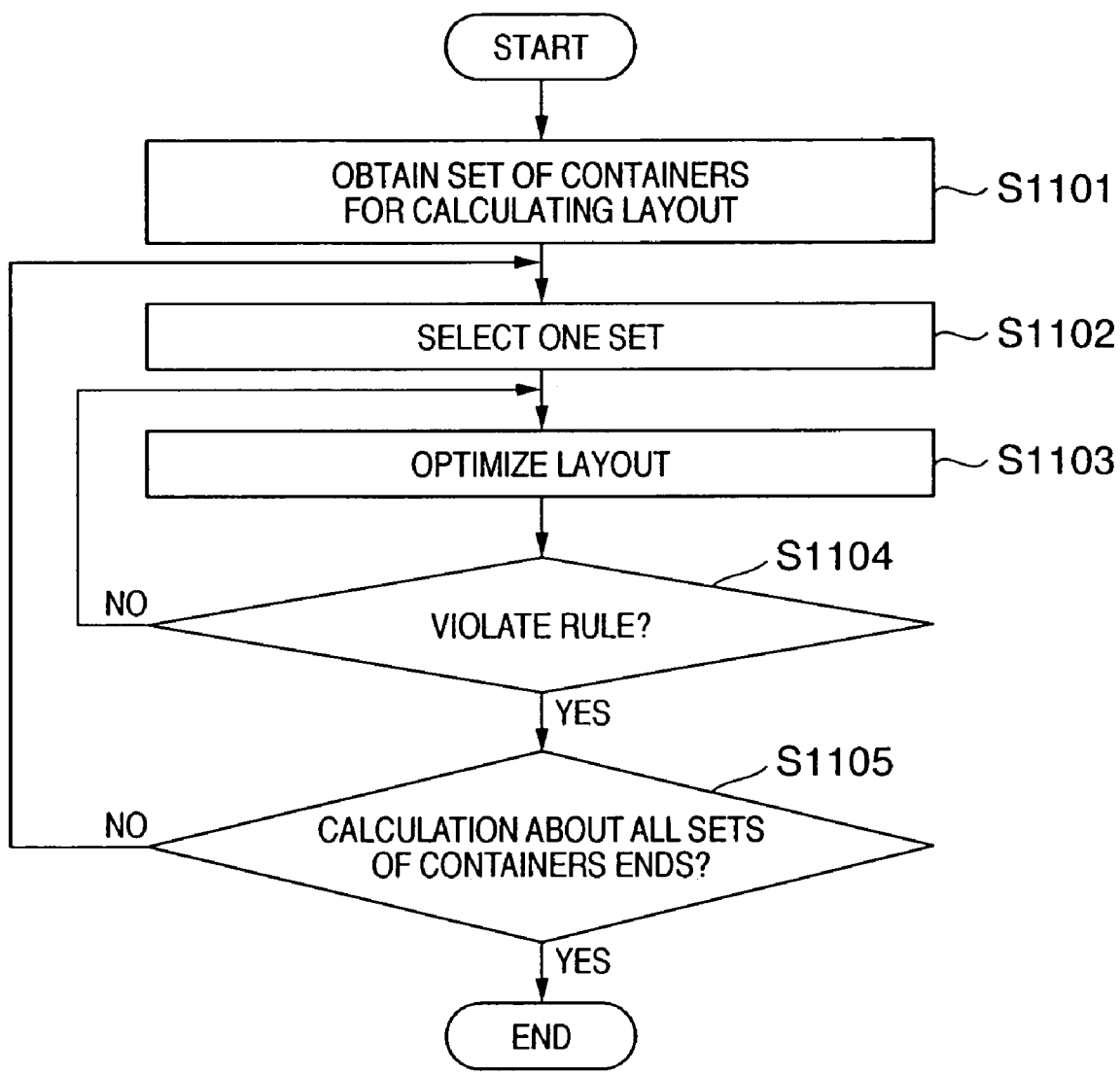
FIG. 11 is a flowchart showing a layout calculating way when the priority order for the layout according to an embodiment is not set.

Next, details of the calculation of a layout performed at the abovementioned step S1003 will be described. FIG. 11 is a flowchart showing a layout calculating way when the priority order for the layout according to the embodiment is not set. As this figure is a flowchart for illustrating only a layout calculating way, it corresponds to the layout calculating way in printing/previewing a record of a variable data print. For a plurality of records, the processes to be described below are repeated.

Figure 12:
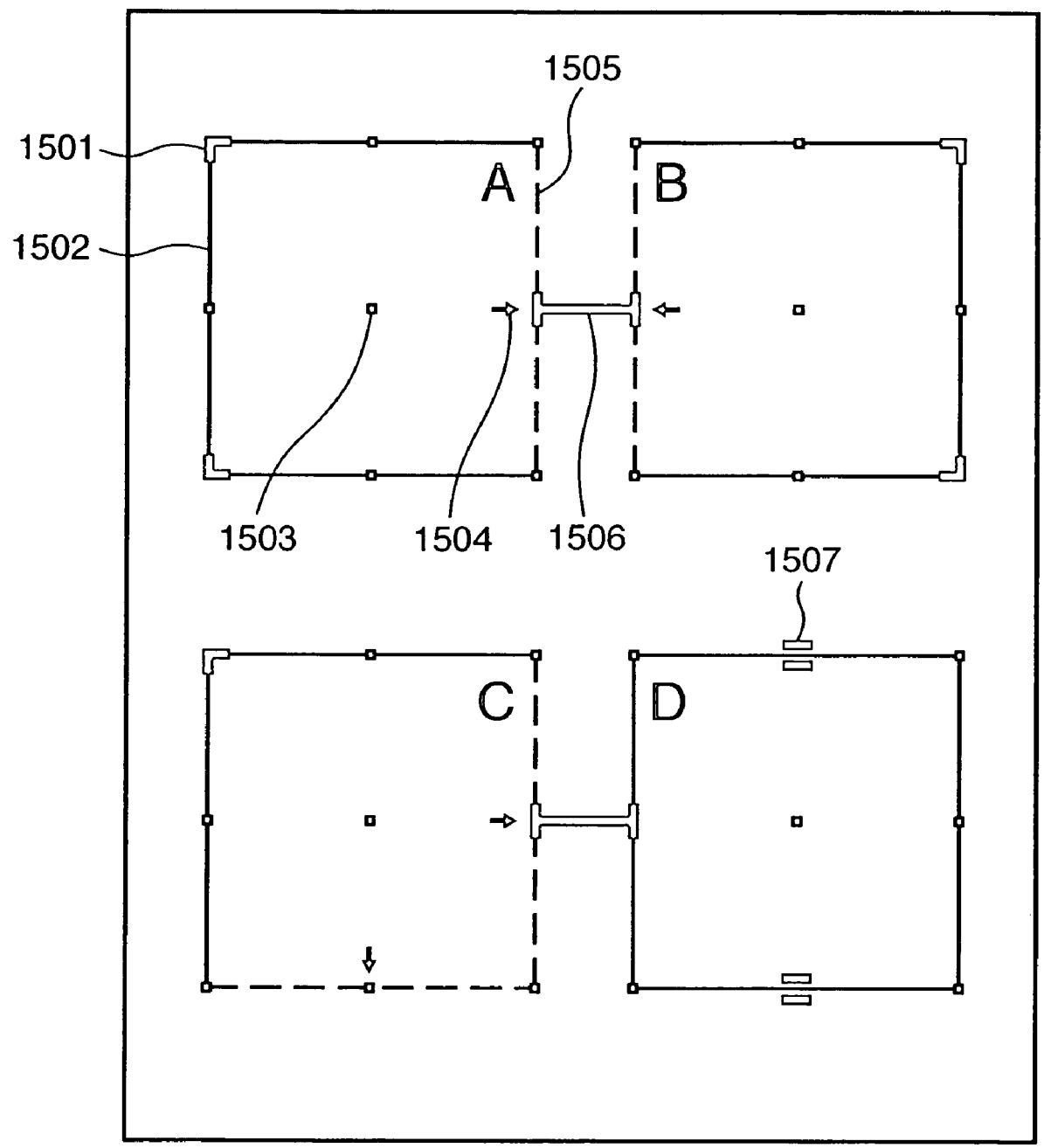
FIG. 12 is a diagram for illustrating a set of containers at calculating a layout of an embodiment of the present invention.

First, the layout editing application 121 obtains a set of containers for calculating a layout (step S1101). The layout calculation calculates the associated containers as a set. FIG. 12 is a diagram for illustrating a set of containers at calculating a layout of an embodiment of the present invention.

For example, with reference to FIG. 12, four containers are laid out on a page, with association being set for each container. In this case, container A and container B, and container C and container D are associated with each other by links. Therefore, the containers A and B are in a set 1, and the containers C and D are in a set 2. That is to say, a group of containers connected by link is specified as a set. As mentioned above, the reference number 1501 denotes an anchor, 1502 denotes a fixed edge, 1503 denotes a controller, 1504 denotes an arrow indicating the direction, in which a flexible edge moves, 1505 denotes a flexible edge, 1506 denotes a link and 1507 denotes a slider.

Next, the layout editing application 121 selects a set from the sets of containers obtained at step S1101 for calculating a layout (step S1102). Then, it calculates a layout for a selected set of containers. First, for two containers (A, B), which is flexible elements included in the selected set of containers, the size of each container without restriction from the size of image or the amount of text of data to be inserted is calculated. Specifically, the layout editing application 121 determines whether the container A is a container for image data or for a container for text. This determination is performed on the basis of the attribute which is set for a container as mentioned above.

Next, the layout editing application 121 reads data inserted into the container A. When the container A is a container for image data, it calculates the size of the image data (the number of pixels for width and height, and resolution) without restricted by the container A. When the container A is a container for text, the application can calculate the amount of data to be inserted into the container A on the basis of the number of characters and the attributes of the characters such as a font type, a font size, character pitch and a line pitch specified as container attributes of the container A for the text data as well. In the case of the container for text, as the aspect ratio of the container A cannot be determined without considering restriction, the restriction will be taken into account.

In the example shown in FIG. 12, as anchors are set at the upper left and the lower left of the container A, the height (in a vertical direction) of the container A is fixed. Therefore, the layout editing application 121 determines whether the characters of calculated amount of data (the amount of text) can be inserted into the container A with the width (in a horizontal direction) set as a basic pattern for the container A or not. If it is determined that all the characters can be inserted, the container A does not change in size (width, height) set as a basic pattern. If it is determined that not all the characters can be inserted, the container A extends in the horizontal direction as the height is fixed by the anchor setting. The layout editing application 121 calculates the size of the container A by calculating the width of the container A for receiving the characters of calculated amount of data (calculation part 3902).

Next, the layout editing application 121 optimizes the layout so that the size of the container to be laid out differs from the actual size of the contents as little as possible (S1103: adjustment part 3903). The optimization of a layout is performed so that the size of contents to be inserted differs from the size of contents to be laid out as little as possible in a container which is associated to allow the size to be dynamically changed.

The layout editing application 121 obtains the size of a set of containers calculated at step S1102, i.e., the total size of the container A and the container B and the link 1506 (it is a fixed link here), and obtains the difference between the total size and the size of a set of the containers in the basic layout (In the example of FIG. 12, this corresponds to a distance between the anchor icons in the container A and the container B). If the width of the container A or the container B is calculated to be large at the previous step, the difference value occurs. The layout editing application 121 adjusts the layout by dividing the difference value equally among elements of a set of containers.

The layout editing application 121 optimizes the layout. If the layout violates the rule, the application calculates the layout again not to violate the rule (S1104). The rule described here is a limit set by a user in creating a layout, including a limit on the flexible area for the size or the location of the container. In the case of a flexible link, the limit includes a limit on the variation of length of the link. When the layout is calculated not to violate the rule, the layout for the set completes. The layout editing application 121 performs processes from step S1102 to S1104 on all the sets on the page and calculates the layout for the entire page (S1105).

Figure 13A:
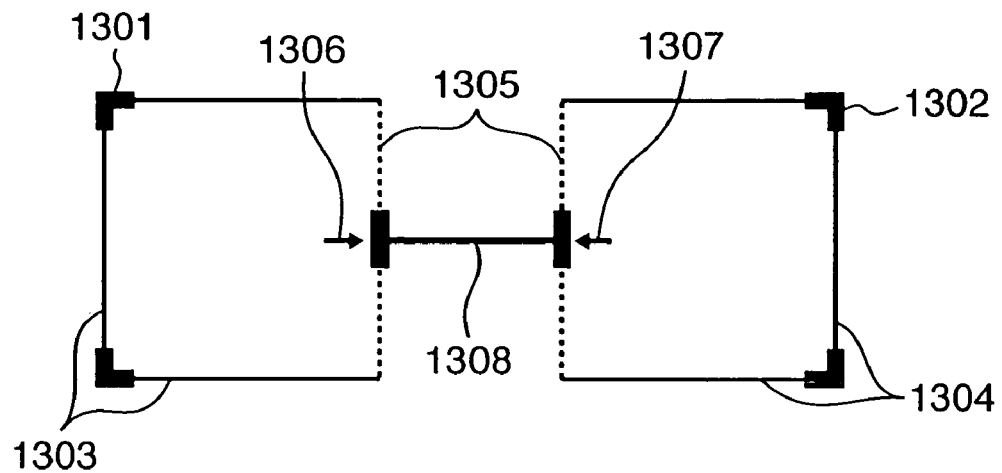
FIGS. 13A-13C are diagrams showing an example of display of a UI when the priority order for a layout according to an embodiment is not set.
Figure 13B:
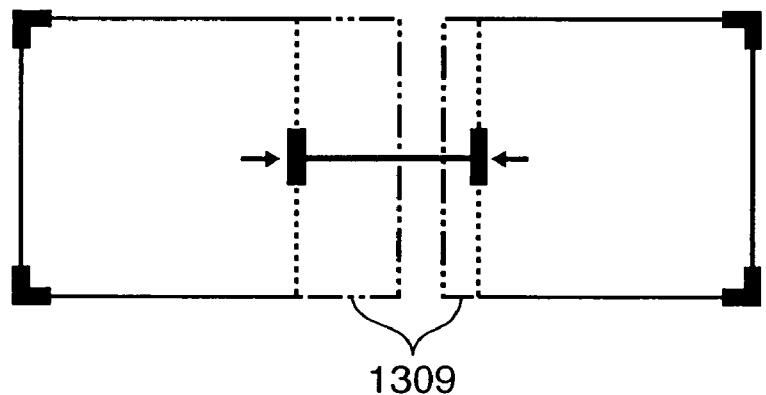
Figure 13C:
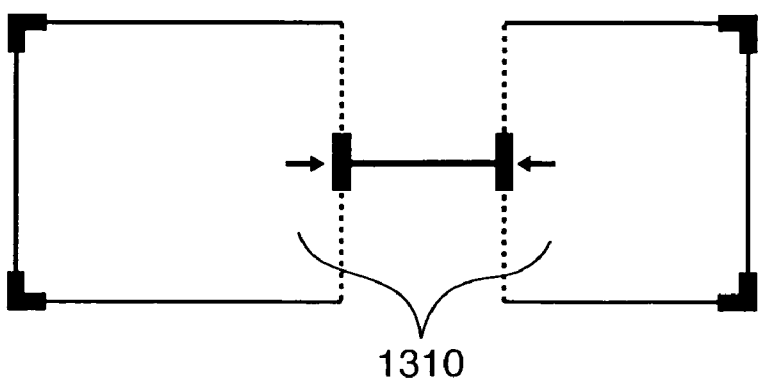

FIGS. 13A-13C are diagrams showing an example of display of a UI when the priority order for a layout according to an embodiment is not set.

FIG. 13A represents the state where a certain record is inserted and the layout is determined. The reference numbers 1301 and 1302 denote anchors, 1303 and 1304 denote fixed edges, 1305 denotes a flexible edge, 1306 denotes an arrow indicating a direction, in which a flexible edge moves and 1308 denotes a link, respectively. In this state, a record is changed and contents with different sizes are inserted.

FIG. 13B represents a size of the new contents added to the state of FIG. 13A. The reference number 1309 denotes the sizes of contents inserted into respective containers. Then the layout is calculated. FIG. 13C represents the result of the layout calculation. The size of each container after the calculation is calculated so as to have the same difference as that for the size of the actual contents to be inserted and so as not to violate the abovementioned rule. As shown in FIG. 13C, the contents size to be inserted as shown in FIG. 13B (1309) and the contents size after the calculation (1310) have the same difference respectively.

Next, an effect of a flexible link when the data to be inserted into a container is an image will be described with reference to FIGS. 14 and 15.

[Setting of a Link with a Flexible Length]

FIG. 14 is a diagram showing an example of display of a user interface when a container is located according to a flexible link. Similar to FIG. 6, FIG. 14 includes an application window 301 and a tool bar 303. In the state of FIG. 14, a container 1203 and a container 1204 are on the document template 309. Each container includes an anchor icon 1201, an edge 1205 fixed to the anchor icon 1202 and an edge 1206. A flexible size sized link 1209 is present between the containers 1203 and 1204, connecting the container 1203 and the container 1204. As a link is set between the container 1203 and the container 1204, a right edge 1207 and a left edge 1208 of the respective containers are represented by dotted lines. Thus, an indicator 1210 and an indicator 1211 are shown in respective containers, indicating the edge 1207 and the edge 1208 are flexible, respectively.

Figure 15:
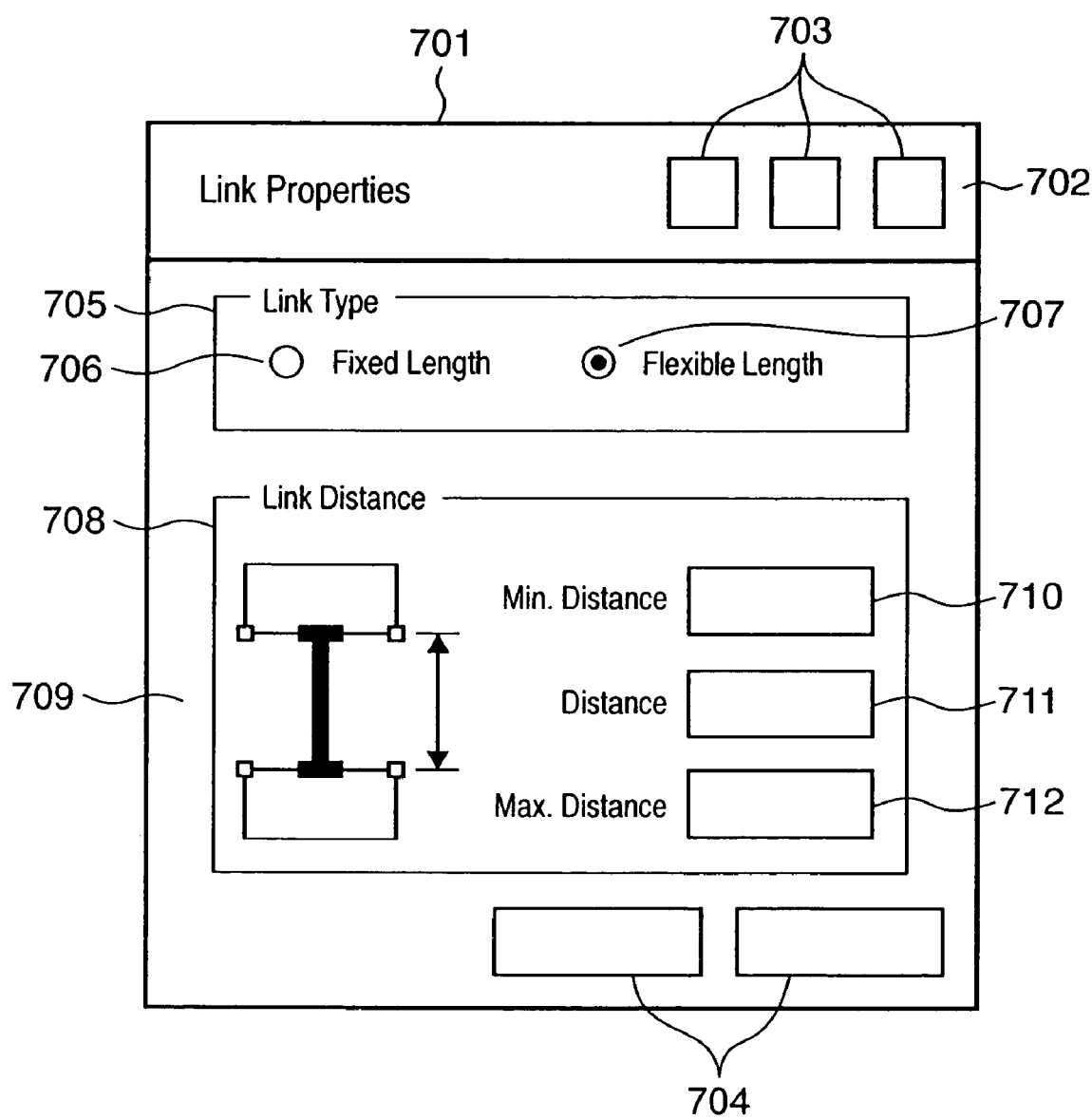
FIG. 15 is a diagram showing a dialog window for setting a link according to an embodiment.

FIG. 15 is a diagram showing a dialog window for setting a link according to an embodiment. FIG. 15 is a user interface screen in a link setting means, which is a characteristic configuration of the present invention, and an example of a dialog window 701 for setting information on the link 1209 (link setting part 3906). The dialog includes a title bar 702, a tool button 703, a button for opening and closing the dialog window 704 and an area 709 for setting various types of information.

In the dialog window, the link type can be alternatively selected between a link with a flexible length (707) and a link with a fixed length (706). If the link type is flexible, the minimum value for the length of the link (Min.Distance710), the maximum value (Max.Distance712) and the reference value (Distance711) can be set.

The dialog 701 shown in FIG. 15 is displayed when a link between two containers are set by a setting operation of the link described in FIGS. 8 and 9, for example, and the set link is selected with an operation such as clicking the mouse button on it. Alternatively, the dialog window 701 with respect to the link may be adapted to automatically appear just after setting of a link. The reference value 711 between respective containers is a length of the link used when the size of each container does not change as data is inserted.

Figure 16:
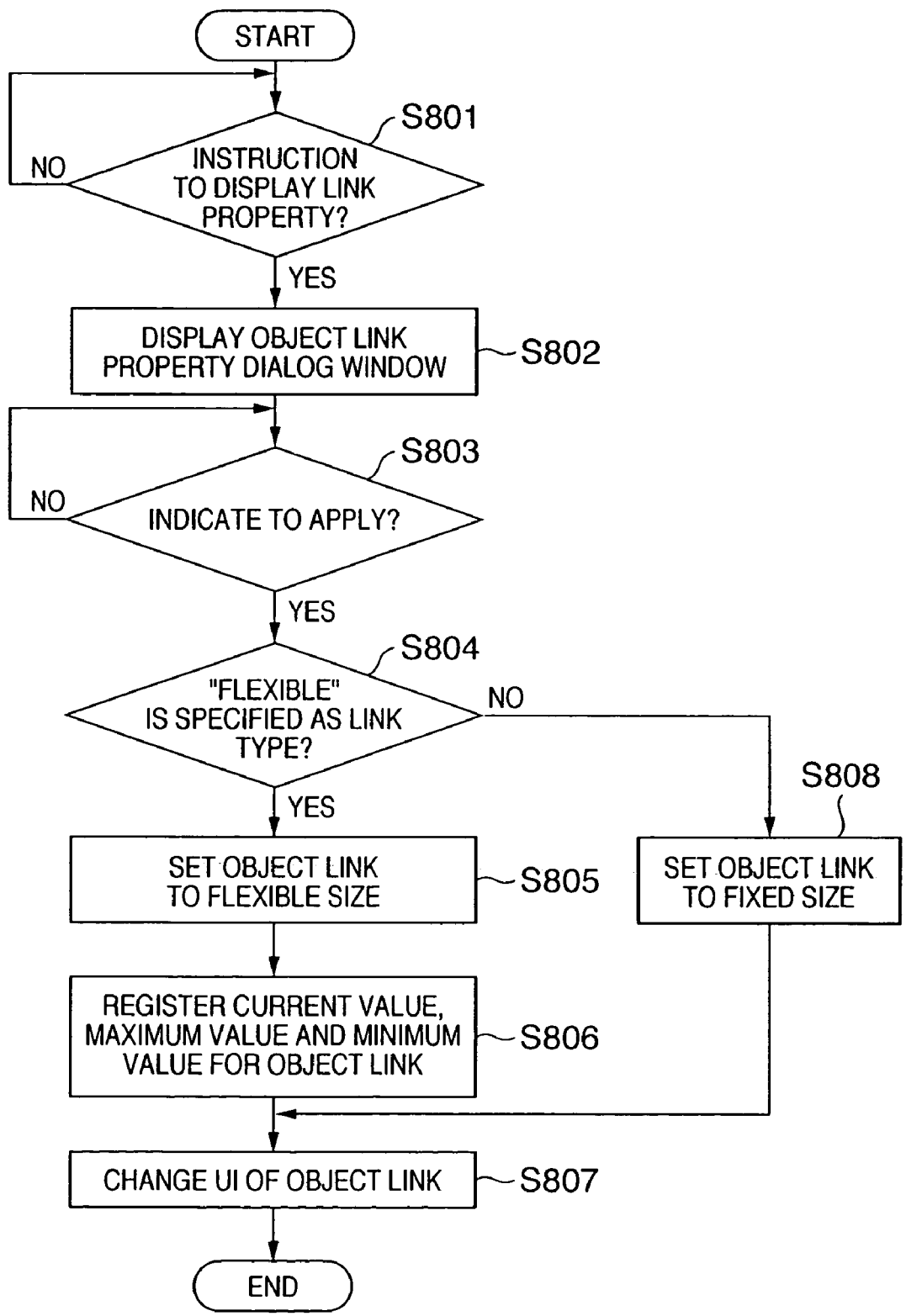
FIG. 16 is a flowchart for illustrating a processing procedure for setting a flexible link via a user interface 103 of an embodiment.

FIG. 16 is a flowchart for illustrating a processing procedure for setting a flexible link by a user interface 103 of an embodiment. For example, if a link is made between the container A and the container B of FIG. 12 in the manner described in FIGS. 8 and 9, a link with a fixed size is made first. Then the link is selected and the processes shown in FIG. 16 are performed on it, the link can be transited from the state of the fixed sized link 1506 (FIG. 12) to the state of the various sized link 1209 (FIG. 14).

When a desired link (for example, the link 1506) is made into the selected state with a mouse and a predetermined operation for displaying a link property is performed on the link, the user interface 103 of the layout editing application 121 recognizes it as an input of an instruction to display the link property (step S801). When the user interface 103 recognizes the instruction to display the link property, the property dialog window 701 (FIG. 15) corresponding to the link in the selected state (hereinafter referred to as "object link") is displayed. Then, the user interface 103 displays the link property (step S802). A link can be selected by any operation such as the right click on the mouse or an operation of a specific key on a keyboard, as in setting a basic pattern of a container.

On the dialog window 701 displayed at step S802, the current state of the selected link is displayed. In the embodiment, as the link 1506 is selected, the link size is fixed at this stage and Fixed Length 706 indicating a fixed length is selected in Link Type 705.

In order to change a link from a fixed size to a flexible size in the dialog window 701, Flexible Length 707 for setting the link size to flexible in Link Type 705. This enables Max.Distance712, Min.Distance710 and Distance711 located in Link Distance 708, allowing a user to set numerical values. In order to set a flexible size for the link, the user sets the maximum value of the length of the link to Max.Distance712, the minimum value to Min.Distance710 and the current value to Distance711.

After the setting, the user indicates to apply the setting with a general dialog window opening/closing button 704. When the user interface 103 detects this indication, it proceeds from step S803 to step S804 to make the object link reflect the abovementioned setting state.

That is to say, the layout editing application 121 first determines whether the object link has a fixed size or a flexible size at step S804. If a fixed size is specified, it proceeds to step S808, where the object link is set to "fixed size" and a display state of the object link is changed to "solid line" representing that it is a "fixed link" at step S807.

On the other hand, if a flexible size is specified at step S804, the layout editing application 121 proceeds to step S805, where the application sets the object link to "flexible size". At step S806, the application registers the current value (reference value), the maximum value and the minimum value of the object link set through the abovementioned dialog window 701. At step S807, a display state of the object link is changed to "dotted line" representing that it is a "flexible link". As a result, UI display of the link changes to a state shown by the link 1209 in FIG. 14. The setting information on the abovementioned dialog window 701 is stored in memory.

For the current value to be set for Distance711, a distance between containers located in the current layout may be automatically input as a default value.

Figure 17:
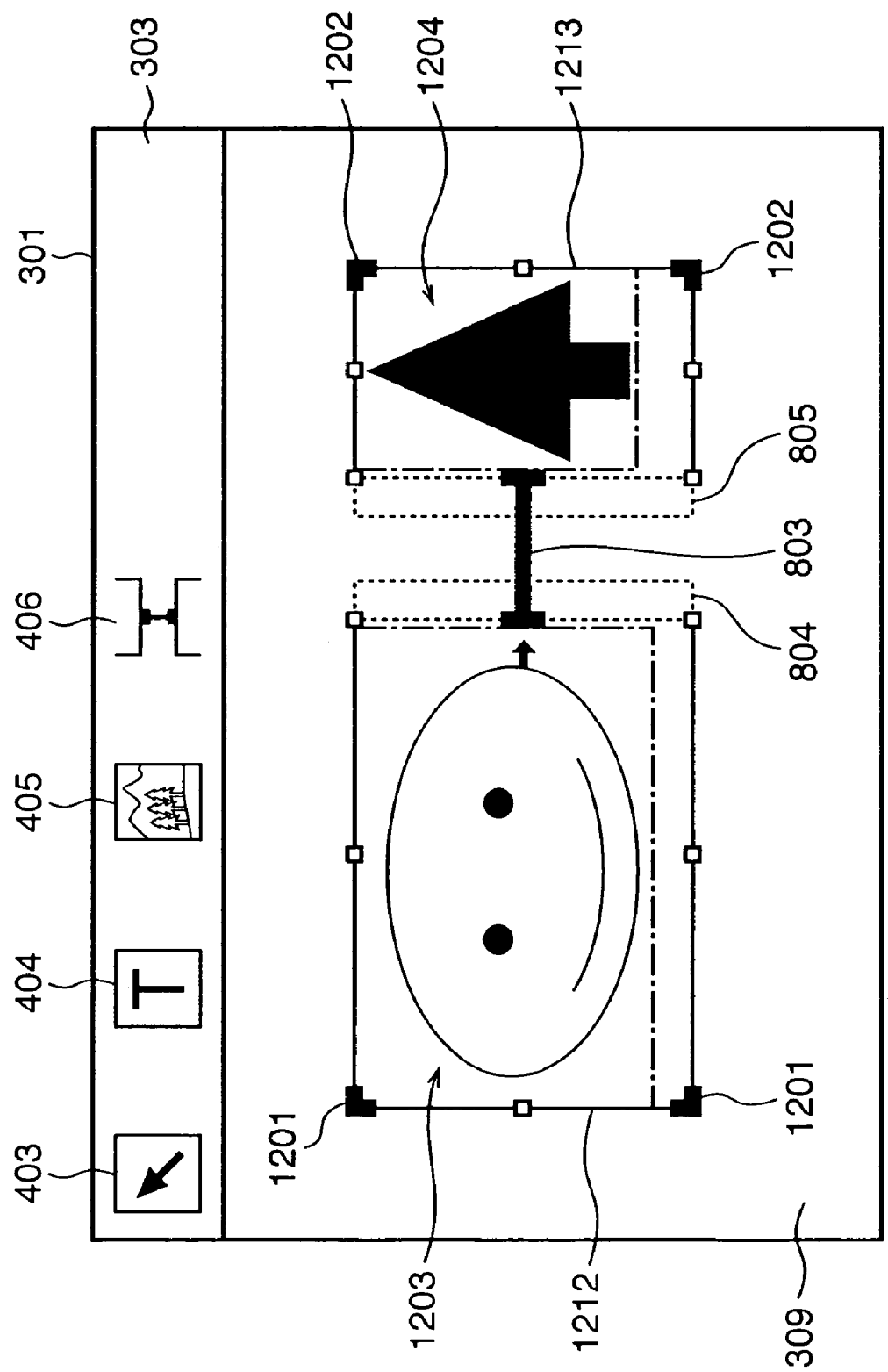
FIG. 17 is a diagram showing a layout resulting from a use of a fixed sized link.

FIG. 17 is a diagram showing a layout resulting from a use of a fixed sized link. The layout calculation is performed according to the abovementioned procedure. For example, image data with different sizes are considered to be inserted in the container 1203 and the container 1204, respectively, in FIG. 14. In this case, each container considers the size of data optimal. The container 1203 is going to expand rightward to fit in a frame 804 in order to be an inserted image size (optimal container size), and the container 1204 is going to expand leftward to fit in a frame 805 in order to be an inserted image size (optimal container size).

The container 1203 and the container 1204 cannot move their left edge 1212 and the right edge 1213 due to the anchor 1201 and the anchor 1202, respectively. In order to change the size as mentioned above, the distance between the containers needs to be shorter. As the fixed sized link 803 is set between the containers, however, and the length is kept while the layout is calculated, the sizes of the container 1203 and the container 1204 will be changed.

As a result, the container 1203 and the container 1204 are unable to reserve an optimal size for an aspect ratio of the data. Finally, the containers become smaller than the optimal sizes (frame 804, frame 805) as shown in FIG. 17. That is to say, as the size of the link 803 is fixed, the container 801 and the container 802 are unable to achieve their optimal sizes (In FIG. 17, a area defined by chained lines in each container is an aspect ratio for the data).

Figure 18:
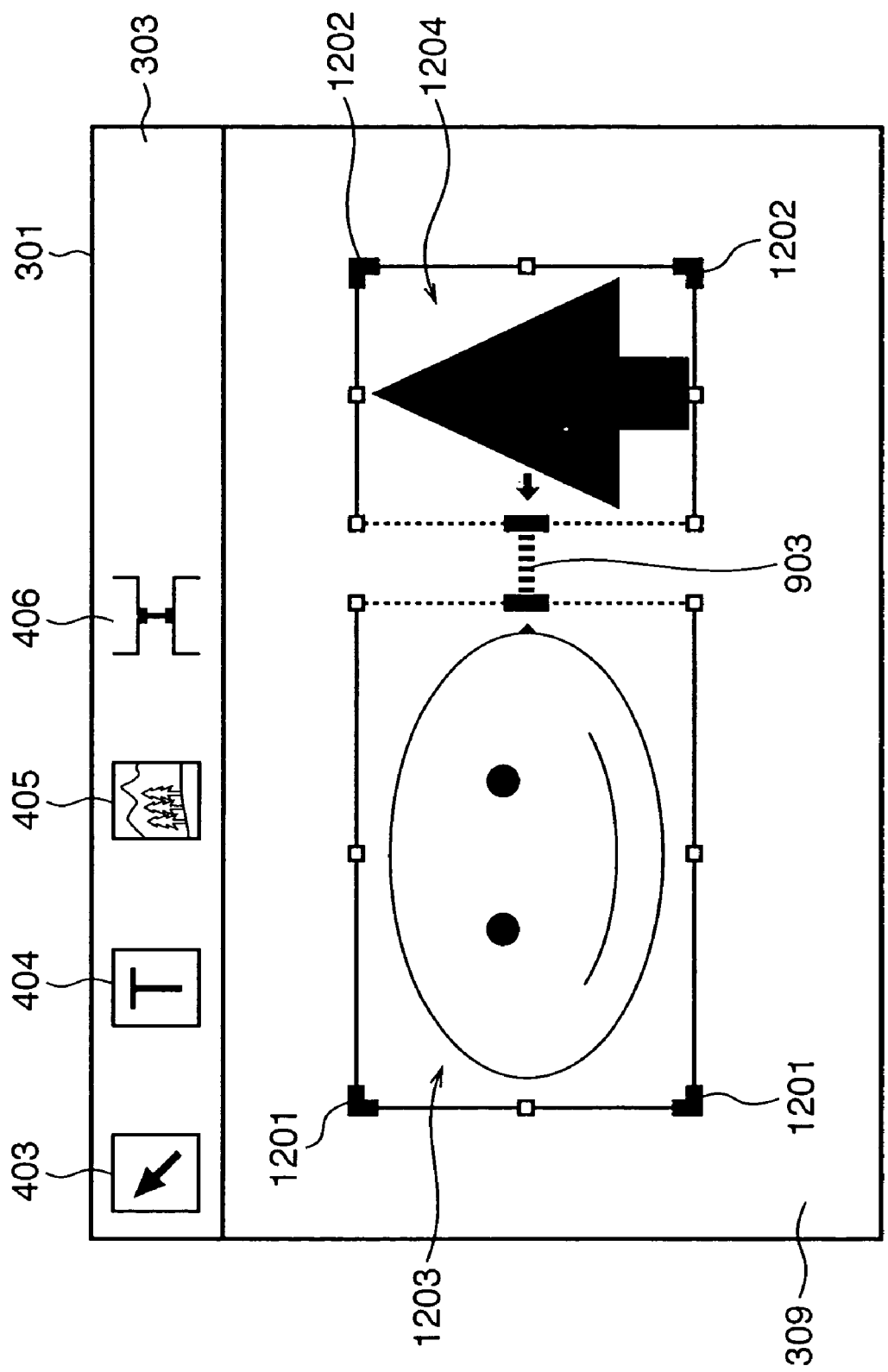
FIG. 18 is a diagram showing a layout resulting from a use of a flexible sized link.

On the other hand, FIG. 18 is showing a layout resulting from a use of a flexible sized link. That is to say, the figure shows the case where the link is set to flexible size in the same state as that of FIG. 17. In this case, a flexible sized link is set between the container 1203 and the container 1204 as shown in the figure in the above example. Therefore, when the sizes of the container 1203 and the container 1204 are changed, the sizes of the container 1203 and the container 1204 can be increased than those in the example of FIG. 17 by reducing the link size.

As a result, an optimal size for the data size to be inserted can be achieved, or frames of the containers can be set closer to the inserted data size (optimal size). FIG. 18 shows the result. As a result of the layout calculation, the flexible link 1209 will be in the size state as shown by the flexible link 903. In this case, the container 1203 and the container 1204 are in optimal sizes (sizes corresponding to sizes of data), respectively.

<Outline of a Document Processing System>

The document processing system according to an embodiment will be outlined with reference to the drawings. The document processing system according to the embodiment provides functions of editing an electronic manuscript file with a bookbinding application by an electronic manuscript writer converting a data file created by a general application into the electronic manuscript file. In the embodiment, the functions are shown separately for clarity, such as a general application, an electronic manuscript writer, a bookbinding application and an electronic manuscript de-spooler, though, a package provided for a user is not limited to the separations separation and may be provided as an application or a graphic engine with combining the functions.

Figure 19:
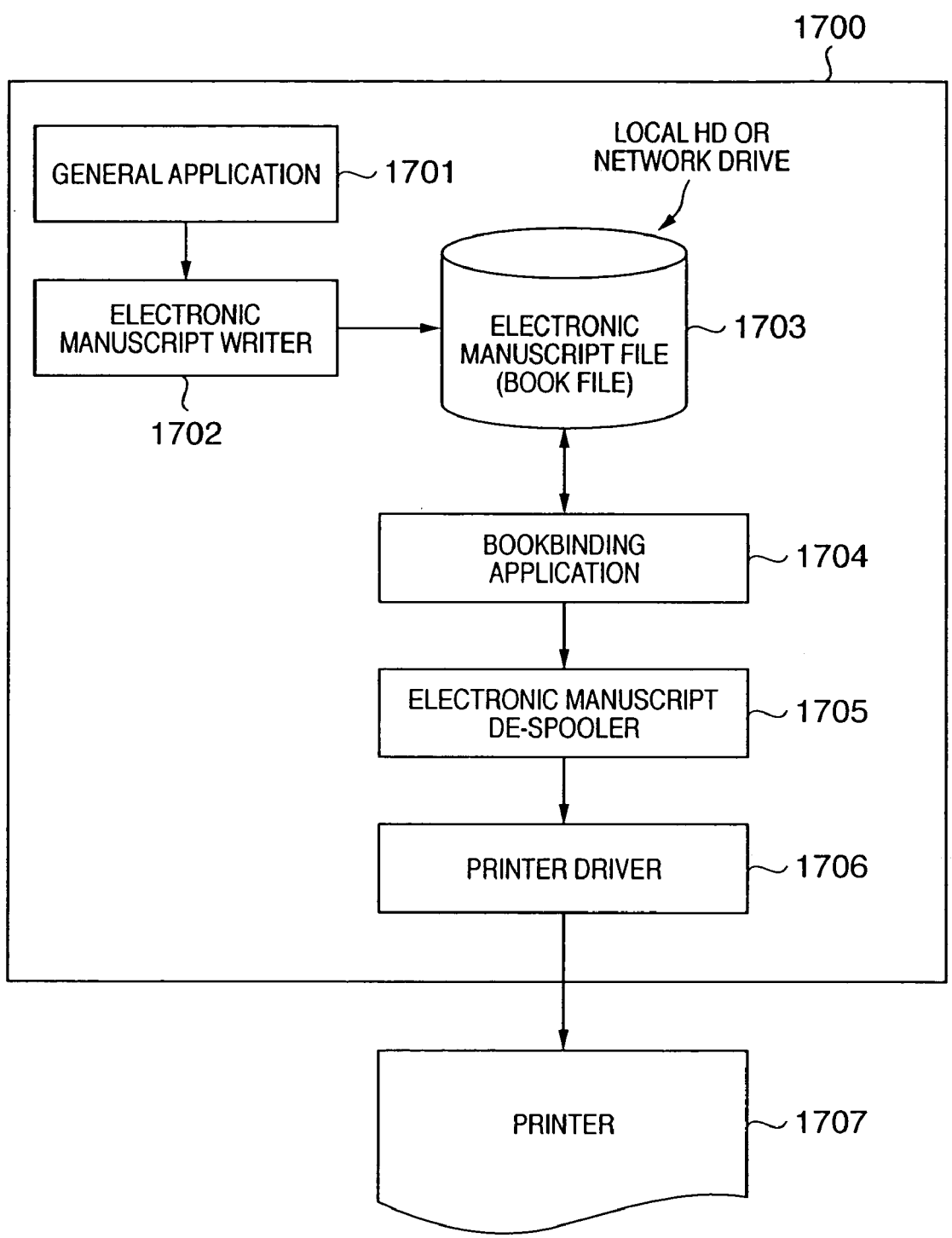
FIG. 19 is a block diagram showing a software configuration of a document processing system according to an embodiment of the present invention.

FIG. 19 is a block diagram showing a software configuration of a document processing system according to an embodiment of the present invention. As shown in FIG. 19, the document processing system according to the embodiment is achieved by a digital computer 1700 (hereinafter also referred to as "host computer"), which is a preferable embodiment of the document processing unit (information processing unit) according to the embodiment. A general application 1701 is an application program for providing functions of word processing or a spread sheet, photo retouch, draw or paint, presentation, text edition and the like, and has a printing function for the OS.

The applications use a predetermined interface (generally referred to "GDI") provided by an operating system (OS) to print application data including the created document data or image data or the like. That is to say, the application 101 sends a predetermined output command (referred to as GDI function) in a form depending on the OS to an output module of the OS, which provides the abovementioned interface, in order to print the created data.

The output module received the output command converts the command into a form which can be processed by an output device such as a printer, and outputs the converted command (referred to as DDI function). As the form which can be processed by an output device varies for device types, manufacturers and models, a device driver is provided for each device. An OS converts a command by using the device driver, generates print data, and outputs the data in JL (Job Language) to generate a pint job. When Windows (registered trademark) from Microsoft Co., Ltd. is used as an OS, a module called GDI (Graphic Device Interface) corresponds to the abovementioned output module.

The electronic manuscript writer 1702 is what the abovementioned device driver is improved and a software module to be provided for achieving the document processing system. The electronic manuscript writer 1702, however, does not intend to a specific output device and converts the output command into a form which can be processed by a bookbinding application 1704 or a printer driver 1706 to be described later. The form after the conversion by the electronic manuscript writer 1702 (hereinafter referred to as "electronic manuscript form") may be any form which at least can represent a manuscript in a detailed form by page. Among virtual standard forms, the PDF form from Adobe systems or the SVG form can be used as an electronic manuscript form.

When the electronic manuscript writer 1702 is used by the general application 1701, the electronic manuscript writer 1702 is specified as a device driver to be used for outputting before printing. An electronic manuscript file as is created by the electronic manuscript writer 1702, however, does not have a complete form as an electronic manuscript file. Therefore, the bookbinding application 1704 specifies the electronic manuscript writer 1702 as a device driver and controls conversion of application data into an electronic manuscript file.

The bookbinding application 1704 completes a new incomplete electronic manuscript file generated by the electronic manuscript writer 1702 as an electronic manuscript file with a form to be described later. When the files need to be distinguished hereinafter, the file created by the electronic manuscript writer 1702 is referred to as electronic manuscript file, and the electronic manuscript file whose structure is given by the bookbinding application is referred to as book file. When the files need not to be distinguished in particular, a document file, an electronic manuscript file and a book file generated by an application are called document file (document data).

By specifying the electronic manuscript writer 1702 as a device driver and having the general application 1701 print the data, the application data is converted into an electronic manuscript form in which a page defined by the application 1701 (hereinafter referred to as "logical page" or "manuscript page") will be a unit, and the stored in a storage medium such as a hard disk as an electronic manuscript file 1703. The hard disk may be a local drive provided for a computer implementing the document processing system according to the embodiment or may be a drive provided on a network when the system is connected with the network.

The bookbinding application 1704 provides functions for a user to read in and edit an electronic manuscript file or a book file 1703. The bookbinding application 1704, however, does not provide a function for editing contents of each page and provides a function for editing a structure of "chapter" or "book" to be described later, which has a page as the minimum unit.

In order to print the book file 1703 edited by the bookbinding application 1704, the bookbinding application 1704 starts an electronic manuscript de-spooler 1705. The electronic manuscript de-spooler 1705 is a program module to be installed in a computer along with the bookbinding application 1704, and a module to be used for outputting drawing data to a printer driver when a document (book file) to be used by the bookbinding application 1704 is printed.

In order to read a specified book file out from a hard disk and print each page in a form described in the book file, the electronic manuscript de-spooler 1705 generates an output command suitable for the output module of the abovementioned OS and outputs the command to an output module (not shown). In the case, a printer driver 1706 for a printer 1707 to be used as an output device is specified as a device driver.

The output module converts the output command received by using the specified printer driver for the printer 1707 into a device command which can be interpreted by the printer 1707. Then, the device command is sent from the host computer 1700 to the printer 1707, which prints the image according to the command.

Next, before describing the bookbinding application 1704 in detail, a data form of the book file will be described. The book file has a tier structure of three tiers mocking a book made of paper. The highest tier is called "book", mocking a book, with general attribute for the book defined. The middle tier under the highest tier corresponds to a chapter in a book, called "chapter". Each chapter can have an attribute defined. The lowest tier is a "page", corresponding to each page defined by an application program. Each page can also have an attribute defined. A book may include a plurality of chapters, each of which may include a plurality of pages.

Figure 20:
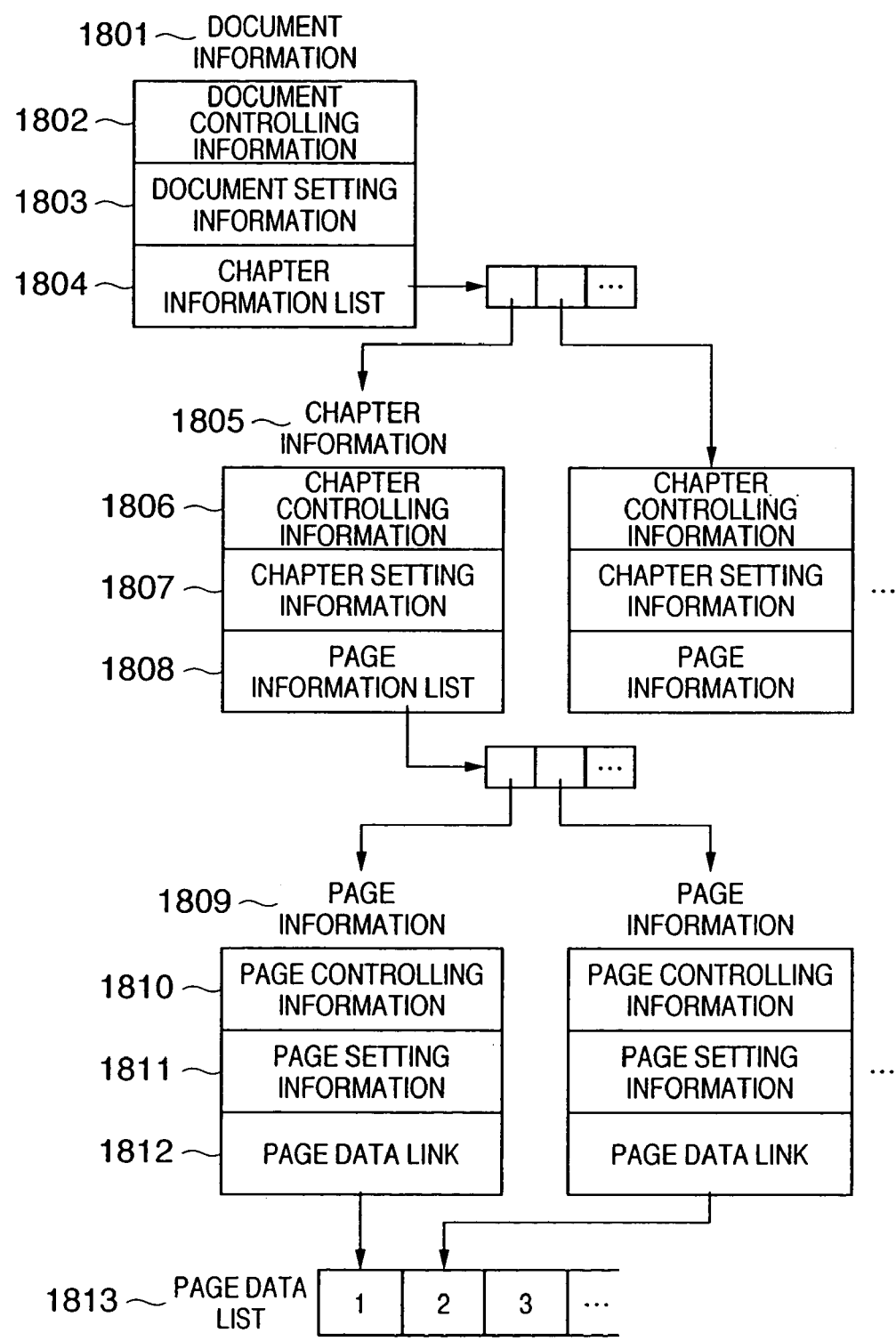
FIG. 20 is a diagram showing an exemplary structure of a book file in an embodiment.

FIG. 20 is a diagram showing an exemplary structure of a book file in the embodiment. As a book file needs not to be a complete book in this embodiment, a "book" is generalized and described as a "document" here.

As shown in FIG. 20, a book file has document information 1801 at the highest tier. The document information 1801 can be divided into three parts 1802-1804. Document controlling information 1802 holds information including a path name or the like in a file system of the document file. Document setting information 1803 holds layout information including a page layout or the like and function setting information for a printing device including a staple or the like and corresponds to an attribute of a book. Chapter information list 1804 lists up a set of chapters, which makes a document. The list holds chapter information 1805.

The chapter information 1805 can also be divided into three parts 1806-1808. Chapter controlling information 1806 holds information including a chapter name or the like. Chapter setting information 1807 holds information of a page layout or staple specific to the chapter and corresponds to an attribute of a chapter. Setting information included in each chapter enables a document with a complicated layout to be created such as a first chapter with 2up layout and the other chapters with 4up layout. Page information list 1808 lists up manuscript pages, which makes a document, in a set list form. The page information list 1808 instructs page information data 1809.

The page information data 1809 can also be divided into three parts 1810-1812. Page controlling information 1810 holds information including page numbers or the like to be displayed on a tree. Page setting information 1811 holds information including an angle of rotation of a page or location information of a page or the like and corresponds to an attribute of a manuscript page. Page link information 1812 is manuscript data corresponding to a page. In the example shown in FIG. 20, the page information 1809 only has the link information 1812 without directly holding manuscript data and a page data list 1813 is adapted to hold the actual manuscript data.

FIG. 21A-21B are lists showing book attributes (document setting information 1803). Generally, an attribute value for the lowest tier is preferentially used for an item which can be defined redundantly for that of the lowest tier. Therefore, for an item included only in a book attribute, a value defined for a book attribute is an effective value through the entire book. An item redundant with that of the lowest tier, however, has a meaning of a default value in the case that it is not defined in the lowest tier. In the embodiment, however, whether an attribute value of the lowest tier has a priority or not can be selected, as described later. Each item shown does not specifically correspond to a single item and may include a plurality of associated items.

Items specific to a book attribute are six items of (1) print method, (2) bookbinding detail, (3) a front cover/back cover, (4) index paper, (5) inserting paper and (6) chapter delimiting. They are the items defined through a book.

(1) As a print method attribute, three values of single-sided printing, double-sided printing and bookbinding printing can be specified. The bookbinding printing is a method for printing in a form to enable bookbinding, such that sheets of paper in additionally specified number are bundled, two-folded and bound.

(2) As a bookbinding detail attribute, direction of the page to be spread or the number of sheets to be bound or the like can be specified when a bookbinding print is specified.

(3) A front cover/back cover attribute includes a specification to add sheets of paper for a front cover and a back cover, and a specification of the contents to be printed on the added sheets of paper when an electronic manuscript file to be bound to make a book is printed.

(4) An index paper attribute includes specification about inserting of index paper with a deckle edge, which is additionally prepared in a printing device, and specification of the contents to be printed on an index (deckle edge) part. This attribute is enabled when a printing device to be used has an inserter with a inserting function for inserting sheets of paper prepared other than sheets of paper for printing in a predetermined location or when a plurality of sheet feeder cassettes are available. Much the same is true on inserting paper attribute.

(5) An inserting paper attribute includes, as chapter delimiting, specification of inserting sheets of paper to be fed from an inserter or a feeder cassette and specification or the like about sheet feeding source when an inserting paper is to be inserted.

(6) A chapter delimiting attribute includes specification whether a new sheet of paper is used or a new print page is used or nothing is done in particular where chapters are delimited. In case of the single-sided print, using a new sheet of paper and using a new print page have the same meaning. In case of the double-sided print, when "use a new sheet of paper" is specified, adjoining chapters are not printed on a single sheet of paper, but when "use a new print page" is specified, adjoining chapters may be printed on either sides of a single sheet of paper.

FIG. 22 is a list showing an exemplary list of chapter attributes (chapter setting information 1807). FIG. 23 is a list showing an exemplary list of page attributes (page setting information 1811). Relationship between a chapter attribute and a page attribute is similar to that between a book attribute and the lowest tier attribute.

As for a chapter attribute, a chapter has no specific items and all the items duplicate with those of the book attribute. Therefore, generally, when a definition in a chapter attribute differs from that in a book attribute, a value defined in the chapter attribute has a priority. In the embodiment, however, whether an attribute value of the lowest tier has a priority or not can be selected as described later.

Items only common to both a book attribute and a chapter attribute are five items of paper size, direction of paper, N-up print specification, scaling, and paper discharging manner. N-up print specification attribute among the items is an item for specifying the number of manuscript pages included in a print page. The distribution available for specification includes 1×1, 1×2, 2×2, 3×3, 4×4 and the like. Paper discharging manner attribute is an item for specifying whether a discharged sheet of paper is to be stapled or not. Effectiveness of this manner attribute depends on whether the printing device has a staple function or not.

Items specific to a page attribute include a page rotation attribute, zoom, location specification, annotation and page division or the like. The page rotation attribute is an item for specifying an angle of rotation when a manuscript pages is located on a print page. The zoom attribute is an item for specifying a scaling ratio of a manuscript page. The scaling ratio is specified by assuming a size of a virtual logical page area as 100%. The virtual logical page area is an area which is occupied by a single manuscript page when manuscript pages are located in accordance with the specification of N-up or the like. For example, when the location is 1×1, the virtual logical page area is an area corresponding to a single print page, and when the location is 1×2, it is an area with each edge of a single print page being scaled down to 70%.

Attributes common to a book, a chapter and a page include a watermark attribute and a header/footer attribute. The watermark is an additionally specified image or character string or the like to be printed over data created by an application. The header/footer is a watermark to be printed in an upper margin and a bottom margin of each page. For the header/footer, however, items, which can be specified by variable including the page number or date and time, are prepared.

The contents which can be specified in a watermark attribute and a header/footer attribute are common to a chapter and a page but not to a book. In a book, the contents of a watermark or a header/footer can be set. Through the entire book, how to print a watermark or a header/footer can be specified. On the other hand, in a chapter or a page, whether a watermark or a header/footer specified in a book is printed or not can be specified in the chapter or the page. A book file in the embodiment has the abovementioned structure and contents.

Next, procedures to create a book file by using the bookbinding application 1704 and the electronic manuscript writer 1702 will be described. Creation of a book file is performed as a part of an editing operation of a book file by the bookbinding application 1704.

Figure 24:
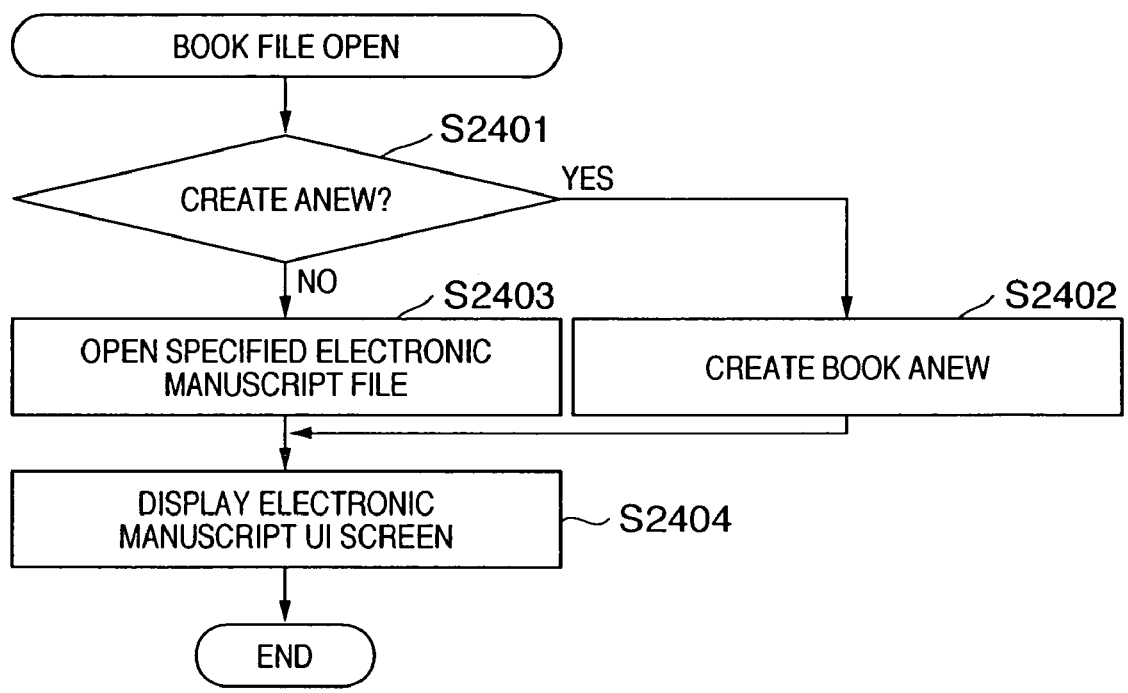
FIG. 24 is a flowchart for illustrating a procedure performed when a bookbinding application 1704 opens a book file in an embodiment of the present invention.
Figure 25:
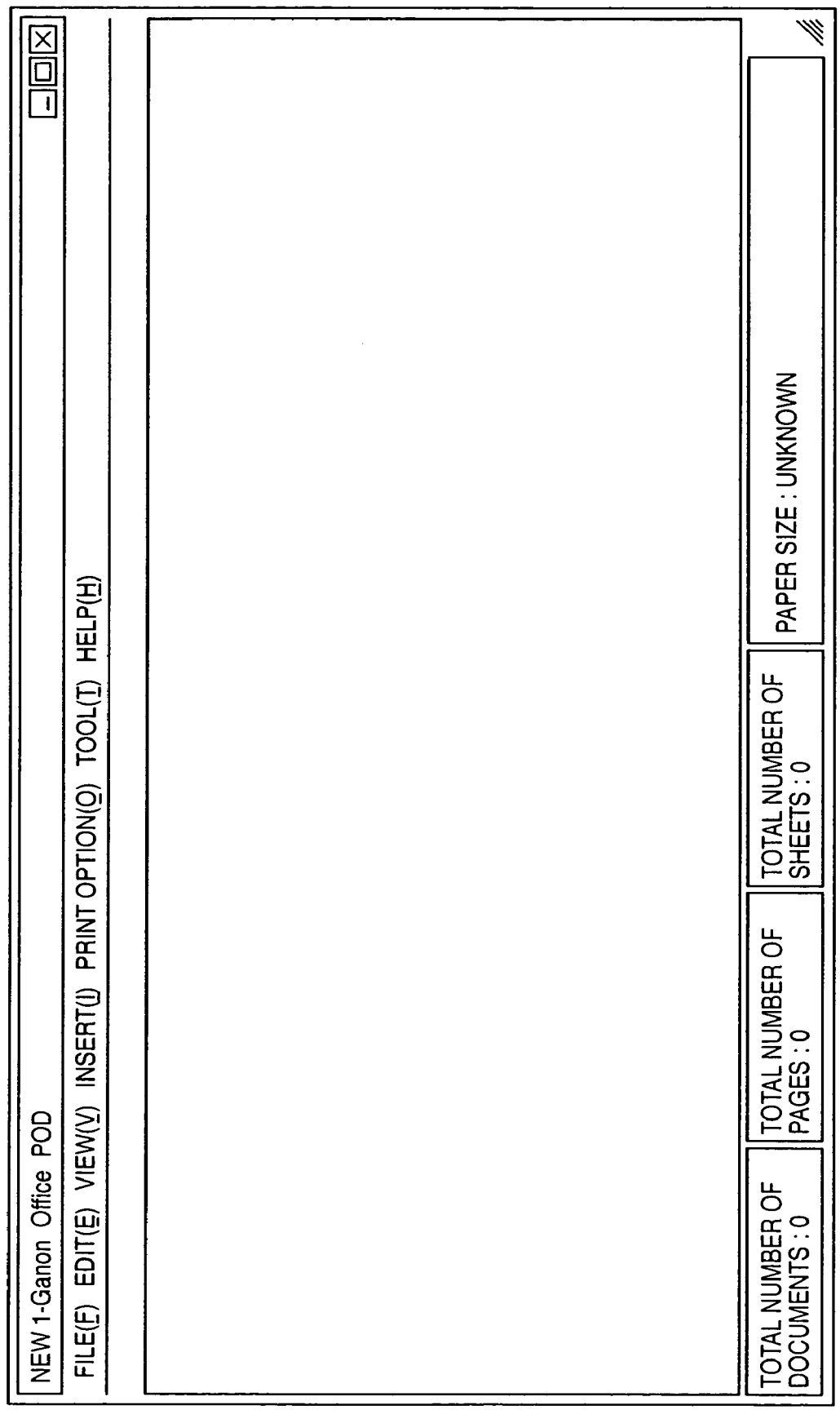
FIG. 25 is an example of a UI screen when a new book file is created at step S2404.

FIG. 24 is a flowchart for illustrating a procedure performed when a bookbinding application 1704 opens a book file in an embodiment of the present invention. First, whether a book file to be opened should be created anew or is an existing one is determined (step S2401). When it should be created anew (Yes), a book file including no chapters is created anew (step S2402). A set of attributes prepared for new creation is applied to the book attribute. Then, a user interface (UI) screen for editing the new book file is displayed (step S2404). FIG. 25 is an example of a UI screen when a new book file is created at step S2404. As shown in FIG. 25, as the book file has no virtual contents in this case, the UI screen 2300 displays nothing.

On the other hand, if it is determined it is an existing book file (No) at step S2401, the specified book file is opened (S2403) and the user interface (UI) screen is displayed according to the structure, attribute and contents of the book file (step S2404).

Figure 26:
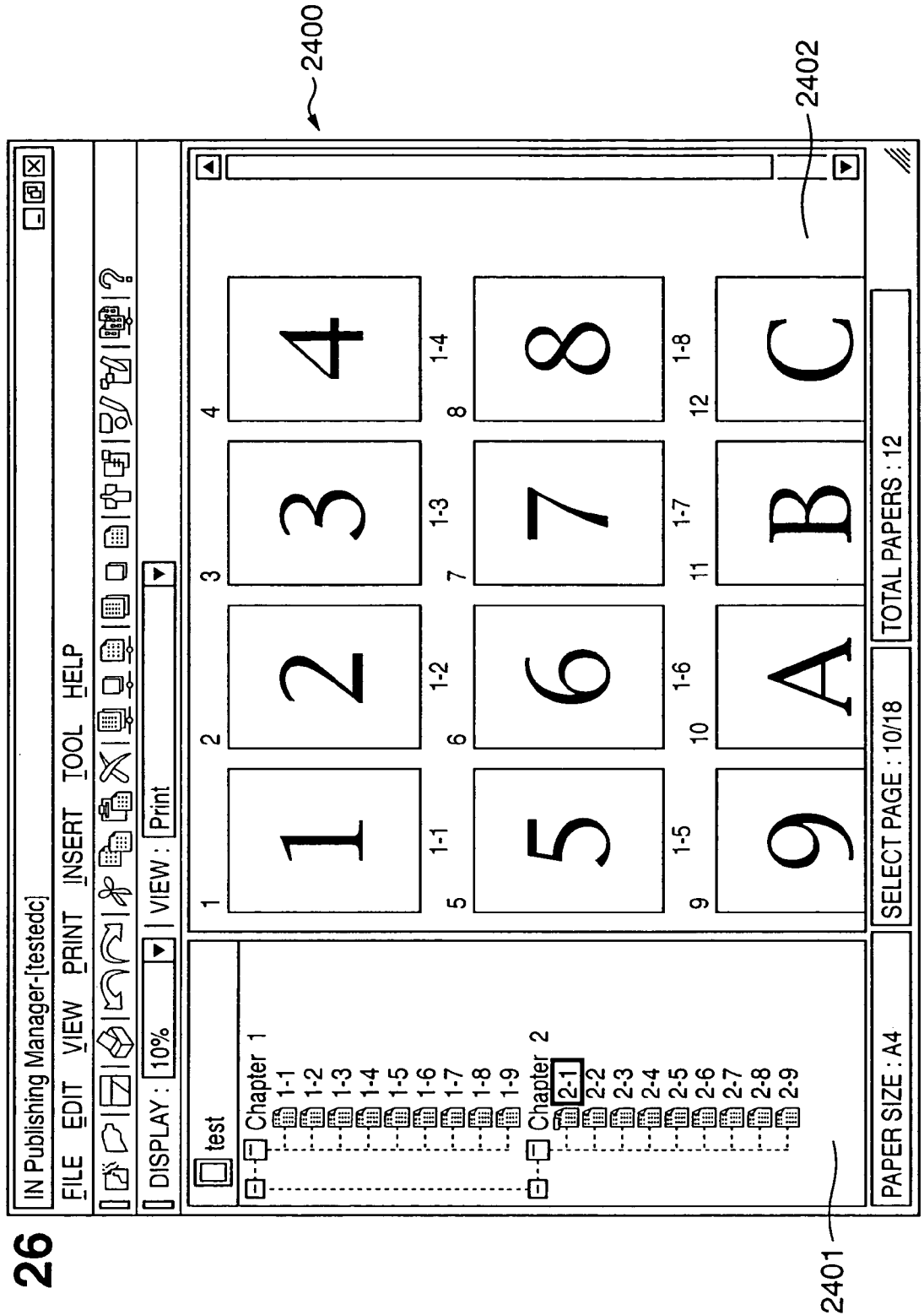
FIG. 26 is a diagram showing an example of a UI screen when an existing book file is opened.

FIG. 26 is a diagram showing an example of a UI screen when an existing book file is opened. As shown in FIG. 26, the UI screen 2400 includes a tree part 2401 for indicating the structure of the book and a preview part 2402 for displaying the printed state. On the tree part 2401, chapters included in a book and pages included in each chapter are displayed to clarify a tree structure as shown in FIG. 20. In FIG. 26, pages displayed on the tree part 2401 are manuscript pages. On the preview part 2402, the contents of print page are displayed in a scaled-down size. The order to display the contents reflects the structure of the book.

Application data converted into an electronic manuscript file by the electronic manuscript writer 1702 can be added to the opened book file as a new chapter. This function is called an electronic manuscript import function. In the embodiment, the book file is embodied by electronic-manuscript-importing the data into a book file created anew in a procedure shown in a flowchart of FIG. 24. The function is started by a user by dragging and dropping the application data to the screens shown in FIG. 25 or FIG. 26.

Figure 27:
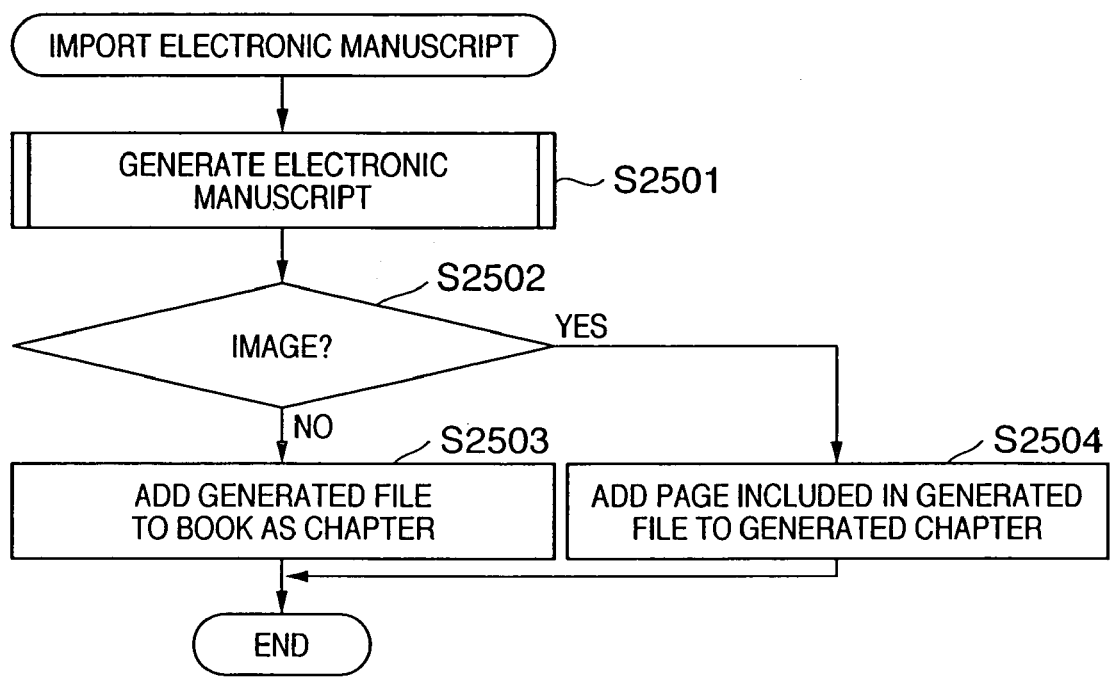
FIG. 27 is a flowchart for illustrating a procedure for importing an electronic manuscript file into a book file.

FIG. 27 is a flowchart for illustrating a procedure for importing an electronic manuscript file into a book file. First, application data is converted to electronic manuscript data by starting the application program, which generated the specified application data, specifying an electronic manuscript writer 1702 as a device driver and printing out the application data (step S2501).

Then, the converted data is determined whether it is image data or not (step S2502). This determination can be performed based on a file extension of the application data if it is controlled, for example by the OS of Windows (registered trademark). For example, if the extension is "bmp", the data is determined to be bitmap data, and if the extension is "jpg", the data is determined to be JPEG compressed image data, and if the extension is "tiff", the data is determined to be image data in tiff form. If the data is such image data, the electronic manuscript file can be generated directly from the image data without starting the application.

If it is determined that it is not image data (No) at step S2502, an electronic manuscript file generated at step S2501 is added as a new chapter to the currently opened book of the book file (step S2503). Generally, for chapter attributes common to book attributes, the values of the book attributes are copied, and for those not common to the book attributes, prepared default values are set. In the embodiment, whether attribute values of the lowest tier have priority or not can be selected.

On the other hand, if it is determined that it is image data (Yes) at step S2502, principally a new chapter is not added and each manuscript page included in the electronic manuscript file generated at step S2501 is added to the specified chapter (step S2504). If the book file is a file created anew, a new chapter is created and each page of the electronic manuscript file is added as a page belonging to the chapter.

Generally, for a page attribute which is common to the attribute of the highest tier, its attribute value is given, and for a page attribute which is inherited from an attribute defined in application data into the electronic manuscript file, its attribute value is given. For example, when an application data is specified for N-up or the like, the attribute value will be inherited. In this manner, a new book file is created, or a new chapter is added. In the embodiment, however, whether an attribute value for the lowest tier has a priority or not can be selected as described later.

Figure 28:
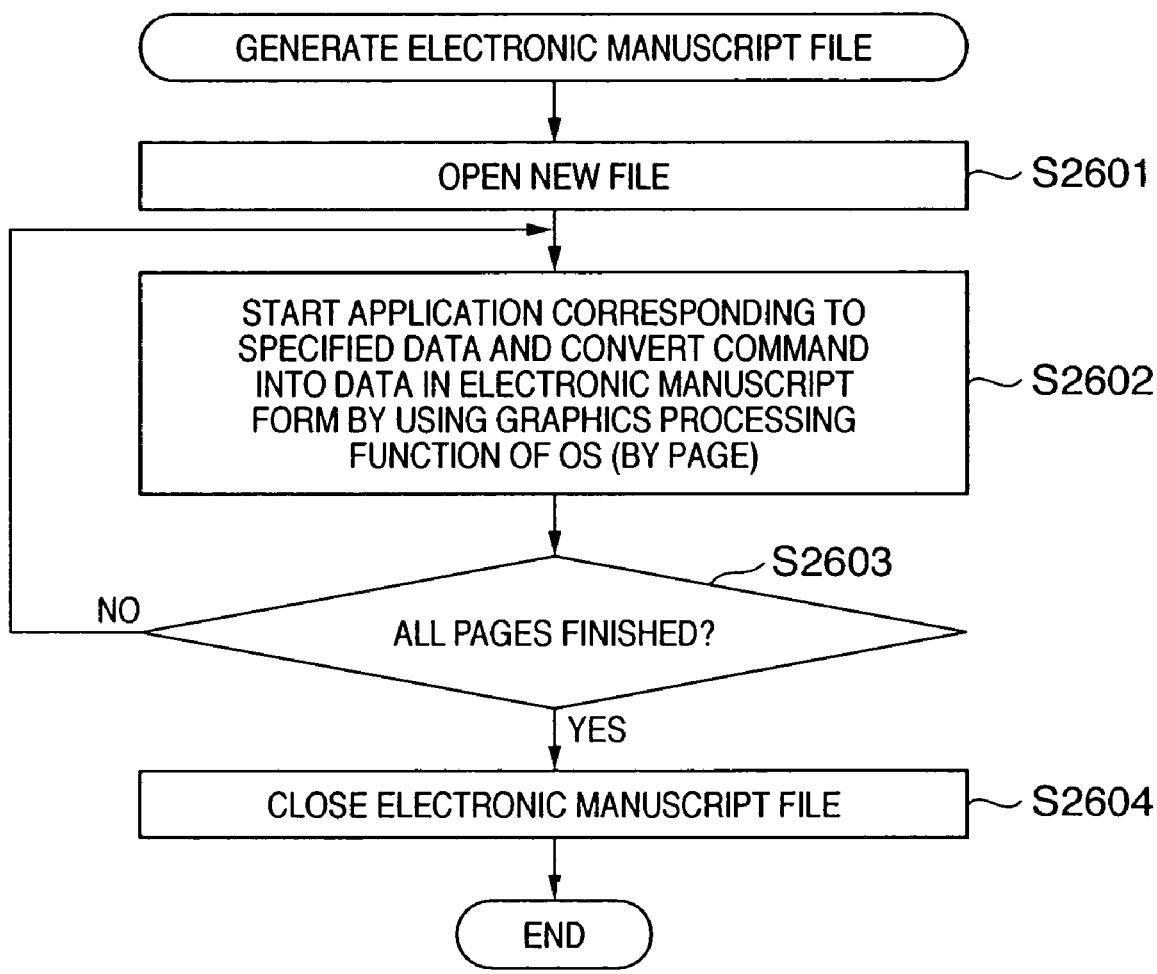
FIG. 28 is a flowchart for illustrating processes for an electronic manuscript writer 1702 to generate an electronic manuscript file at step S2501 in detail.

FIG. 28 is a flowchart for illustrating processes for an electronic manuscript writer 1702 to generate an electronic manuscript file at step S2501 in detail.

First, a new electronic manuscript file is created and opened (step S2601). Then, an application corresponding to the specified application data is started, and an output command is sent to an output module of the OS with the electronic manuscript writer 1702 as a device driver. The output module converts the received output command into data in an electronic manuscript form by the electronic manuscript writer and outputs the data (step S2602). The destination of the data is the electronic manuscript file opened at step S2601.

A determination is made about whether all the specified data has been converted or not (step S2603). If it has been converted (Yes), the electronic manuscript file is closed and finished (step S2604). An electronic manuscript file generated by the electronic manuscript writer 1702 is a file including the substance of manuscript page data.

A book file can be created from application data in a manner described above. Editing operations below is available for a chapter and a page of the generated book file.

(1) addition of a new one
(2) deletion
(3) copy
(4) cut
(5) paste
(6) move
(7) change a chapter name
(8) renumber change the name of a page
(9) insertion of the front cover
(10) insertion of inserting paper
(11) insertion of index paper
(12) page layout for each manuscript page In addition to the abovementioned editing operations, an operation for canceling the editing operation once performed and an operation recovering a canceled operation are possible. The editing operations allow integration of a plurality of book files, relocation of chapters or pages within a book file, deletion of a chapter or a page from a book file, changing the layout of a manuscript page, insertion of inserting paper or index paper, or the like. Results of such operations are reflected on attributes shown in FIGS. 21A,B-23 or on a structure of the book file.

For example, when an addition of a new blank page is performed, a blank page is inserted into a specified place. The blank page is dealt as a manuscript page. If a layout of the manuscript page is changed, the contents of the change is reflected on attributes about a print manner, an N-up print, a front cover/back cover, index paper, inserting paper and chapter delimiting.

An example of display and operations in editing in the embodiment will be described in detail.

A book file created and edited as described above intends to be printed out. A user selects a file menu on the UI screen 2400 of the bookbinding application shown in FIG. 26. When the user selects a print from the menu, the file is printed out through the specified output device. The bookbinding application 1704 first creates a job ticket from a currently opened book file and passes it to an electronic manuscript de-spooler 1705. The electronic manuscript de-spooler 1705 converts the job ticket into an output command for the OS, for example, a GDI command for Windows (registered trademark), and sends the command to an output module, for example to GDI. The output module generates a command suitable for a device by using a specified printer driver 1706 and sends the command to the device.

That is to say, a graphic engine of an output module (not shown) loads a printer driver 1706 prepared for each printing device from outside memory into RAM and sets the output to the printer driver 1706. The output module converts from the received GDI function into a DDI (Device Driver Interface) function and outputs the DDI function to the printer driver 1706. The printer driver 1706 converts into a control command, which can be recognized by a printer, for example PDL (Page Description Language) based on the DDI function received from the output module. The converted printer control command is output to a printer 1707 as print data through a system spooler, which is loaded by an OS into RAM.

The abovementioned job ticket is data having a structure with a manuscript page as a minimum unit. A structure in a job ticket defines the layout of a manuscript page on a sheet of paper. A job ticket is issued for each job. Therefore, the highest tier has a node called document, where an attribute of the entire document, for example double-sided printing/single-sided printing, is defined. A paper node belongs under the node called document and includes attributes such as an identifier of the sheet of paper to be used or specification of a sheet feeder inlet of the printer. A node of a sheet to be printed on the sheet of paper belongs to each paper node. One sheet corresponds to a sheet of paper. A print page (physical page) belongs to each sheet. For example, when it is single-sided printing, a single physical page belongs to a sheet, and when it is double-sided printing, two physical pages belong to a sheet. A manuscript page to be located on a physical page belongs to each physical page. As an attribute of a physical page, a layout of a manuscript page is included.

Figure 29:
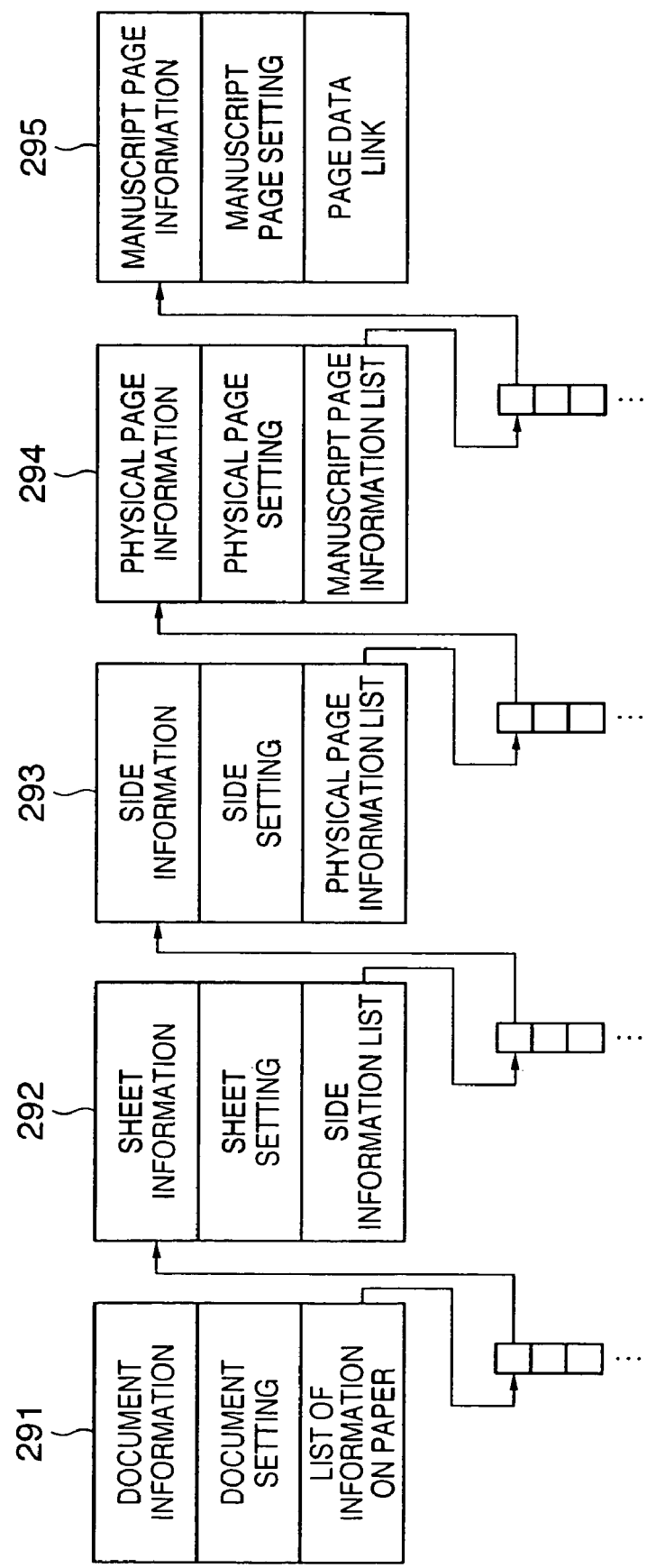
FIG. 29 is a diagram showing an example of a data structure used for printing or displaying.

FIG. 29 is a diagram showing an example of a data structure used for printing or displaying. For example, a document is formed by a set of sheets of paper in data for printing, with each sheet of paper being formed by two sides; a front side and a back side. Each side has an area (physical page) for laying out a manuscript and each physical page is formed by a set of manuscript pages, which is a minimum unit.

In FIG. 29, the reference number 291 denotes data corresponding to a document, which includes data relating the entire document and a list of paper information to form the document. The paper information 292 includes a list of information on paper such as the size of the sheet and information on a side located on the sheet. The side information 293 includes data specific to the side and a list of physical pages located on the side. The physical page information 294 includes information such as the size of the physical pages or a header/footer and a list of manuscript pages forming the physical pages.

The electronic manuscript de-spooler 1705 converts the abovementioned job ticket into an output command for an output module.

As mentioned above, when a book file is opened by the bookbinding application, a user interface screen 2400 shown in FIG. 26 is displayed. In FIG. 26, a tree indicating a structure of an opened book (hereinafter referred to as "book of interest") is displayed on the tree part 2401. For the preview part 2402, three display modes, for example, are prepared based on an indication from a user.

The first display mode is a mode called a manuscript view, which displays a manuscript page as it is. In the manuscript view mode, the contents of the manuscript pages belonging to the book of interest are scaled down and displayed. The display of the preview part 2402 does not reflect the layout. The second display mode is a print view mode. In the print view mode, the manuscript pages are displayed on the preview part 2402 with the layout of the manuscript pages being reflected. The third display mode is a simple print view mode. In the simple print view mode, the contents of each manuscript page are not reflected on the display of the preview part and only the layout is reflected.

Figure 30:
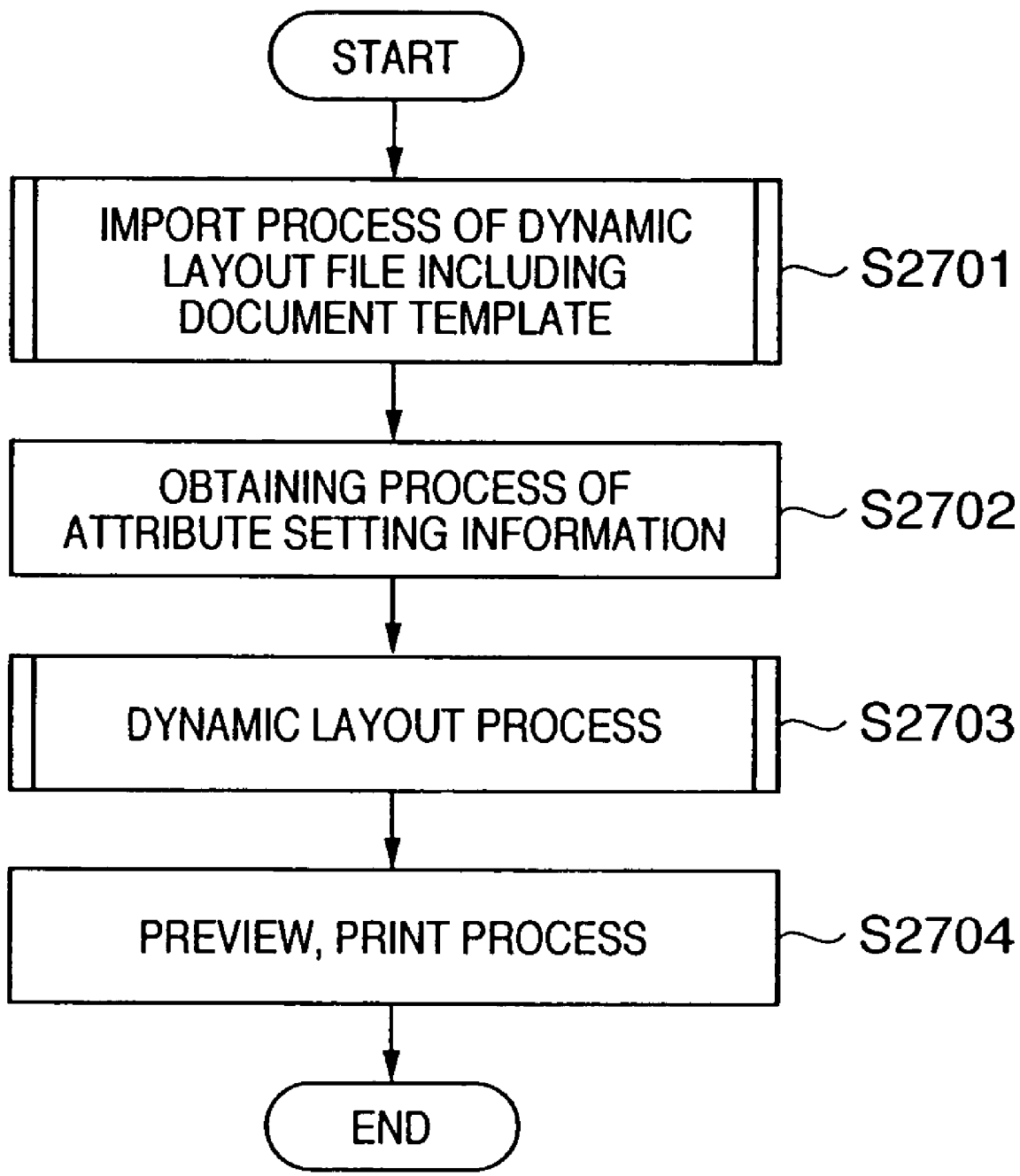
FIG. 30 is a flowchart for illustrating a procedure of dynamic layout processing that characterizes the present invention.
Figure 31:
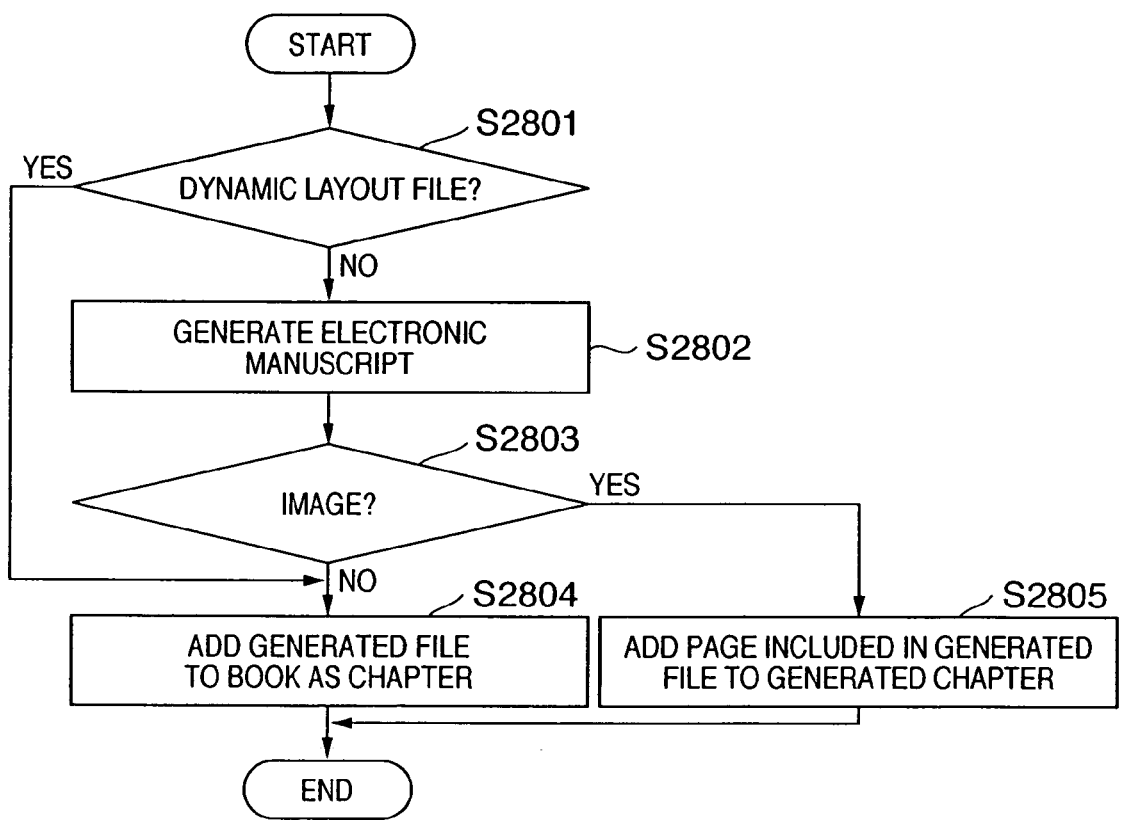
FIG. 31 is a flowchart for illustrating importing of a dynamic layout file at step S2701 in detail.
Figure 32:
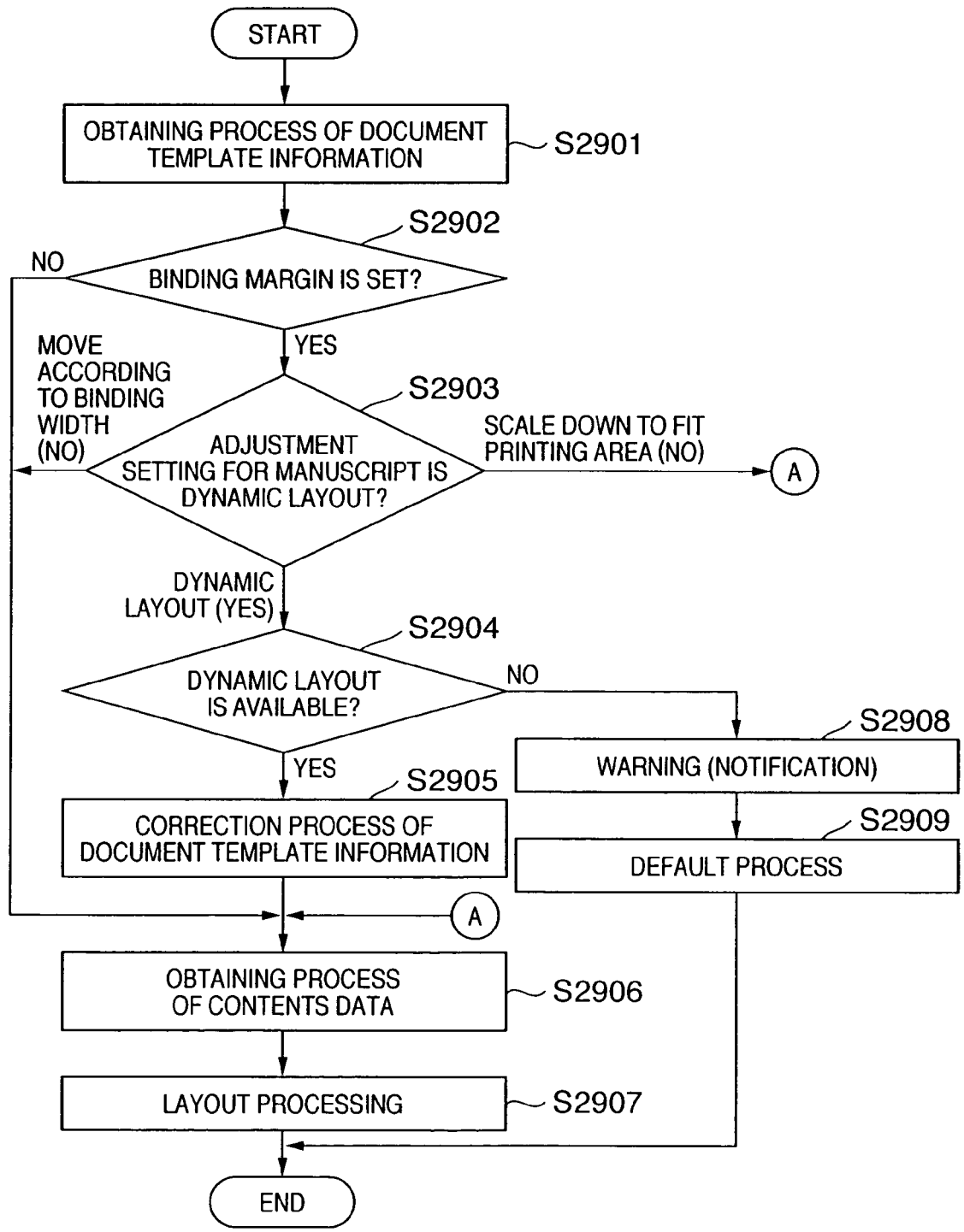
FIG. 32 is a flowchart for illustrating dynamic layout processing at step S2703 in detail.

FIGS. 30-32 are flowcharts for illustrating a procedure of dynamic layout processing that characterizes the present invention. The dynamic layout processing according to the embodiment will be described in detail with reference to the flowcharts shown in FIGS. 30-32.

As mentioned above, the layout editing application 121 saves a file (hereinafter referred to as dynamic layout file) including contents data and a document template information file (also referred to as template data). An application including a layout engine 105 can read this dynamic layout file. The document processing system according to the embodiment has the layout engine 105 in the bookbinding application 1704. The document template information file included in the dynamic layout file is template data with a basic layout, in which partial areas (field areas) for inserting variable data is laid out in a page, and with links being set between partial areas in order to define that the partial areas are laid out in conjunction with each other.

The dynamic layout file can be imported into the bookbinding application 1704. By importing this file, the applications described above on the bookbinding application 1704 can be combined, can be changed in its attributes and can be printed.

As shown in FIG. 30, when the dynamic layout file already created by the layout editing application 121 is dragged and dropped on the bookbinding application 1704, the dynamic layout file including a document template is first imported (step S2701). FIG. 31 is a flowchart for illustrating importing of a dynamic layout file at step S2701 in detail.

First, the bookbinding application 1704 determines whether the dragged and dropped file is a dynamic layout file or not (step S2801). As mentioned above, if the file is not a dynamic layout file, a new electronic manuscript file is created and the created file is opened as it is in the other general applications (step S2601). Then, the application associated with the dropped document file is started, drawn by printing it, and the outputted drawing data is converted as mentioned above (step S2602). A determination is made about whether the data for all pages has been converted or not (step S2603). If it is determined the data has been converted, the electronic manuscript is generated after closing (step S2604) of the generated electronic manuscript file (step S2802: input part 3913).

As a dynamic layout file is considered in the embodiment, a new electronic manuscript file needs not be generated. Then it is determined Yes at step S2801 and the next generated file is added to the book as a chapter (step S2804) without converting data of the dynamic layout file (template data) (addition part 3915). Accordingly, the dynamic layout file is added to an existing book as a chapter as mentioned above. For chapter attributes common to book attributes, the values of the book attributes are copied, and for those not common to the book attributes, prepared default values are set. The dynamic layout file imported (taken) in this manner is stored in the page data list 1813 of FIG. 20 and managed by the bookbinding application (management part 3901). Determination is made (step S2803: data determination part 3914) about whether the data is image data or not after the electronic manuscript is generated (step S2802). If it is not determined as image data, the abovementioned step S2804 is performed. If it is determined as image data, pages included in the generated file may be added in the generated chapter (step S2805).

After the import process at step S2701, attribute setting information is obtained (step S2702). This is for obtaining the information for a dynamic layout processing after the abovementioned attribute setting (step S2703). Then the next dynamic layout processing is performed (step S2703). FIG. 32 is a flowchart for illustrating dynamic layout processing at step S2703 in detail.

As shown in FIG. 32, when the bookbinding application 1704 processes pages of a dynamic layout file in an electronic manuscript to be printed, document template information of the corresponding page is obtained (step S2901). This is for obtaining document template information of the dragged and dropped dynamic layout file from the page data list 1813 shown in FIG. 20.

Figure 33:
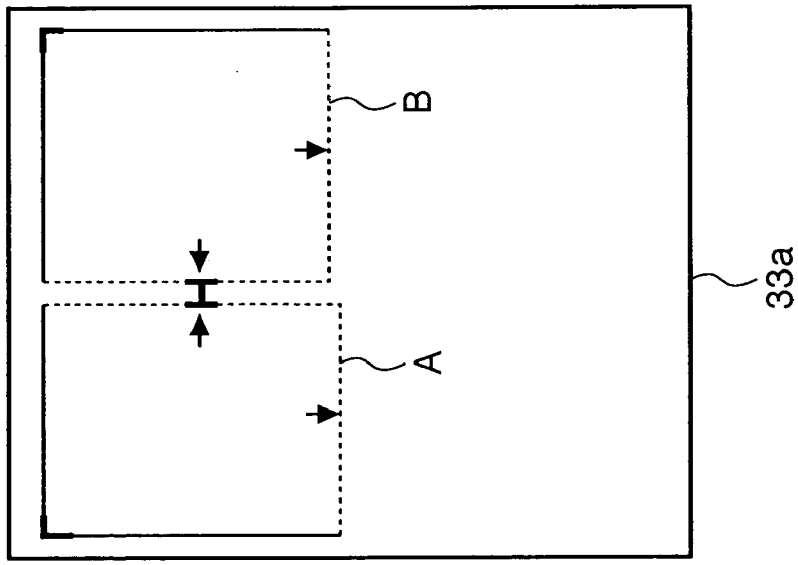
FIG. 33 is a diagram showing an example of dynamic layout information.

FIG. 33 is a diagram showing an example of dynamic layout information. As shown in FIG. 33, dynamic layout information has a basic template already created by a designer or the like. "A" in the template 33*a* is a flexible container for an image and can be changed in the direction indicated by the arrow. "B" in the template 33*a* shows a flexible container for text and also can be changed in the direction indicated by the arrow. It is assumed that such a template 33*a* is obtained. In FIGS. 33, 33*b* and 33*c* show examples of contents data for an image and text, respectively.

Figure 34:
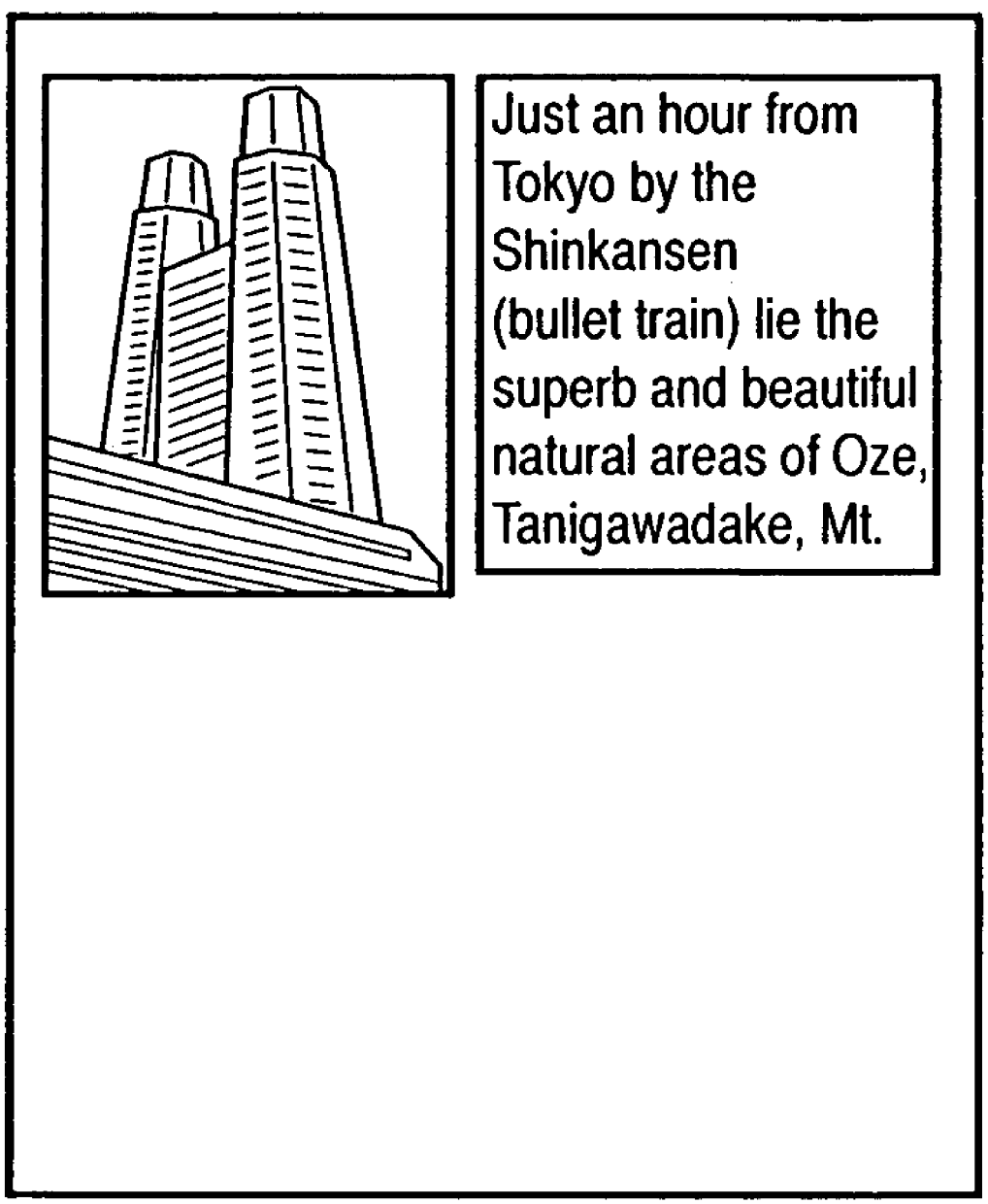
FIG. 34 is a diagram showing an example of a result when contents data 33b and 33c is inserted into template 33a and the layout calculation illustrated in FIGS. 11 and 16 is performed.

FIG. 34 is a diagram showing an example of a result when the contents data 33*b* and 33*c* are inserted into the template 33*a* and the layout calculation illustrated in FIGS. 11 and 16 is performed. As shown in FIG. 34, when the bookbinding application does not restrict on the dynamic layout information, the abovementioned layout calculation is performed. The image and text to be inserted differ in their sizes for respective records.

Next, the bookbinding application 1704 obtains a printing condition set by an operator through a user interface for setting a printing condition (printing condition setting part 3904) and determines whether a binding margin is set for the obtained printing condition or not (step S2902: determination part 3908). This is for determining whether a binding margin is set before the dynamic layout file is taken in. With the bookbinding application, a binding margin can be set on a UI. In the embodiment, the left edge of the longer side and a single-sided printing are considered. FIG. 35 is a diagram showing an example of a UI screen for setting a bookbinding application UI when it is working together. Information as shown in FIG. 25 is obtained from attribute setting obtained by an obtaining processing (step S2702) of attribute setting information in the flowchart of FIG. 30.

If it is determined that a biding margin is set (Yes) at step S2902, then a determination is made about whether adjustment setting for a manuscript is a dynamic layout or scaled-down to fit the printing area or move according to the binding width (step S2903). As shown in exemplary setting UI of FIG. 35, three types of setting such as "scale down to fit the printing area set by margin" 351, "move according to the binding width" 352 or "dynamic layout" 353 are available to be selected for adjustment setting of a manuscript. A user can select relationship between a binding margin and a manuscript from the three choices (selecting part 3909).

Figure 36:
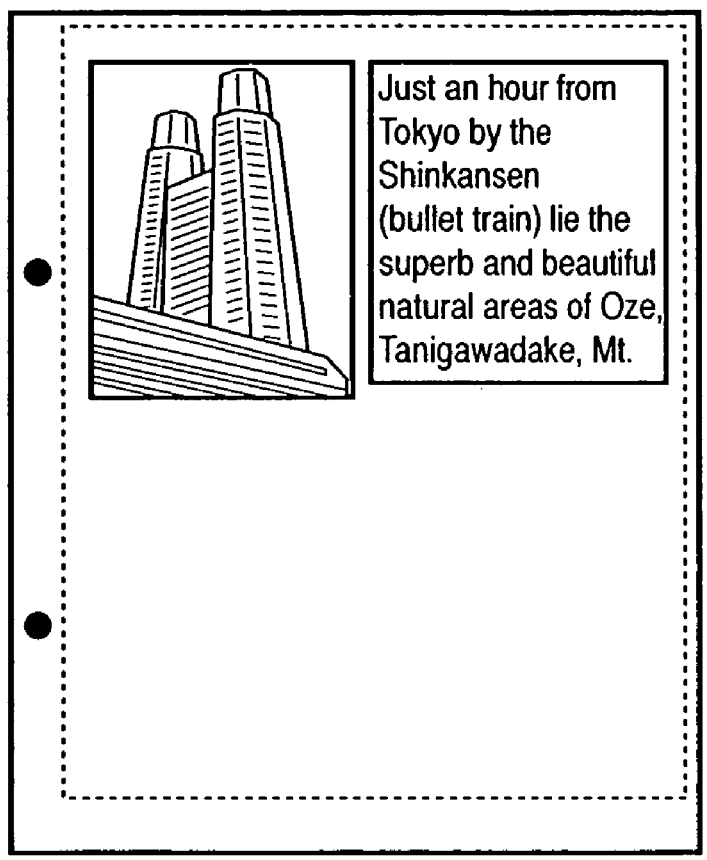
FIG. 36 is a diagram showing an image when "scale down according to the printing area set by margins" 351 is selected on the UI screen for setting in FIG. 35.
Figure 37:
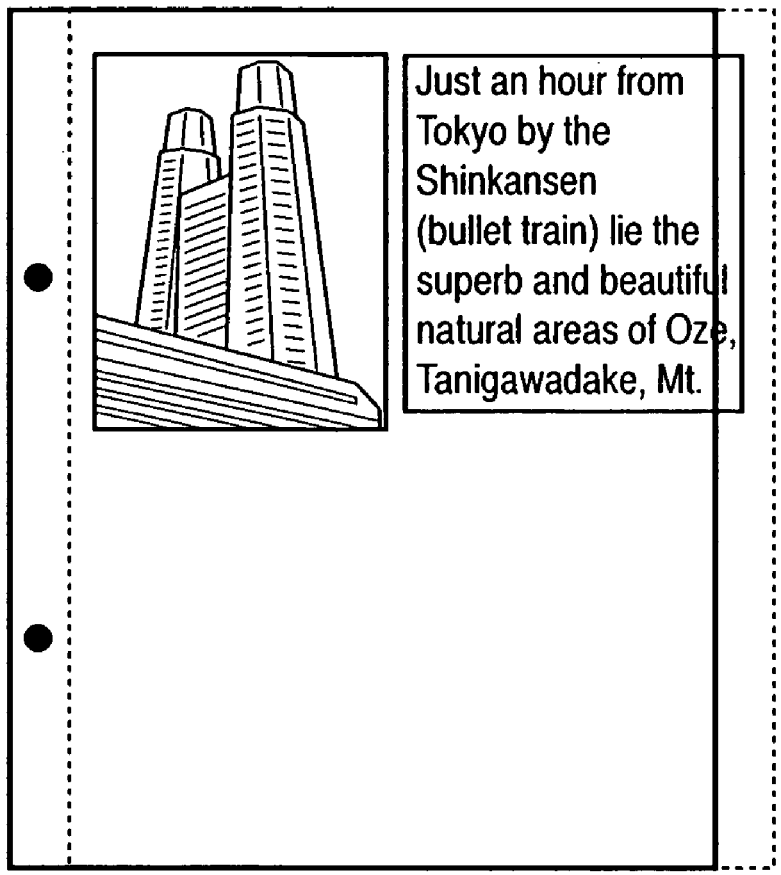
FIG. 37 is a diagram showing an image when "move according to the width of binding margin" 352 is selected on the UI screen for setting in FIG. 35.

FIG. 36 is a diagram showing an image when "scale down to fit the printing area set by margin" 351 is selected on the UI screen for setting in FIG. 35. FIG. 37 is diagram showing an image when "move according to the binding width" 352 is selected on the UI screen for setting in FIG. 35. In the former example, the image can be scaled-down with keeping the aspect ratio but the size intended by the designer is changed, which is disadvantageous. In the latter example, it is disadvantageous that the image shifts rightward by the binding width, causing the right part of the image may be lost.

A determination 2903 about whether adjustment setting of a manuscript is a dynamic layout or not is for determining whether "dynamic layout" 353 is selected from the above-mentioned three settings. In the embodiment, it does not matter whether the setting is automatically changed to "dynamic layout" when the dynamic layout file is taken in or set by a user after the dynamic layout file is taken in. It neither matter in the embodiment, whether this selection is available before the dynamic layout file is taken in.

If "scale down to fit the printing area set by margin" 351 is selected (No) at step S2903, the result of layout calculation process mentioned above with reference to FIGS. 11 and 16 is scaled-down with the aspect ratio kept for the printing area and print data is generated. If "move according to the binding width" 352 is selected (No) at step S2903, also the result of layout calculation mentioned above with reference to FIGS. 11 and 16 is moved from the binding location by the binding width and the result of coordinate calculation is generated as print data (printing part 3912).

If "dynamic layout" 353 is selected (YES) as shown in FIG. 35 at step S2903, whether a dynamic layout is available for the manuscript, i.e., whether it is a page of dynamic layout file or not is determined (step S2904). If it is determined that a dynamic layout is available (Yes), the dynamic layout engine is started on the basis of a basic template and link setting of a previously obtained document template information, the binding margin is set as a layout forbidden area, and the layout calculation process is performed as described in FIGS. 11 and 16 (step S2905). The layout calculation processing here may be performed as a process for correcting the layout obtained from layout calculation with no restriction (such as a binding margin) on a printing condition is put from the bookbinding application. In such a case, the layout calculation processing is a process for correcting a document template in accordance with the previously obtained binding margin setting.

A binding margin on the bookbinding application 1704 is not previously taken into account for the paper size (template size) in creating a document template by the layout editing application 121. When the document is printed out by the bookbinding application 1704, the layout engine 225 (105) obtains a printing condition and the template size with a printing condition of the binding margin being set by the size of each container as an area forbidden for layout, according to the obtained printing condition (in the embodiment, binding margin setting) (correction part 3907). As the paper size (template size) is reduced in the horizontal direction here, the maximum size in the horizontal direction for each container is corrected accordingly. For example, the correction is performed by reducing the maximum size in the horizontal direction equally for each container by the binding margin. If it is a fixed link, the size of the fixed link can be reduced, and if it is a flexible link, the minimum size can be reduced.

Then, the contents data is obtained (step S2906: obtaining part 3910). This process is for obtaining contents data on the desired record from a dynamic layout file or database or the like. The file or the database may be in any type. Here, it is assumed that image data and text data are obtained as shown in FIG. 33.

Figure 38:
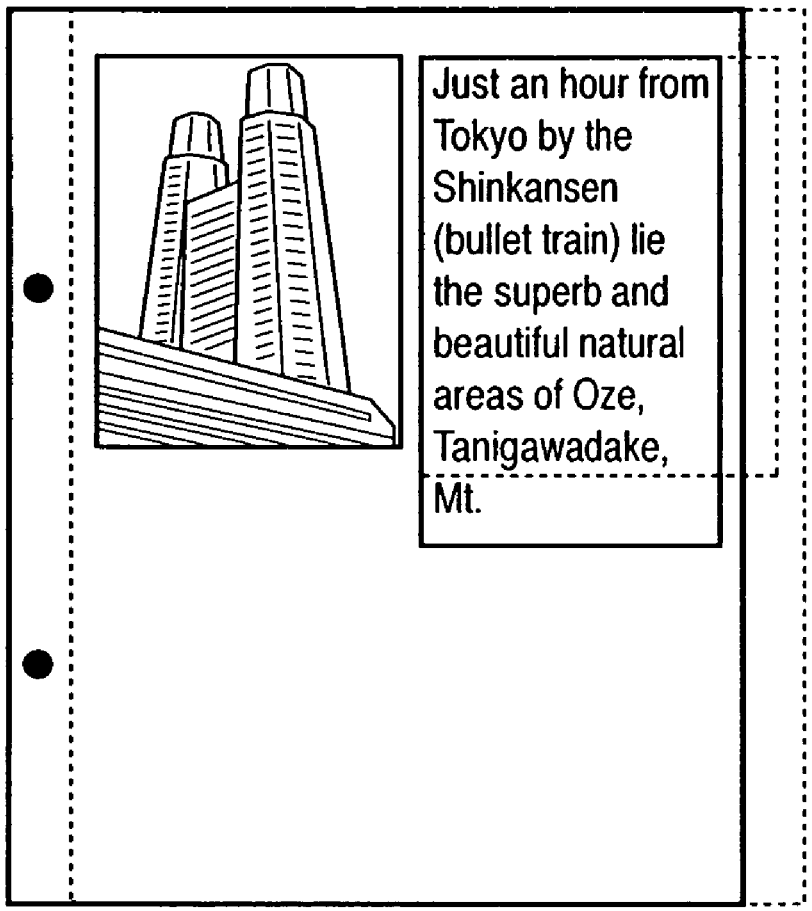
FIG. 38 is a diagram showing an image when "dynamic layout" 353 is selected on the UI screen for setting in FIG. 35.

Then, the layout processing mentioned above with reference to FIGS. 11 and 16 is performed (step S2907: layout processing part 3911). This is for calculating an actual layout from document template information including the previously corrected template size and contents data. FIG. 38 is a diagram showing an image when "dynamic layout" 353 is selected on the UI screen for setting in FIG. 35. In the image shown in FIG. 38, dotted lines indicate an area when the document template is not corrected and a rectangular of a text container. With the previous correction, the layout is calculated and the appropriate layout can be located as shown in FIG. 38.

On the other hand, if it is determined that a dynamic layout is impossible (No) at step S2904, a warning in the form of a warning message or a warning sound or the like indicating that the dynamic layout is impossible is given to the user (step S2908). Then, default process (for example, returning to the previous process) is performed (step S2909) and the process is finished.

Although the left edge of the longer side and a single-sided printing are considered in the embodiment, if the top of the shorter edge is bound, the paper size (template size) is reduced in the vertical direction and the maximum size in the vertical direction for each container is corrected accordingly.

<Other Embodiments>

In contrast to the abovementioned embodiments, another embodiment can be considered where an area effective for printing with a device is obtained and document template is corrected instead of the setting of a binding margin on the bookbinding application. In such a case, an area effective for printing with a device is obtained instead of determining about the setting of a binding margin on the bookbinding application in FIG. 32, and the document template information is corrected on the basis of the size. An area effective for printing of a device is obtained for obtaining an effective printing area including driver setting via a driver. Subsequent contents data obtaining processing (step S2906) and layout processing (step S2907) are performed in the same way, enabling the dynamic layout with consideration of an area effective for printing of a device.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, layout adjustment on a variable data document can be preferably achieved in accordance with the printing condition without any loss or inappropriate reduction of a container for a variable data document which is once determined in accordance with a printing condition such as a binding margin setting at printing.

CLAIM OF PRIORITY

This application claims priority from Japanese Patent Application No. 2004-231434 filed Aug. 6, 2004, which is hereby incorporated by reference herein.

What is claimed is:

1. A layout adjustment method for determining a layout of a page to be formed on a printing medium, comprising:
   a generation step of generating a template including a plurality of partial areas, to which data are inserted;
   a setting step of setting a link between two partial areas of the plurality of partial areas to connect the two partial areas;
   a first adjustment step of generating a first layout indicating positions and sizes of the two partial areas adjusted on the basis of the sizes of data to be inserted in the two partial areas such that respective change amounts of the data inserted in the two partial areas connected by the link is the same;
   a printing conditions setting step for setting a binding margin for printing a document including the template;
   a correction step of correcting the template on the basis of the binding margin set in the print conditions setting step; and
   a second adjustment step of generating a second layout indicating the positions and the sizes of the two partial areas adjusted on the basis of the sizes of data to be inserted in the two partial areas and the template corrected in the correction step,
   wherein in said correction step, the template is corrected such that a length in a horizontal direction of a specified partial area of the second layout is shorter than a length in the horizontal direction of a corresponding partial area of the first layout corresponding to the specified partial area of the second layout and a length in a vertical direction of the specified partial area of the second layout is longer than a length in the vertical direction of the corresponding partial area of the first layout, and
   wherein the steps are performed on a computer.

2. A layout adjustment apparatus for determining a layout of a page to be formed on a printing medium, comprising:
   a host computer, said host computer including:
   generation means for generating a template including a plurality of partial areas, to which data are inserted;
   setting means for setting a link between two partial areas of the plurality of partial areas to connect the two partial areas;
   first adjustment means for generating a first layout indicating positions and sizes of the two partial areas adjusted on the basis of the sizes of data to be inserted in the two partial areas such that respective change amounts of the data inserted in the two partial areas connected by the link is the same;
   print conditions setting means for setting a binding margin for printing a document including the template;
   correction means for correcting the template on the basis of the binding margin set by said print conditions setting means; and
   second adjustment means for generating a second layout indicating the positions and the sizes of the two partial areas adjusted on the basis of the sizes of data to be inserted in the two partial areas and the template corrected in said correction means,
   wherein said correction means corrects the template such that a length in a horizontal direction of a specified partial area of the second layout is shorter than a length in the horizontal direction of a corresponding partial area of the first layout corresponding to the specified partial area of the second layout and a length in a vertical direction of the specified partial area of the second layout is longer than a length in the vertical direction of the corresponding partial area of the first layout.

3. A computer readable medium encoded with a computer program for causing a computer, which determines a layout of a page to be formed on a printing medium, to perform
   a generation procedure for generating a template including a plurality of partial areas, to which data are inserted
   a setting procedure of setting a link between two partial areas of the plurality of partial areas to connect the two partial areas;
   a first adjustment procedure of generating a first layout indicating positions and sizes of the two partial areas adjusted on the basis of the sizes of data to be inserted in the two partial areas such that respective change amounts of the data inserted in the two partial areas connected by the link is the same;
   a print conditions setting procedure for setting a binding margin for printing a document including said template;
   a correction procedure of correcting the template on the basis of the binding margin set in the print conditions setting procedure; and
   a second adjustment procedure of generating a second layout indicating the positions and the sizes of the two partial areas adjusted on the basis of the sizes of data to be inserted in the two partial areas and the template corrected in the correction procedure, wherein in said correction procedure, the template is corrected such that a length in a horizontal direction of a specified partial area of the second layout is shorter than a length in the horizontal direction of a corresponding partial area of the first layout corresponding to the specified partial area of the second layout and a length in a vertical direction of the specified partial area of the second layout is longer than a length in the vertical direction of the corresponding partial area of the first layout.

* * * * *